(12) United States Patent
Mcgee et al.

(10) Patent No.: US 12,528,226 B2
(45) Date of Patent: Jan. 20, 2026

(54) ADDITIVE MANUFACTURING OF ENGINEERED CEMENTITIOUS COMPOSITES

(71) Applicant: THE REGENTS OF THE UNIVERSITY OF MICHIGAN, Ann Arbor, MI (US)

(72) Inventors: Jonathan Wesley Mcgee, Ann Arbor, MI (US); Victor C. Li, Ann Arbor, MI (US); Tsz Yan Ng, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 117 days.

(21) Appl. No.: 18/013,469

(22) PCT Filed: Jul. 2, 2021

(86) PCT No.: PCT/US2021/040387
§ 371 (c)(1),
(2) Date: Dec. 28, 2022

(87) PCT Pub. No.: WO2022/006560
PCT Pub. Date: Jan. 6, 2022

(65) Prior Publication Data
US 2023/0256649 A1    Aug. 17, 2023

Related U.S. Application Data

(60) Provisional application No. 63/048,019, filed on Jul. 3, 2020.

(51) Int. Cl.
*B28B 1/00* (2006.01)
*B28B 17/00* (2006.01)
(Continued)

(52) U.S. Cl.
CPC .......... *B28B 1/001* (2013.01); *B28B 17/0081* (2013.01); *B33Y 30/00* (2014.12); *B33Y 50/02* (2014.12); *B33Y 70/10* (2020.01)

(58) Field of Classification Search
CPC ..... B28B 1/001; B28B 17/0081; B33Y 30/00; B33Y 50/02; B33Y 70/10
See application file for complete search history.

(56) References Cited

U.S. PATENT DOCUMENTS

| 2007/0138678 A1 | 6/2007 | Khoshnevis |
| 2014/0252668 A1 | 9/2014 | Austin et al. |

(Continued)

FOREIGN PATENT DOCUMENTS

| CN | 105216333 A | 1/2016 |
| WO | WO-2019089771 A1 | 5/2019 |

OTHER PUBLICATIONS

International Search Report and Written Opinion of the ISA issued in PCT/US2021/40387, mailed Nov. 24, 2021; ISA/US.

(Continued)

*Primary Examiner* — Jamel M Nelson
*Assistant Examiner* — Erica Hartsell Funk
(74) *Attorney, Agent, or Firm* — Harness, Dickey & Pierce, P.L.C.

(57) ABSTRACT

An automated robotic printing device for additive manufacturing or three-dimensional printing of an engineered cementitious composite (ECC) structure is provided. The device has a feeding system and an automated extrusion system configured to receive the ECC composition from the feeding system and deposit the ECC composition onto a target. The automated extrusion system comprising at least one robotic device comprising a tiltable and steerable deposition head that comprises an extrusion nozzle having a substantially rectangular opening and at least one shaping (Continued)

blade at a terminal end to shape and deposit the cementitious composition onto a target. Methods of additive manufacturing of a structure from the ECC compositions are also provided.

21 Claims, 33 Drawing Sheets

(51) Int. Cl.
 *B33Y 30/00* (2015.01)
 *B33Y 50/02* (2015.01)
 *B33Y 70/10* (2020.01)

(56) References Cited

U.S. PATENT DOCUMENTS

| | | |
|---|---|---|
| 2014/0284832 A1 | 9/2014 | Novikov et al. |
| 2018/0250850 A1* | 9/2018 | Chen-Iun-Tai ......... B33Y 30/00 |
| 2019/0202117 A1 | 7/2019 | Alfson et al. |
| 2019/0224846 A1 | 7/2019 | Pivac |
| 2021/0107177 A1* | 4/2021 | Giles ..................... E04B 1/35 |

OTHER PUBLICATIONS

Victor Li et al., "On the emergence of 3D printable Engineered, Strain Hardening Cementitious Composites (ECC/SHCC)", Cement and Concrete Research, 132(132), (2020), [106038]. https://doi.org/10.1016/j.cemconres.2020.106038.

Kequan Yu et al., "3D-printable engineered cementitious composites (3DP-ECC): Fresh and hardened properties", Cement and Concrete Research, (2021).

Japan Society of Civil Engineers, "Recommendations for Design and Construction of High Performance Fiber Reinforced Cement Composites with Multiple Fine Cracks (HPFRCC)", Concrete Engineering Series 82, (Mar. 2008).

Buswell et al., "3D printing using concrete extrusion: A roadmap for research", Cement and Concrete Research, 112 pp. 37-49 (2018).

B. Nematollahi et al., "Effect of polypropylene fibre addition on properties of geopolymers made by 3D printing for digital construction", Materials, 11 2352 (2018).

Wes McGee et al., "Extrusion Nozzle Shaping for Improved 3DP of Engineered Cementitious Composites (ECC/SHCC)", (2020).

* cited by examiner

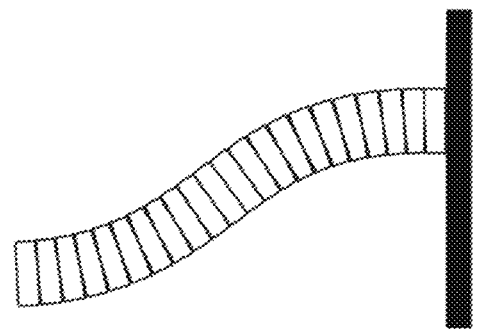
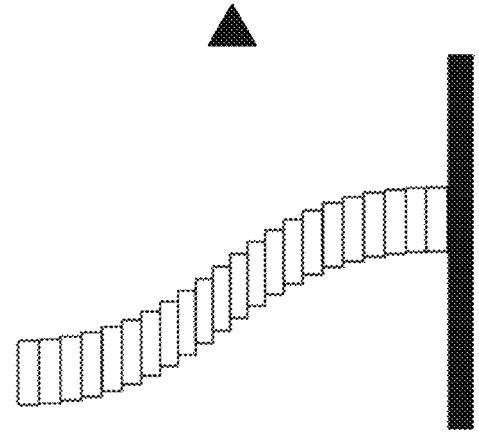
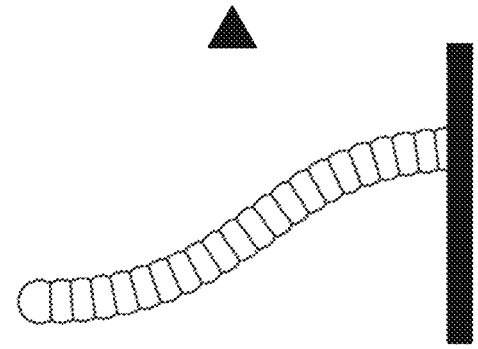
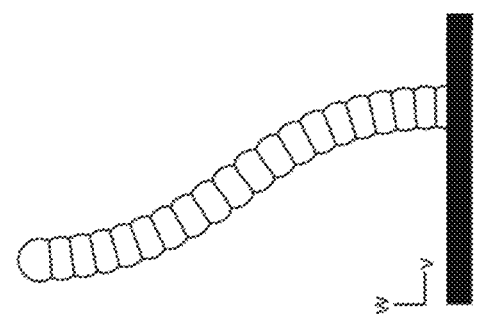

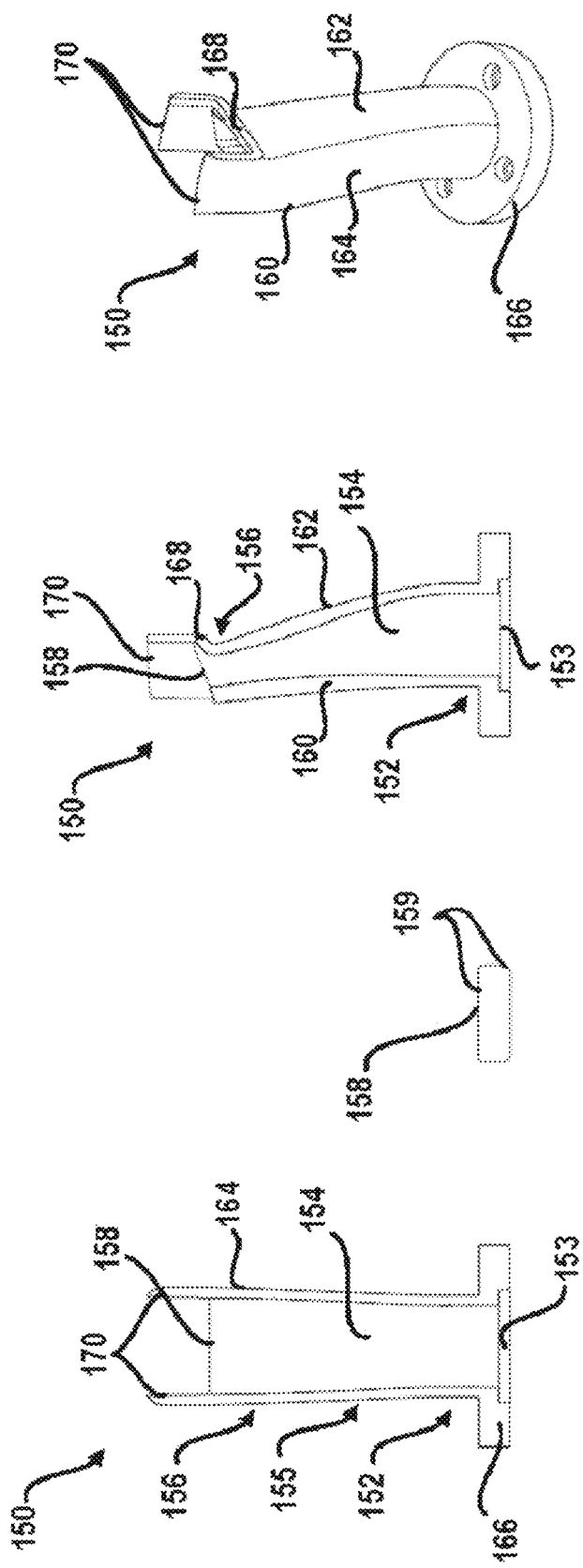

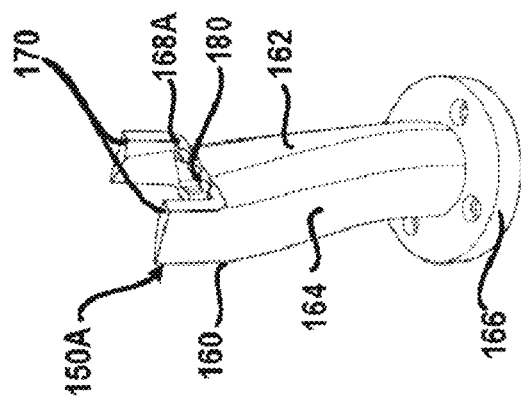
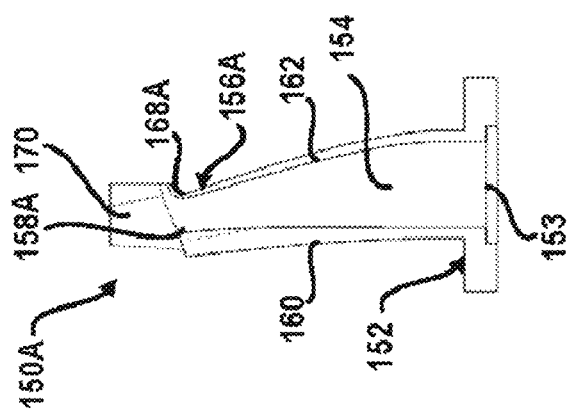
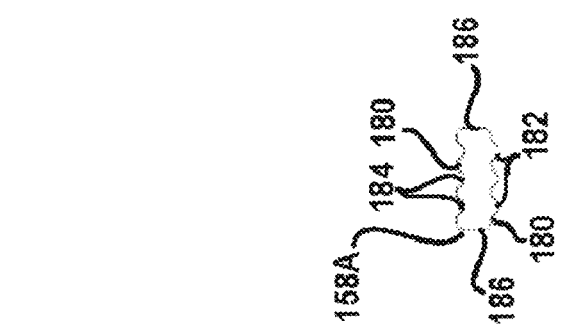
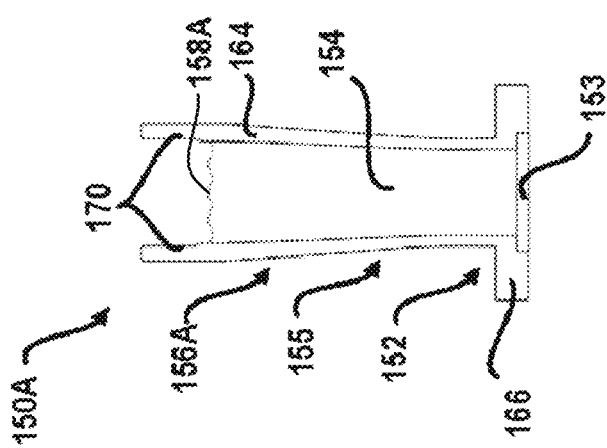

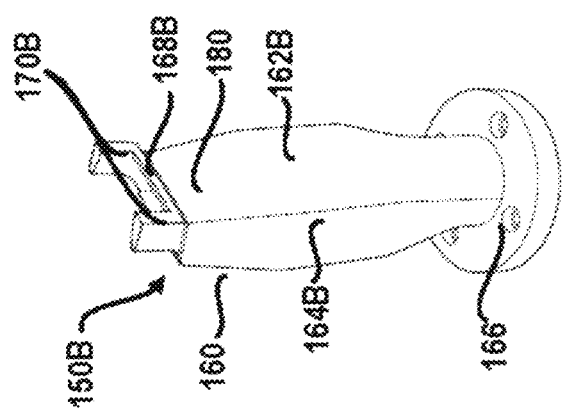
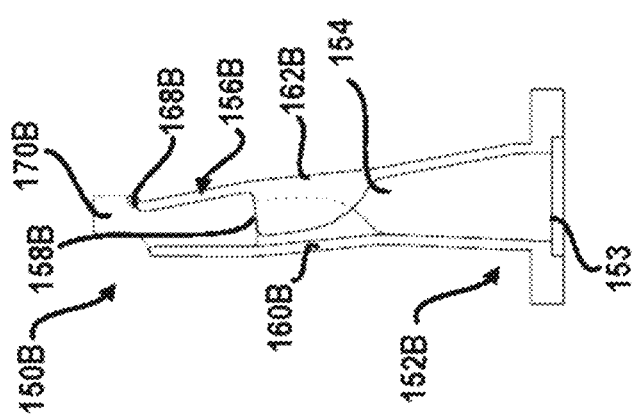
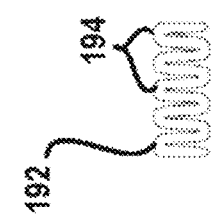
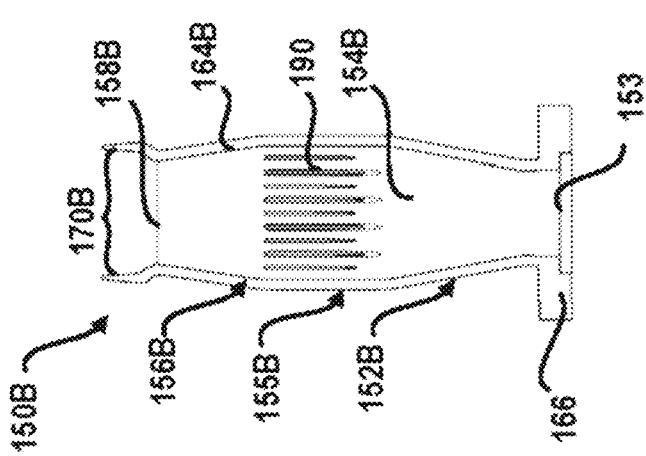

Flow-table test

Flow-table test

Green Strength test

P - 1L - 28d

C - 13 - 28d

Tensile stress-strain curves and crack pattern of ECC specimen

Inter - G - 28d

Intra - S - 28d
Load-displacement curves of fracture test

Inter - S - 28d

Inter - G - 28d

Fracture behavior of three-point bending specimen

Interfacial fracture toughness at different curing ages

ADDITIVE MANUFACTURING OF ENGINEERED CEMENTITIOUS COMPOSITES

CROSS-REFERENCE TO RELATED APPLICATION

This application is a U.S. National Phase Application under 35 U.S.C. 371 of International Application No. PCT/US2021/040387, filed on Jul. 2, 2021, which claims the benefit of U.S. Provisional Application No. 63/048,019, filed on Jul. 3, 2020. The entire disclosures of the above applications are incorporated herein by reference.

FIELD

The present disclosure relates to methods of additive manufacturing of an engineered cementitious composite (ECC) structure with an automated robotic printing device, such as a computer numerical control (CNC) printing machine, with a tiltable deposition head/extruder tool having a specially designed extrusion nozzle that forms the engineered cementitious composite (ECC) structure having smooth sides.

BACKGROUND

This section provides background information related to the present disclosure which is not necessarily prior art.

Additive manufacturing (AM), more commonly referred to as 3D printing, is a process by which material is applied in an additive, layer-by-layer formation technique. Additive manufacturing can form structures having highly complex geometries and freeform shapes. Thus, additive manufacturing has attracted significant commercial interest, especially in the construction industry, due to its potential to reduce time, labor, and material use, while improving overall building performance through computational optimization. The most promising application for the construction industry focuses on concrete, where a significant portion of the construction cost is attributed to formwork production, often as much as 50% of total project cost. Concrete additive manufacturing or concrete three-dimensional printing –3DP (3DCP) holds the promise of reducing or eliminating the need for molds. One challenge to this process is that layer-based extrusion approaches do not yield surface finishes, which can compete with molded concrete. Many form structures with sides that are uneven and bumpy. While hybrid approaches, such as robotically post-finishing a deposited surface or troweling have been tested, there are limitations to the geometric freedom of the printing process and overall formal complexity of the printed part.

Another widely discussed challenge to the adoption of 3DCP is the difficulty of combining the process with existing methods of reinforcement, which is required due to the brittle nature of concrete materials. Novel approaches to overcoming this limitation have been explored, including embedding continuous reinforcement, such as steel cables, as well as post-tensioning of structures. Both approaches present compromises in the printing process or limit the design freedom of 3DP structures. Engineered Cementitious Composites (ECC) (also known as Strain-hardening Cement-based Composites, SHCC) are a class of materials which were developed to challenge the notion of concrete as a brittle material, and have been shown to possess significant ductility (e.g., as much as 400× that of normal mortars). ECCs typically contain fibers, for example, polyvinyl alcohol (PVA) or polyethylene (PE) fibers. However, the presence of these fibers poses significant challenges when attempting 3DCP, because they can frequently cause clumping and agglomerate to block the flow in the system. Thus, printing devices having the ability to form superior structures having smooth sidewalls from an engineered cementitious composite (ECC), while avoiding the processing challenges of additive manufacturing or printing processes of such materials would be highly desirable.

SUMMARY

This section provides a general summary of the disclosure, and is not a comprehensive disclosure of its full scope or all of its features.

In certain variations, the present disclosure relates to an automated printing device for additive manufacturing of an engineered cementitious composite (ECC) structure. The device comprises a feeding system comprising at least one pump configured to pump an engineered cementitious composite (ECC) composition in a fresh state. An automated extrusion system configured to receive the ECC composition from the feeding system and to deposit the cementitious composition onto a target. The automated extrusion system comprises at least one robotic device comprising a tiltable and steerable deposition head that comprises an extrusion nozzle. The extrusion nozzle has a substantially rectangular opening and at least one shaping blade at a terminal end to shape and deposit the cementitious composition onto a target.

In one aspect, the extrusion nozzle defines an entry region that passes into a transition region to the terminal end of the extrusion nozzle. The terminal end defines a terminal opening having a first cross-sectional area that is smaller than a second cross-sectional area in either the transition region and/or the entry region.

In one further aspect, the transition region comprises at least one flat wall that is perpendicular to the substrate and at least one curved wall configured to shift the center point of the extruder nozzle.

In one further aspect, the transition region comprises at least two curved or contoured walls.

In one aspect, an interior cavity of the extrusion nozzle comprises at least one baffle component configured to shape the cementitious composition as it exits the substantially rectangular opening.

In one aspect, the at least one shaping blade is fixed with respect to the terminal end of the extrusion nozzle.

In one aspect, the at least one shaping blade is retractable with respect to the terminal end of the extrusion nozzle.

In one aspect, the at least one shaping blade is a pair of shaping blades having a distance between them of greater than or equal to about 25 mm to less than or equal to about 100 mm.

In one aspect, the at least one shaping blade has a length of greater than or equal to about 5 mm to less than or equal to about 30 mm.

In one aspect, the substantially rectangular opening of the nozzle has a width of greater than or equal to about 10 mm to less than or equal to about 75 mm and a length of greater than or equal to about greater than or equal to about 10 mm to less than or equal to about 75 mm.

In one aspect, the substantially rectangular opening of the nozzle has a width of about 10 mm and a length of about 30 mm.

In one aspect, the substantially rectangular cross section includes at least one wall defining an undulated or corrugated pattern.

In one aspect, the extrusion nozzle has a length of greater than or equal to about 6 inches to less than or equal to about 15 inches.

In one aspect, the extrusion nozzle is rotatable by 360°.

In one aspect, the automated extrusion system is at least partially controlled by a computer numerical control (CNC) system.

In one aspect, the at least one pump the feeding system comprises a peristaltic pump or a progressive cavity pump.

In one aspect, the automated extrusion system comprises a synchronous deposition pump.

In one aspect, the automated extrusion system further comprises a pressure transducer and a progressive cavity pump disposed between the feeding system and the tiltable and steerable deposition head.

In one aspect, the at least one robotic device has an end effector comprising the tiltable and steerable deposition head that has at least six degrees of freedom.

In certain variations, the present disclosure relates to a method of additive manufacturing of an engineered cementitious composite (ECC) structure. The method may comprise extruding an engineered cementitious composite (ECC) composition in a fresh state by passing the ECC composition through an extrusion nozzle having a substantially rectangular opening and at least one shaping blade at a terminal end of the nozzle to deposit the cementitious composition onto a target. In the fresh state the ECC composition is flowable and extrudable and comprises a plurality of fibers. After the depositing, the ECC composition forms a hardened state that defines the engineered cementitious composite (ECC) structure having smooth sides and exhibiting a uniaxial tensile strength of greater than or equal to about 2.5 MPa, a tensile strain capacity of greater than or equal to about 2%, and a compressive strength at 100 hours of greater than or equal to about 20 MPa.

In one aspect, the target is a substrate or the target is the cementitious composition in a hardened state that was previously deposited via the additive manufacturing process.

In one aspect, the extruding of engineered cementitious composite (ECC) composition in a fresh state deposits a layer on the target having an interface surface comprising a plurality of grooves.

In one aspect, the substantially rectangular cross section includes at least one wall defining an undulated or corrugated pattern that forms the plurality of grooves.

In one aspect, the extrusion nozzle defines an entry region that passes into a transition region to the terminal end of the extrusion nozzle. The terminal end defines a terminal opening having a first cross-sectional area that is smaller than a second cross-sectional area in either the transition region and/or the entry region.

In one aspect, the transition region comprises at least one flat wall that is perpendicular to the substrate and at least one curved wall configured to shift the center point of the extruder nozzle.

In one aspect, the at least one shaping blade is fixed with respect to the terminal end or retractable with respect to the terminal end.

In one aspect, the at least one shaping blade is a pair of shaping blades having a distance between them of greater than or equal to about 25 mm to less than or equal to about 100 mm.

In one aspect, the at least one shaping blade has a length of greater than or equal to about 5 mm to less than or equal to about 30 mm.

In one aspect, the substantially rectangular opening of the nozzle has a width of greater than or equal to about 10 mm to less than or equal to about 75 mm and a length of greater than or equal to about greater than or equal to about 10 mm to less than or equal to about 75 mm.

In one aspect, the substantially rectangular opening of the nozzle has a width of about 10 mm and a length of about 30 mm.

In one aspect, the extrusion nozzle is rotatable by 360°.

In one aspect, the method further comprises feeding the engineered cementitious composite (ECC) composition in a fresh state through a feeding system to an automated extrusion system of a robotic printing device comprising the tiltable deposition head with the extrusion nozzle.

In one further aspect, the automated extrusion system is at least partially controlled by a computer numerical control (CNC) system.

In one further aspect, the feeding system comprises at least one peristaltic pump or progressive cavity pump that is pressure controlled.

In one further aspect, the automated extrusion system comprises a synchronous deposition pump.

In one further aspect, the automated extrusion system further comprises a pressure transducer and a progressive cavity pump disposed between the feeding system and the tiltable and steerable deposition head.

In one further aspect, the feeding system comprises at least one peristaltic pump that is pressure controlled, so that the pressure transducer is disposed at the inlet of the progressive cavity pump and provides feedback to the peristaltic pump to maintain a constant inlet pressure.

In one further aspect, inlet pressure is maintained to greater than or equal to about 30 psi to less than or equal to about 50 psi.

In one further aspect, the at least one robotic device has an end effector comprising the tiltable and steerable deposition head that has at least six degrees of freedom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an image of a robotic printing device for additive manufacturing or three-dimensional printing prepared in accordance with certain aspects of the present disclosure.

FIGS. 2A-2D show additively manufactured structures prepared in accordance with certain aspects of the present disclosure. More specifically, FIGS. 2A-2D are illustrations showing the effect of tool orientation, nozzle shape, and toolpath strategy on wall cross-section in v-w plane. FIG. 2A shows a constant layer height, with a vertical tool and no bead shaping. FIG. 2B shows a constant layer distance with a vertical tool and no bead shaping. FIG. 2C shows a constant layer distance with a vertical tool and a shaped bead. FIG. 2D show a constant layer distance with a tilting tool having a shaped bead.

FIGS. 3A-3C show three distinct extrusion nozzle designs illustrating certain principles of the present disclosure. FIG. 3A shows a first extrusion nozzle configuration. FIG. 3B shows a second extrusion nozzle configuration having a terminal end with a first cross-sectional area that is smaller than a second cross-sectional area in an entry region. FIG. 3C shows a third extrusion nozzle configuration having a terminal end with a first cross-sectional area that is smaller than a second cross-sectional area in an entry region, where the nozzle has at least one flat wall and at least one curved wall.

FIGS. 4A-4B are extrusion nozzle designs with a pair of fixed shaping blades prepared in accordance with certain aspects of the present disclosure. FIG. 4A is an axonometric view of extrusion nozzle having the pair of fixed shaping blades. FIG. 4B shows side shaping blades with a minimum centerline radius.

FIGS. 5A-5D show another extrusion nozzle design prepared in accordance with certain aspects of the present disclosure having a pair of fixed shaping blades. FIG. 5A (sectional front view), 5C (sectional side view) and 5D (perspective view) are different views of an extrusion nozzle, while FIG. 5B shows a cross-sectional area of a rectangular shape of a terminal opening.

FIGS. 6A-6D show yet another extrusion nozzle design prepared in accordance with certain aspects of the present disclosure having a pair of fixed shaping blades. FIG. 6A (sectional front view), 6C (sectional side view) and 6D (perspective view) are different views of an extrusion nozzle, while FIG. 6B shows a cross-sectional area of a substantially rectangular shape of a terminal opening having two walls with an undulated or corrugated pattern.

FIGS. 7A-7D show another extrusion nozzle design prepared in accordance with certain other aspects of the present disclosure having a pair of fixed shaping blades. FIG. 7A (sectional front view), 7C (sectional side view) and 7D (perspective view) are different views of extrusion nozzle that includes a baffle component inside the flow cavity, while FIG. 7B shows a cross-sectional view of an extruded ECC material shape having a plurality of folds.

FIGS. 8A-8B show two ECC material structures formed by an additive manufacturing process where minimal shaping due to extrusion nozzle shape occurs, showing walls having delineated layers and uneven surface finish. In FIG. 8A, a round column is formed, while in FIG. 8B, a rectangular column with a twisted orientation is formed.

FIGS. 9A-9B. FIG. 9A shows a picture of a double curved face printed on a finished mold by certain processes provided in accordance with the present disclosure. FIG. 9B shows the internal stiffening ribs and flanges printed inside the mold having variable layer thicknesses.

FIGS. 10A-10C show a twisted, hollow column which bifurcates and recombines twice in elevation printed from an ECC material in accordance with certain aspects of the present disclosure. FIG. 10A shows a graphical illustration of a section through the printed column. FIG. 10B shows an additively manufactured ECC structure printed from this design. FIG. 10C shows a close up showing the layer surface finish.

FIG. 14A shows a flow-table test, FIG. 14B shows a shape-retention test, and FIG. 14C shows a green-strength test.

Figure 15B:
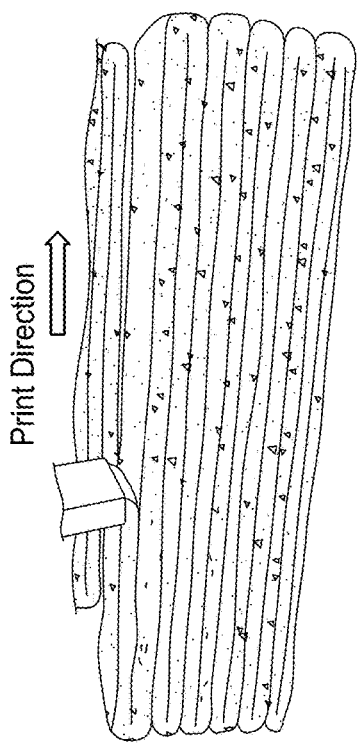
Figure 15A:
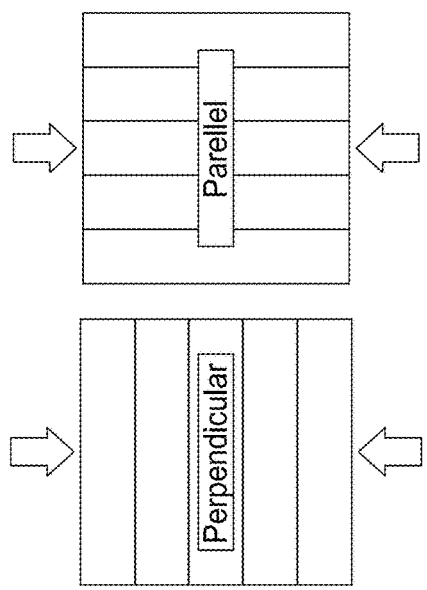

FIGS. 15A-15B show loading directions during testing of printable ECC composition (3DP-ECC) specimens. FIG. 15A shows layers in a perpendicular or parallel direction. FIG. 15B shows deposited layers with respect to a print direction.

Figure 16B:
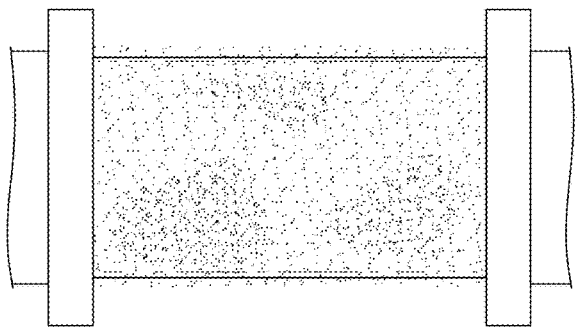
Figure 16A:
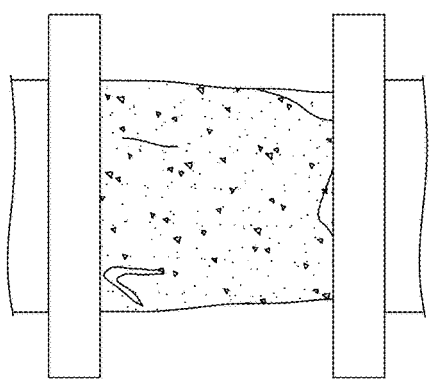

FIGS. 16A-16B show a compressive test setup for printable ECC composition (3DP-ECC) specimens. FIG. 16A shows a cube specimen and FIG. 16B shows a prism specimen.

Figure 17C:
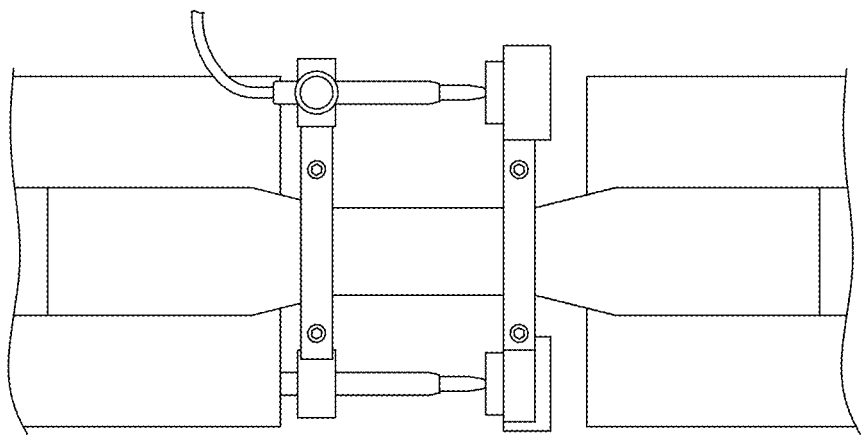
Figure 17B:
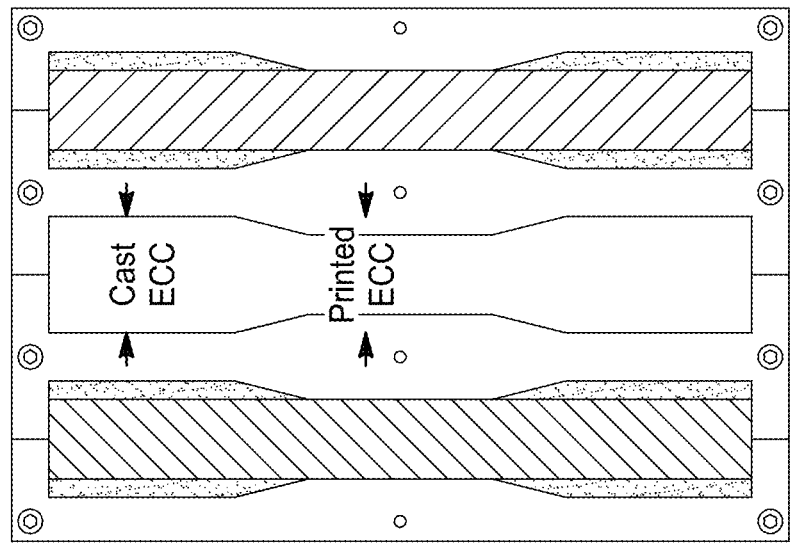
Figure 17A:
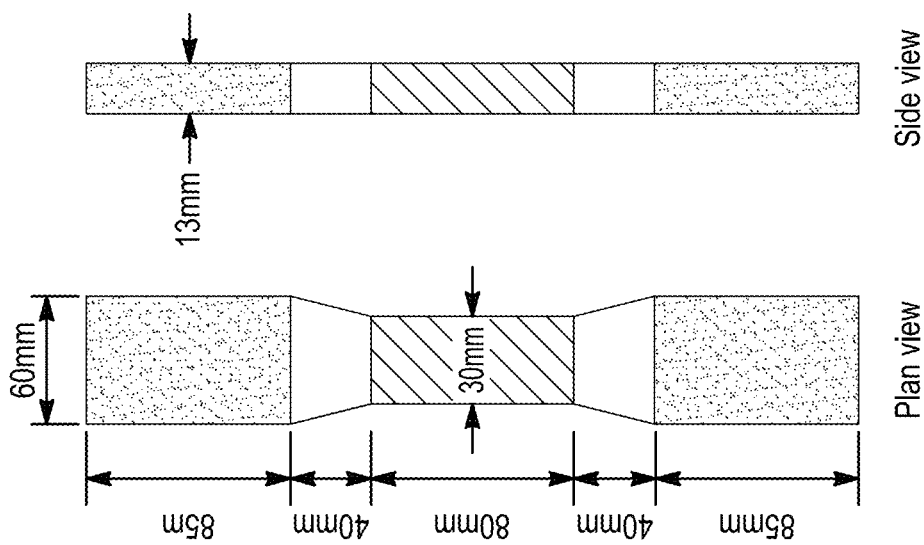

FIGS. 17A-17C are images of a tensile specimen and test setup. FIG. 17A shows specimen dimensions. FIG. 17B shows a printed specimen for testing. FIG. 17C shows a tensile test setup.

Figure 18A:
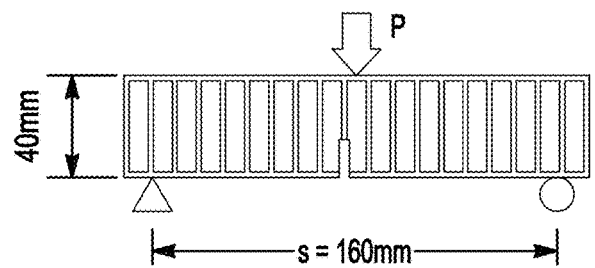
Figure 18B:
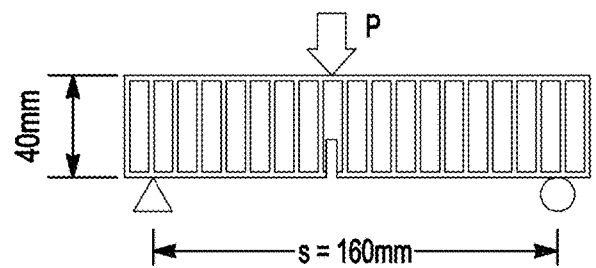

FIGS. 18A-18B are illustrations of geometry of three-point bending specimen.

FIG. 18A is an interlayer notch and FIG. 18B is an intra-layer notch.

Figure 19A:
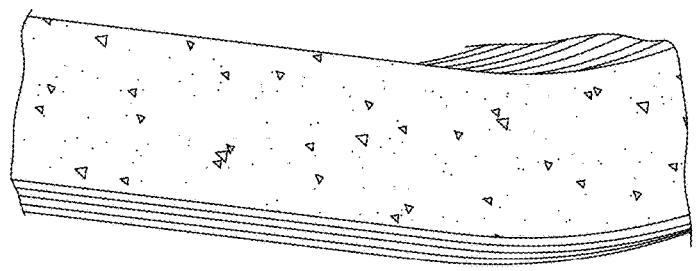
Figure 19B:
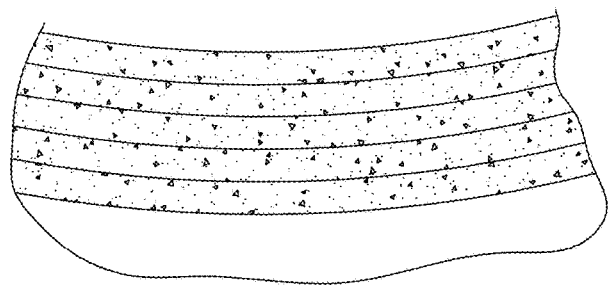

FIGS. 19A-19B are images of surface treatments of printed specimen of printable ECC composition (3DP-ECC). FIG. 19A has a smooth interface surface and FIG. 19B has a grooved interface surface.

Figure 20A:
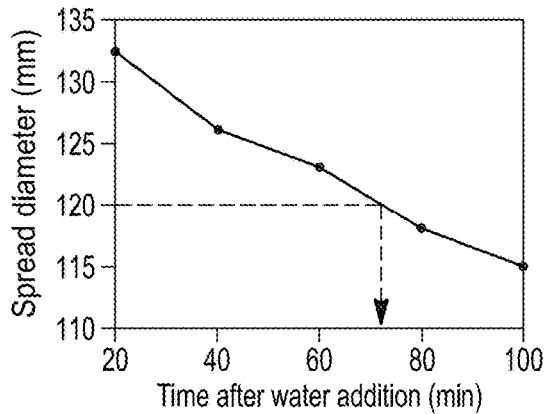
Figure 20B:
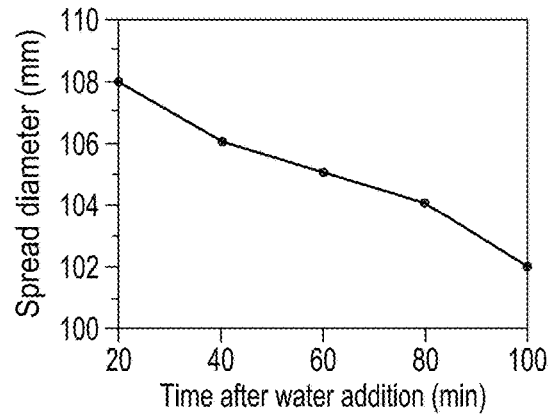
Figure 20C:
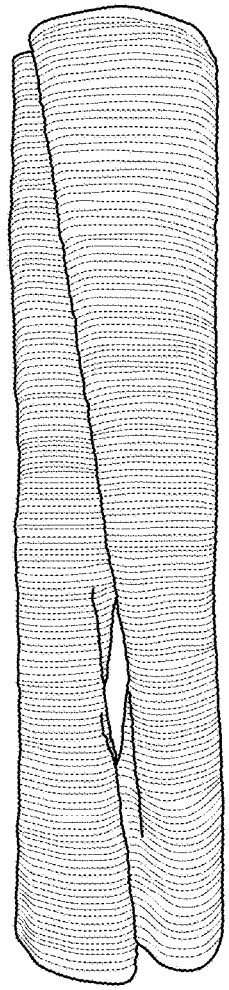

FIGS. 20A-20C show rheological properties of fresh ECC. FIG. 20A is a graph of flowability. FIG. 20B is a graph of shape retention and FIG. 20C is a picture of ⅕ m high printable ECC composition (3DP-ECC) twisted column with 150 layers.

Figure 21A:
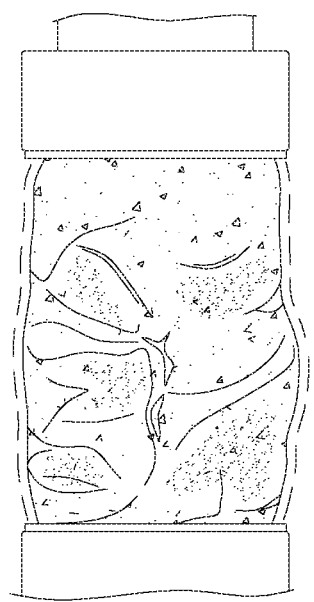
Figure 21B:
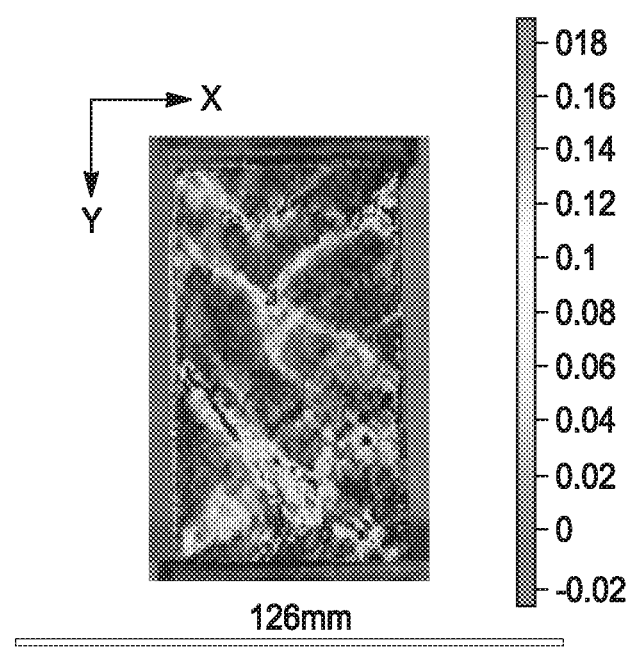
Figure 21C:
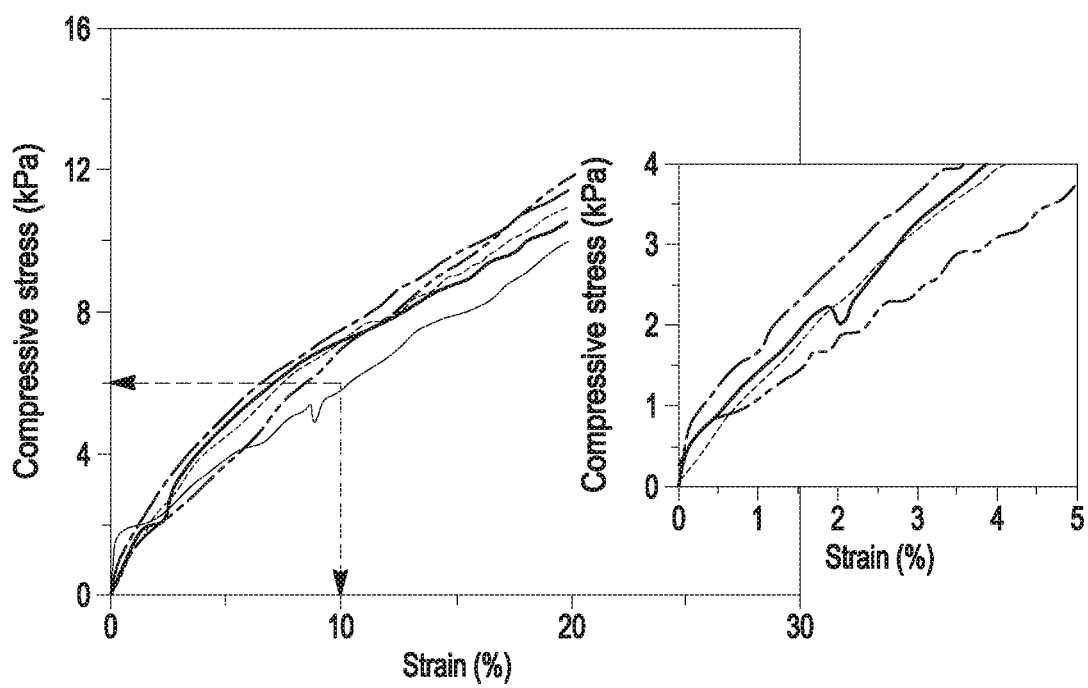

FIGS. 21A-21C shows green property of fresh EXX at $T_{20}$. FIG. 21A shows failure mode. FIG. 21B shows strain-contour. FIG. 21C shows stress-strain curves.

Figure 22A:
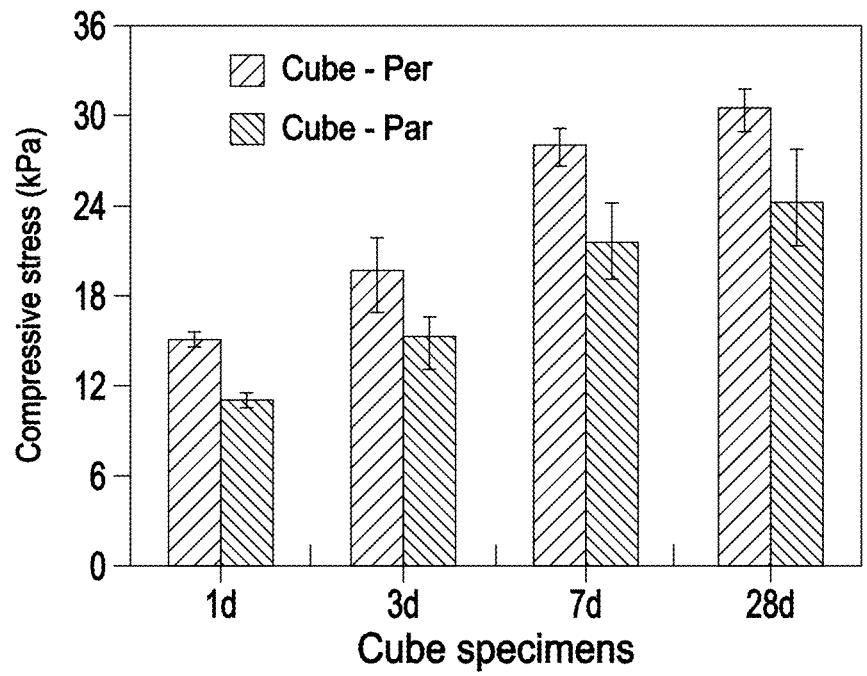
Figure 22B:
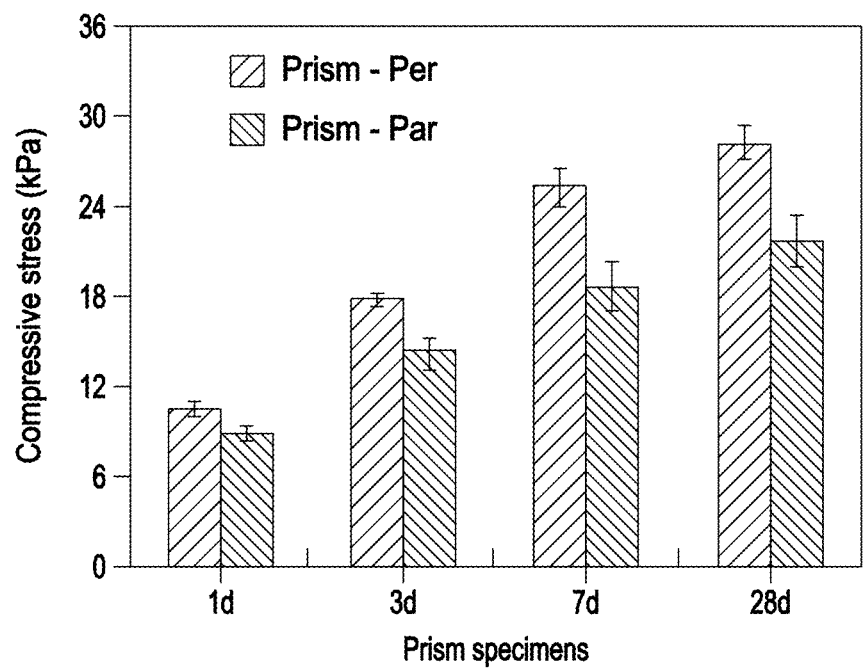

FIGS. 22A-22B are graphs of compressive strength development. FIG. 22A shows cube specimens with perpendicular and parallel orientations. FIG. 22B shows prism specimens with perpendicular and parallel orientations.

Figure 23A:
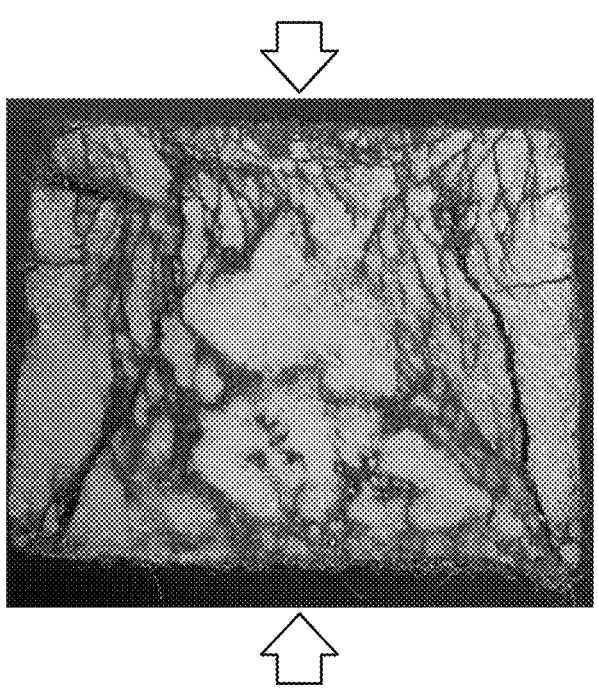
Figure 23B:
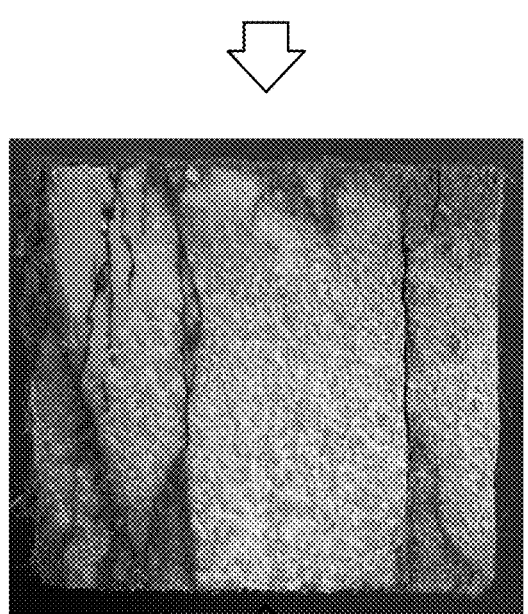
Figure 23C:
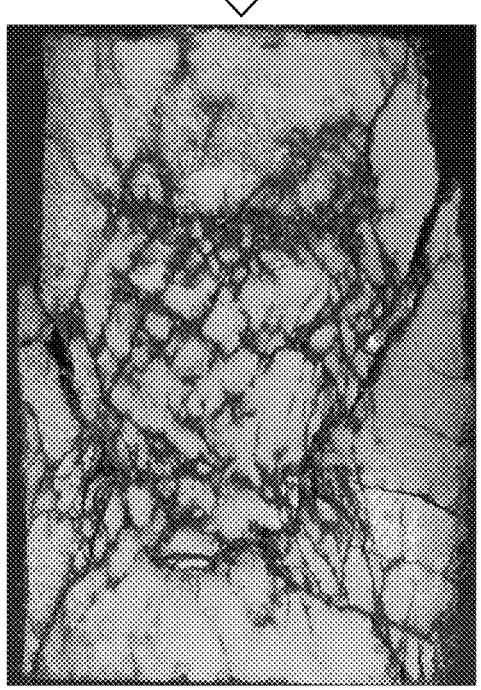
Figure 23D:

FIGS. 23A-23D are images of failure modes of cube and prism specimens at 28 days (arrows indicate the loading direction). FIG. 23A is a cube specimen with a perpendicular orientation. FIG. 23B is a cube specimen with a parallel orientation. FIG. 23C is a prism specimen with a perpendicular orientation. FIG. 23D is a prism specimen with a parallel orientation.

Figure 24A:
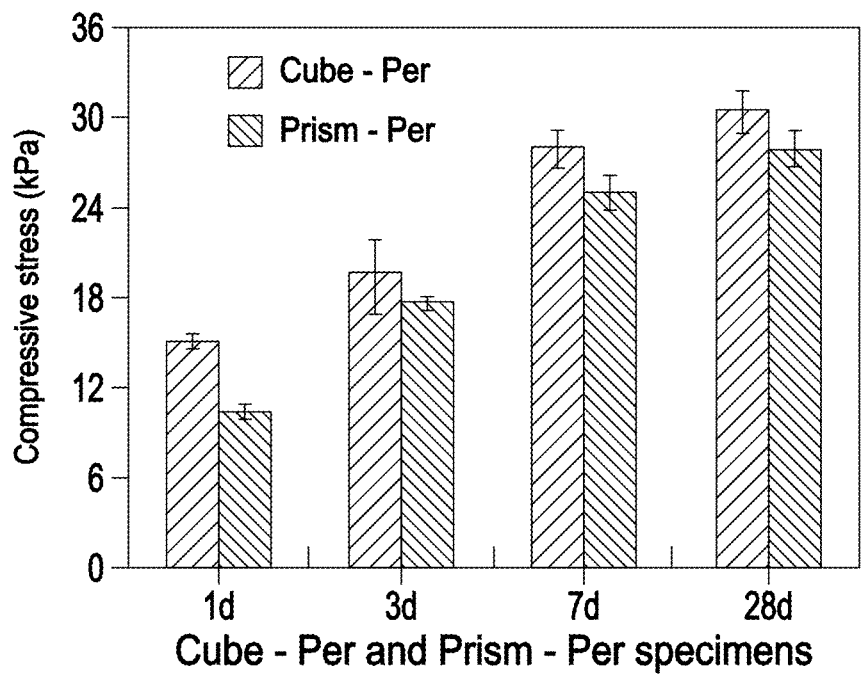
Figure 24B:
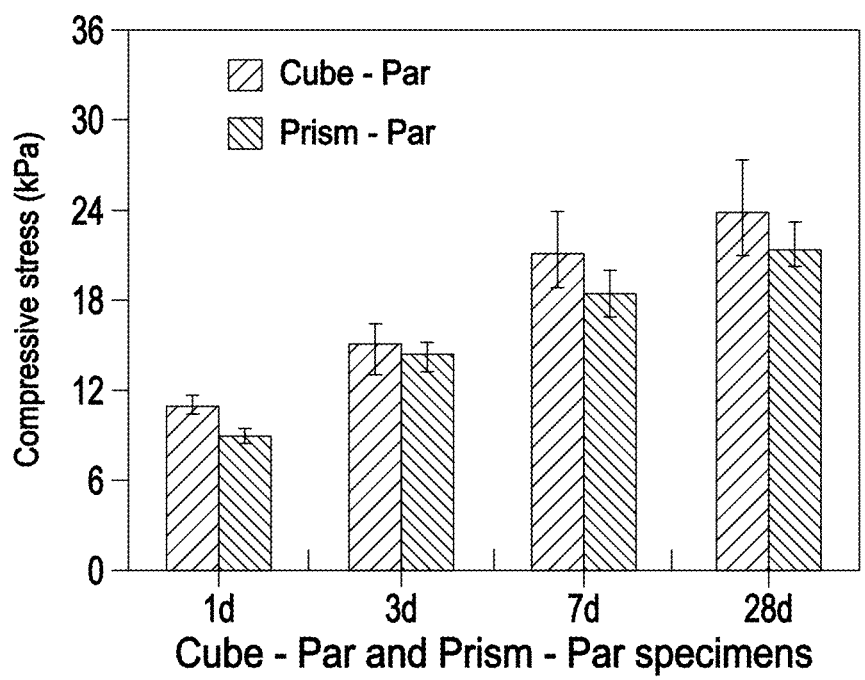

FIGS. 24A-24B are graphs of compressive strength development of cube and prism specimens. FIG. 24A shows both a cube specimen with a perpendicular orientation and a prism specimen with a perpendicular orientation. FIG. 24B shows both a cube specimen with a parallel orientation and a prism specimen with a parallel orientation.

Figure 25A:
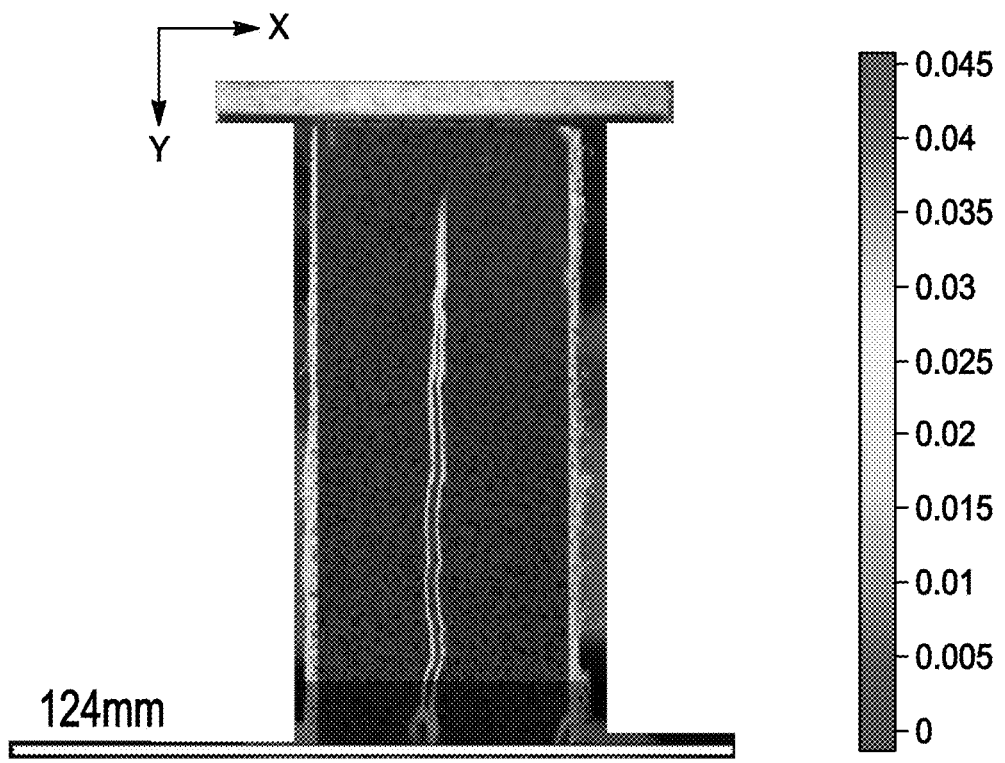
Figure 25B:
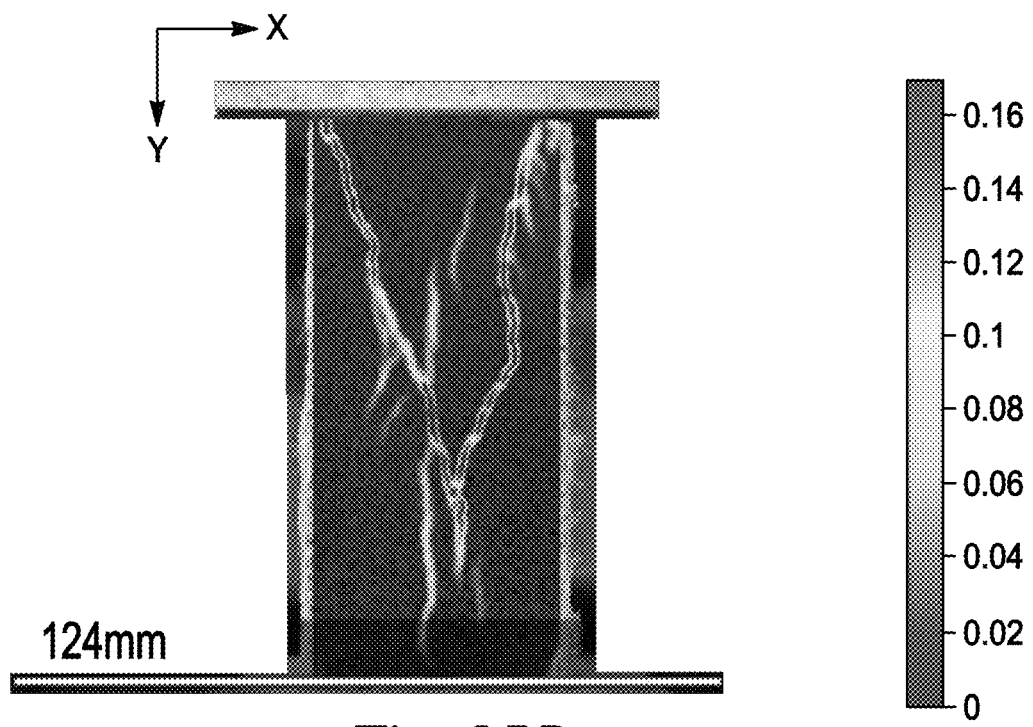

FIGS. 25A-25D are DIC images of prism specimens. FIG. 25A is crack initiation of a prism specimen with a parallel orientation (Prism-Par). FIG. 25B is a failure pattern for a prism specimen with a parallel orientation (Prism-Par). FIG. 27C shows crack initiation of prism specimen with a perpendicular orientation (Prism-Per). FIG. 27D is a failure pattern of a prism specimen with a perpendicular orientation (Prism-Per).

Figure 26B:
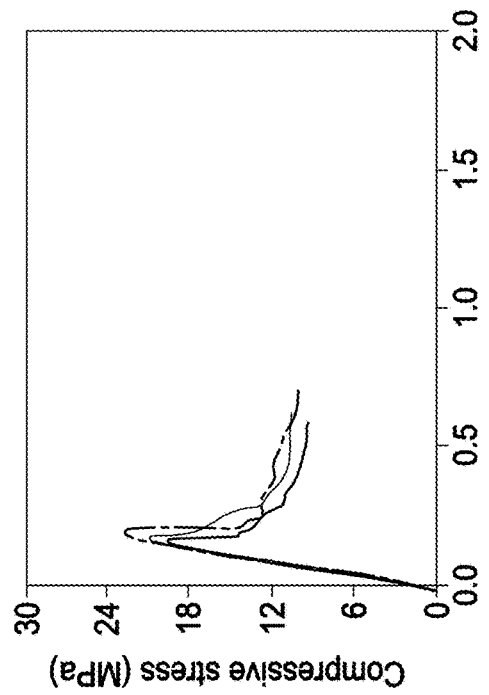
Figure 26A:
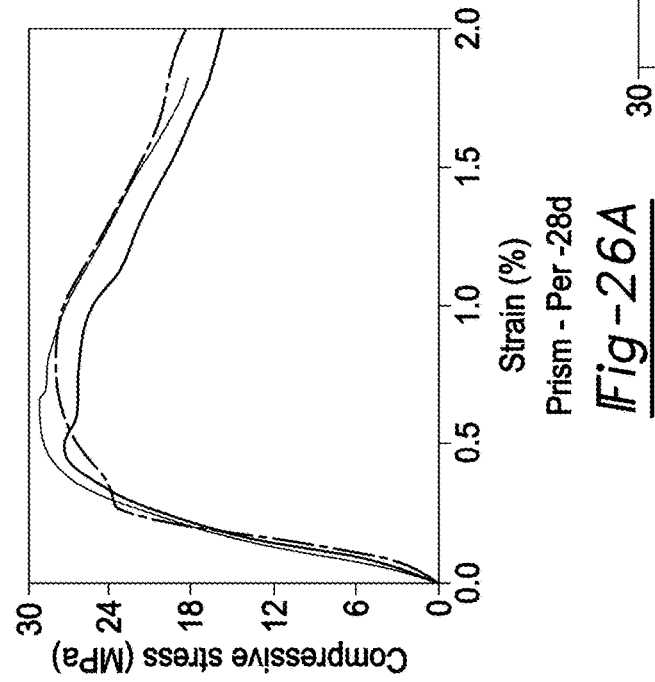
Figure 26C:
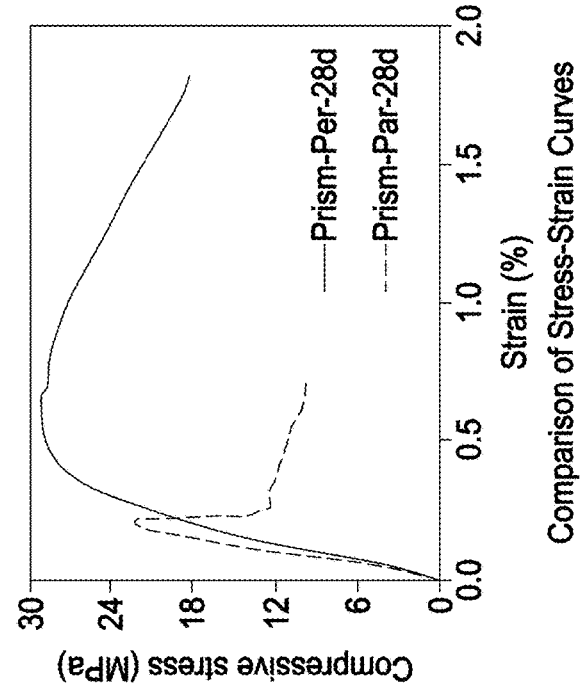

FIGS. 26A-26C are compressive stress-strain curves of a printable ECC composition (3DP-ECC) prism. FIG. 26A is a prism specimen with a perpendicular orientation at 28 days (Prism-Per-28d). FIG. 26B is a prism specimen with a parallel orientation at 28 days (Prism-Par-28d). FIG. 28C is a comparison of stress-strain curves.

Figure 27A:
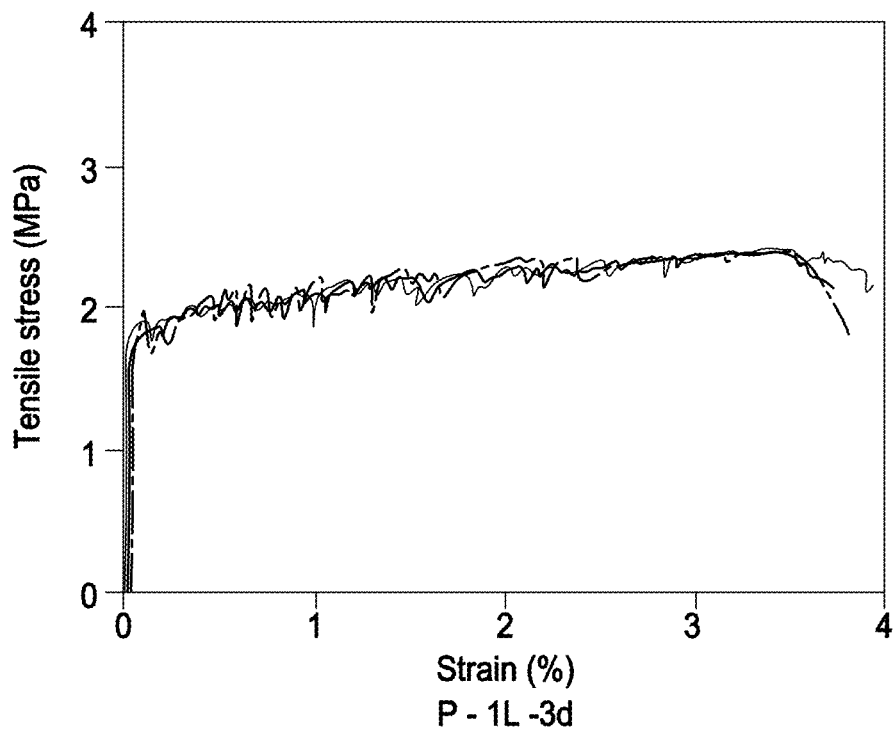
Figure 27B:
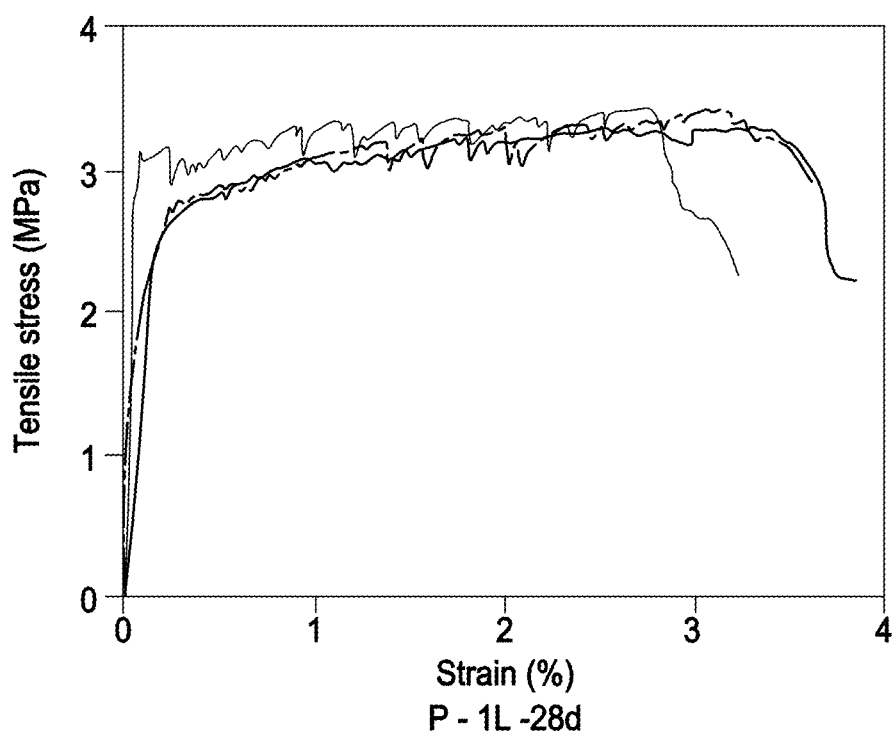
Figure 27C:
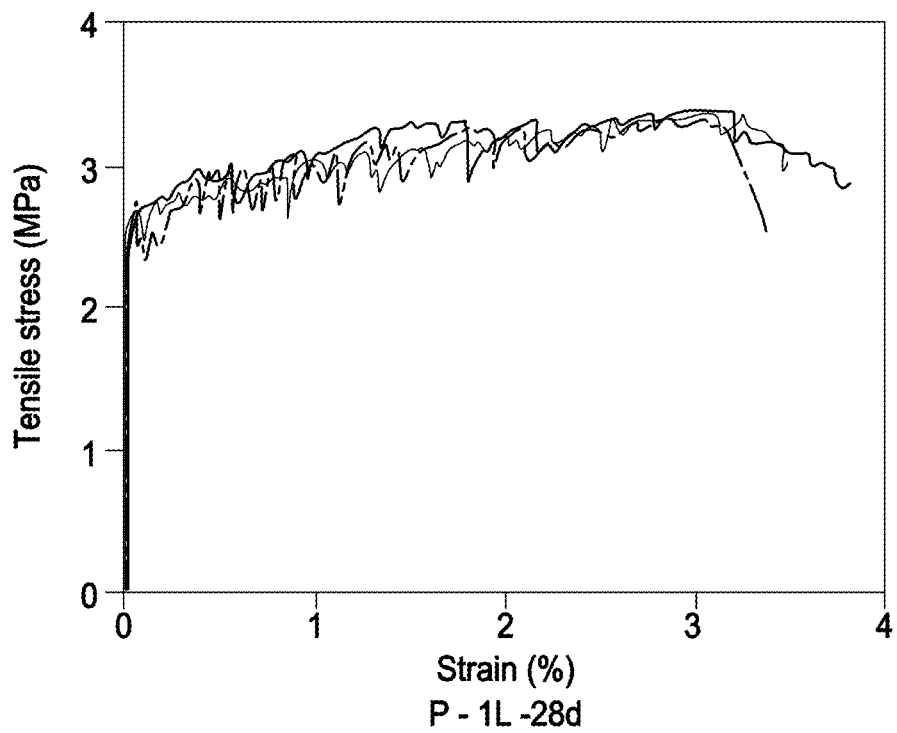
Figure 27D:
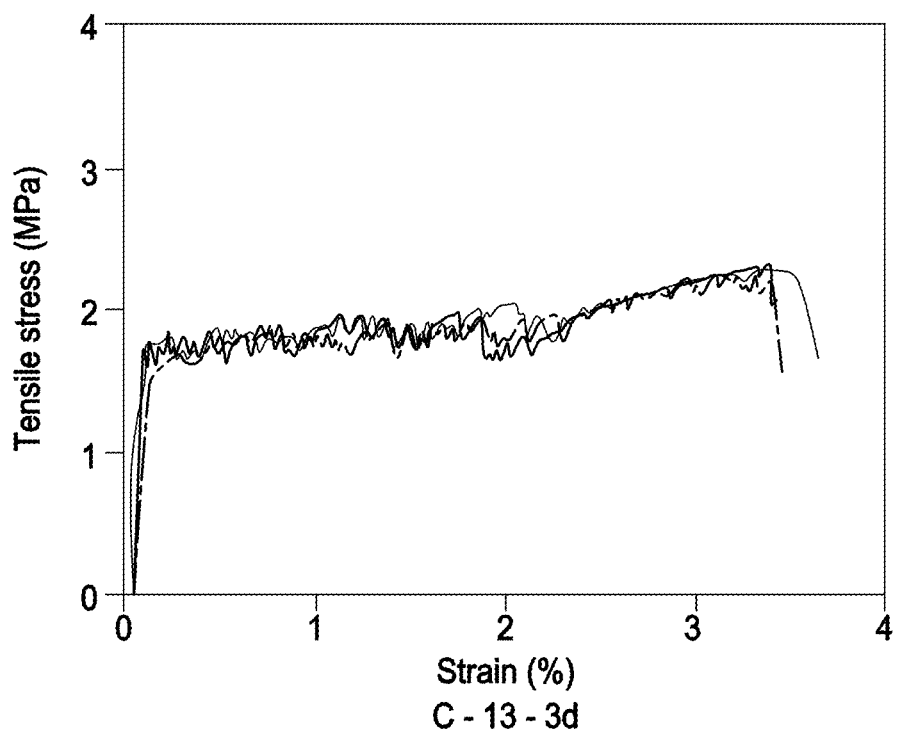
Figure 27E:
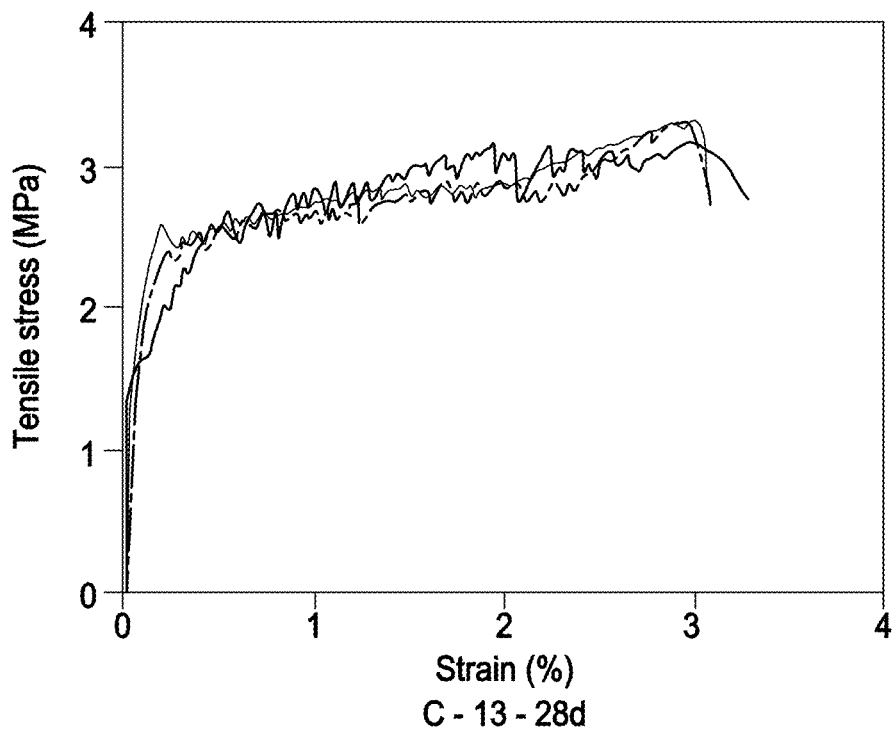
Figure 27F:
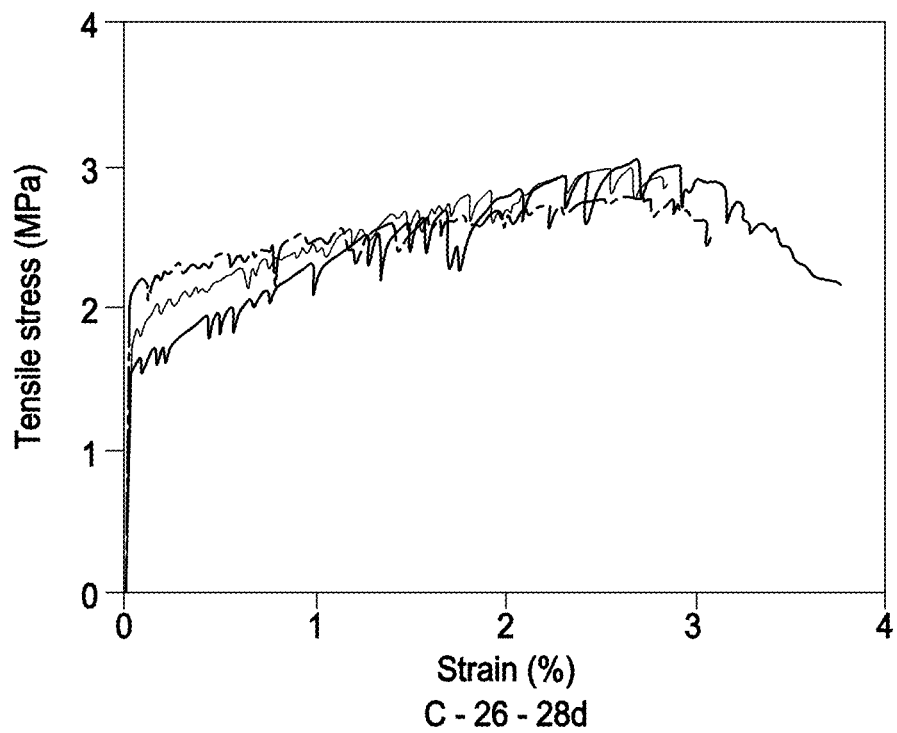
Figure 27G:
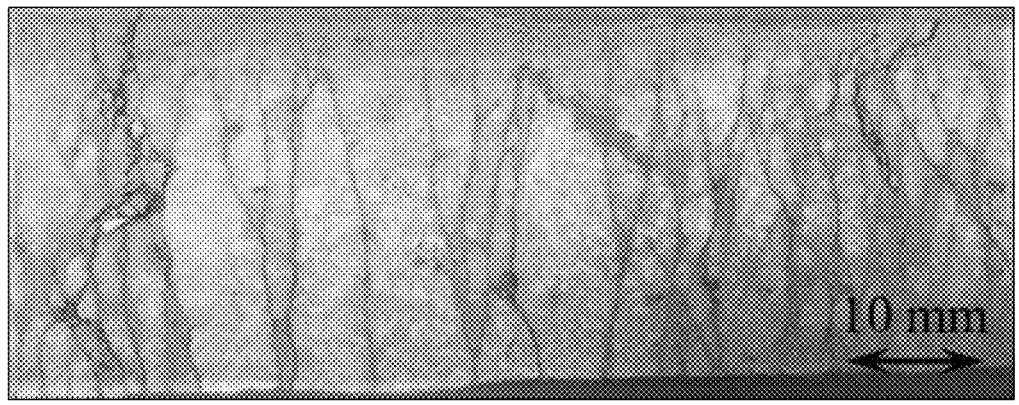
Figure 27H:
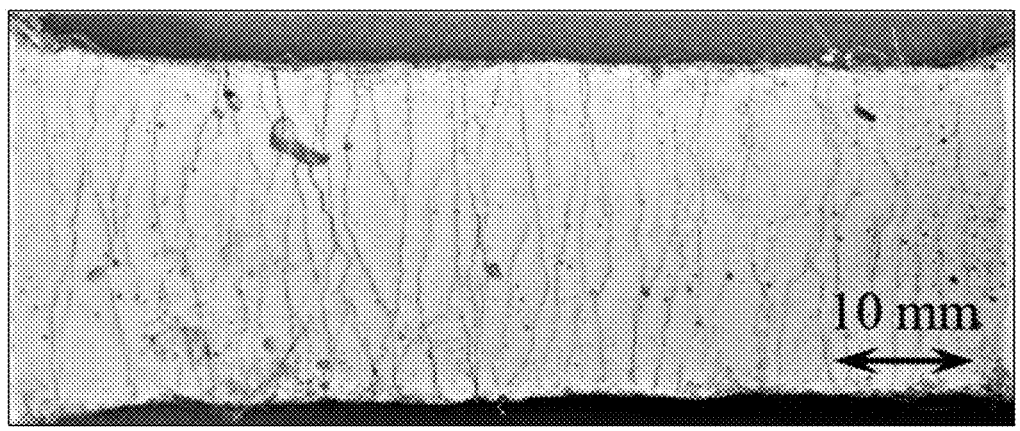

FIGS. 27A-27H are tensile stress-strain curves and crack pattern of ECC specimens. FIG. 27A shows P-1L-3d (3 day). FIG. 27B show P-1L-28d (28 day). FIG. 27C shows P-2L-28d (28 day). FIG. 27D shows C-13-3d (3 day). FIG. 27E shows C-13-28d (28 day). FIG. 27F shows C-26-28d (28 day). FIG. 27G shows P-1L-28d (28 day). FIG. 27H shows C-13-28d (day).

Figure 28A:
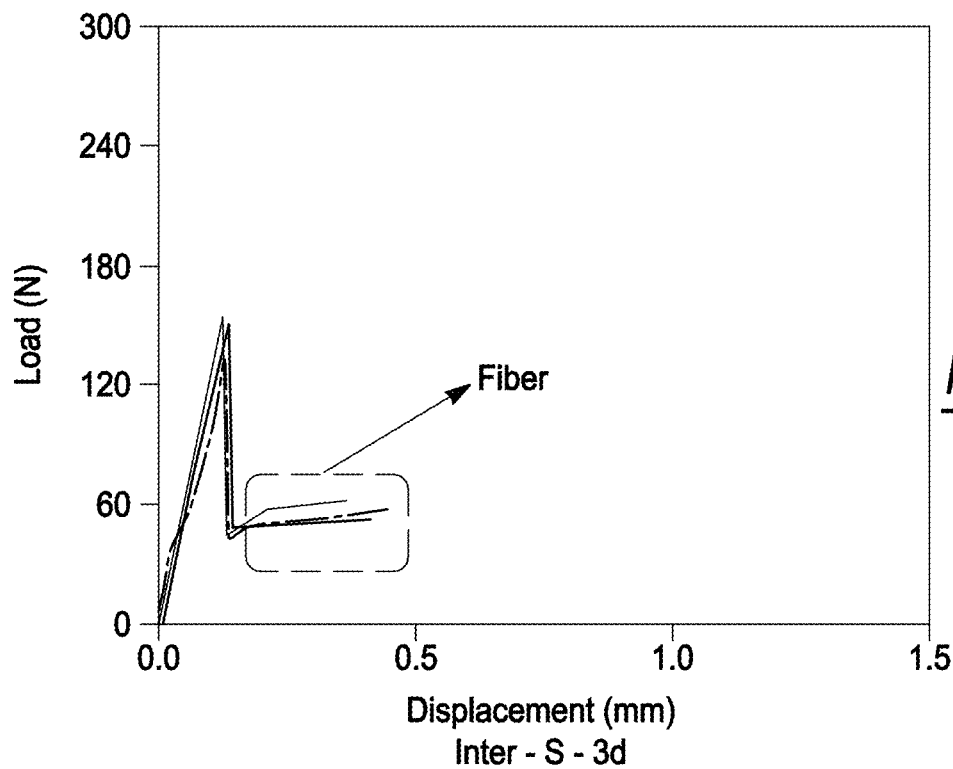
Figure 28B:
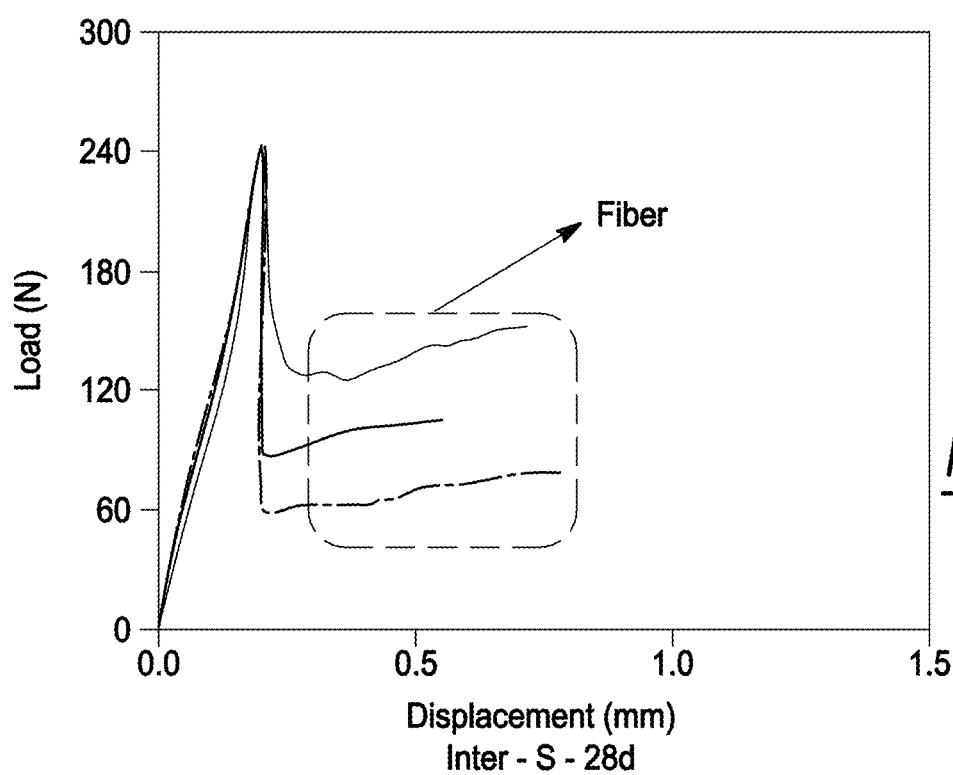
Figure 28C:
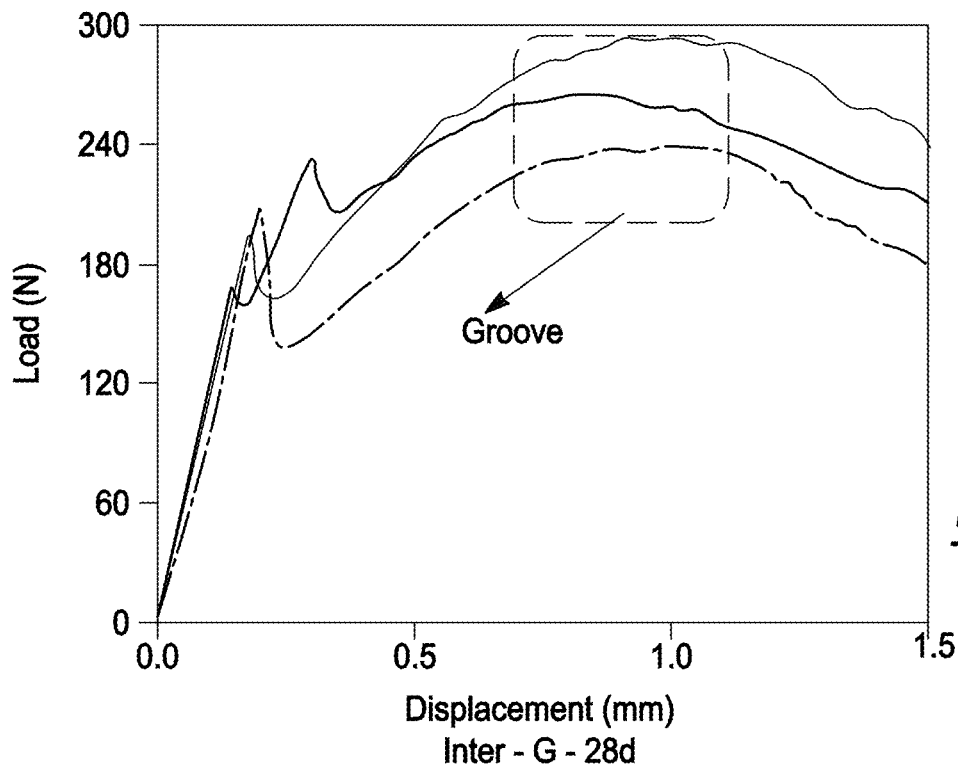
Figure 28D:
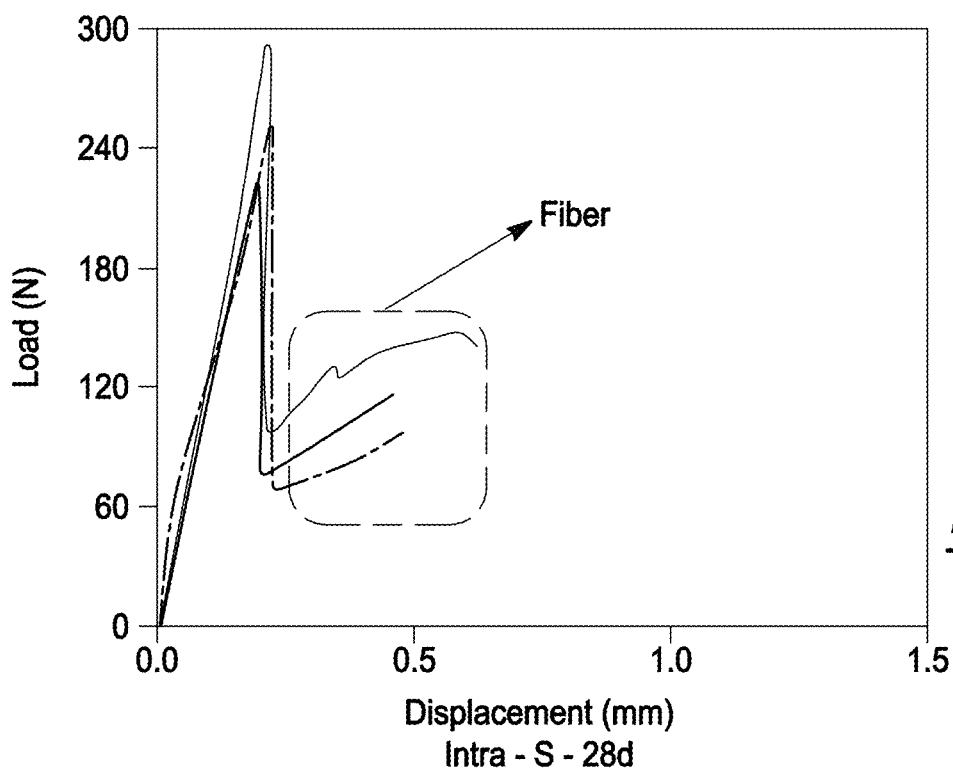

FIGS. 28A-28D are load-displacement curves of fracture test. FIG. 28A shows Inter-S-3d 9 (3 day). FIG. 28B shows Inter-S-28d (28 day). FIG. 28C shows Inter-G-28d (28 day). FIG. 28D shows Intra-S-28d (28 day).

Figure 29A:
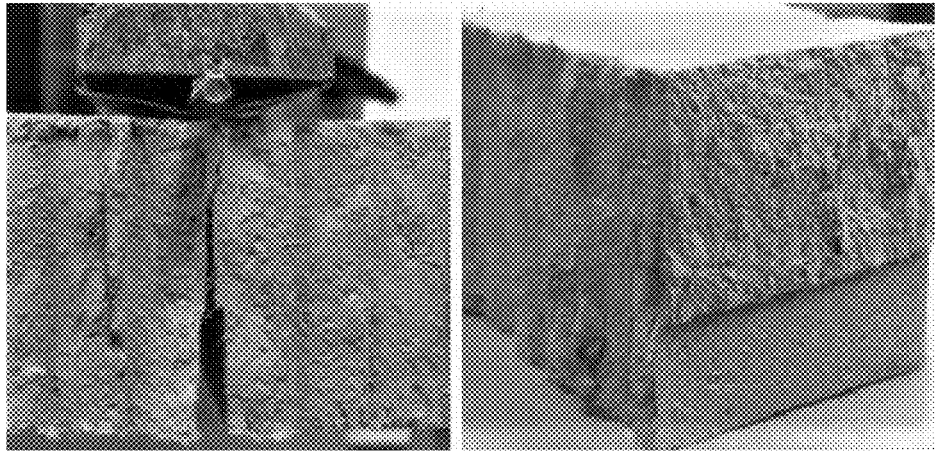
Figure 29B:
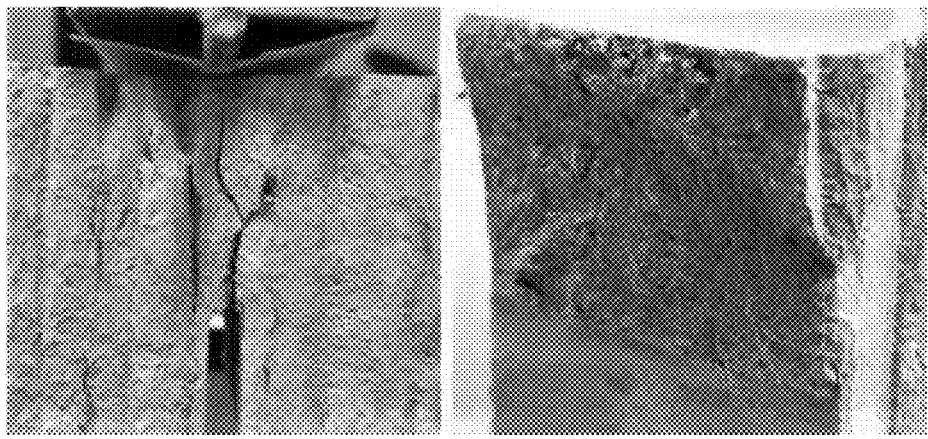

FIGS. 29A-29B are images of fracture behavior of three-point bending of a specimen. FIG. 29A shows inter-S-28d, while FIG. 29B shows Inter-G-28d.

Figure 30A:
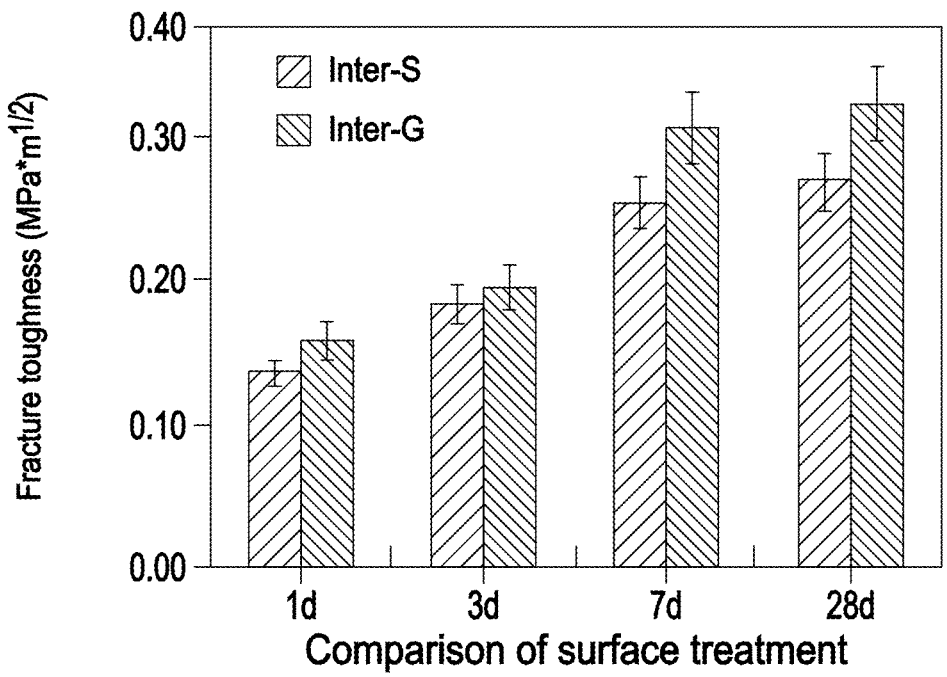
Figure 30B:
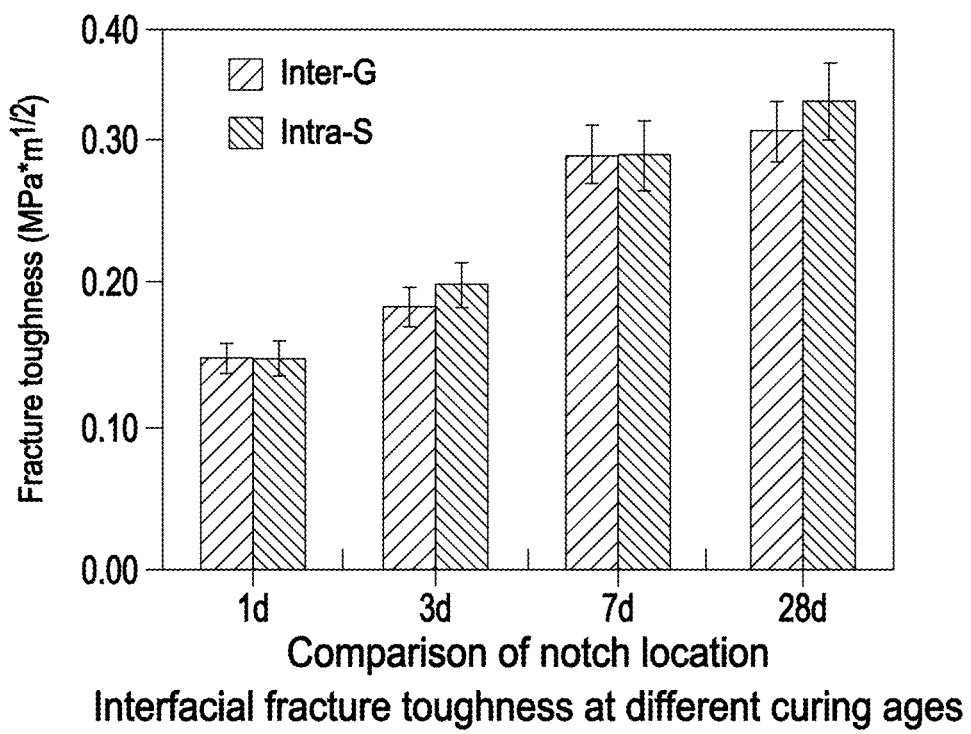

FIGS. 30A-30B are graphs of interfacial fracture toughness at different curing ages. FIG. 30A shows a comparison of surface treatment. FIG. 30B shows a comparison of notch location.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure provides methods of additive manufacturing of an engineered cementitious composite (ECC) structure formed by extruding an engineered cementitious composite (ECC) composition in a fresh state through a specially designed extrusion nozzle of a tiltable deposition head/extruder tool of an automated robotic printing device. After the ECC composition reaches a hardened state, which may define the engineered cementitious composite (ECC) structure having smooth sides. The present disclosure thus provides a robust system for three dimensional printing (3DP) of an ECC, including an extrusion nozzle shaping system and its influence on both the overall geometric form and surface finish. The 3DCP system provided by certain aspects of the present disclosure is compatible with ECC, which maximizes the geometric freedom of the deposition process while improving the surface finish to approximate that of cast concrete. Such a system can be used to form full-scale building components that leverage the capabilities of the robotically controlled printing process. Furthermore, the present disclosure provides for an integrated design for fabrication methodology that enables direct translation from digitally designed geometry to machine toolpaths, taking advantage of the additional degree of freedom of the steering system. In certain aspects, the customized software also enables geometric features such as variable layer height, and digitally simulates the printed result along with metrics such as material utilization and time estimation.

Engineered cementitious composite (ECC), a strain-hardening fiber-reinforced cementitious material, features high tensile strength and ductility. The broad ECC family of cementitious materials is compatible with typical concrete processing methods (e.g., pouring into molds or forms/formwork, spraying, and the like) and can exhibit strain-hardening behavior by way of inclusion a low volume fraction amount of distributed polymer fibers. Traditional concrete is brittle and weak in tension, prone to failure in many common loading situations such as those that introduce bending moments or shear forces. For this reason, steel or other metal reinforcement is typically used to carry tension within concrete, and printed concrete is no exception. However, steel reinforcement has many drawbacks, including that it is susceptible to corrosion, which introduces additional tensile forces on the concrete cover and often leads to rapid deterioration of concrete structures. Further, the process of placing steel reinforcement can interfere, slow, and limits the flexibility of the 3D printing process.

Printable engineered cementitious composite compositions have been developed for the purpose of improving the durability and resiliency of critical structural and infrastructural components to the extent that reinforcement metal components are not required, while being compatible with additive manufacturing processes. Such a printable engineered cementitious composition is described in PCT International Publication WO 2019/089771 entitled "SELF-REINFORCED CEMENTITIOUS COMPOSITE COMPOSITIONS FOR BUILDING-SCALE THREE DIMENSIONAL (3D) PRINTING," and in Li et al., "On the Emergence of 3D printable Engineered, Strain Hardening Cementitious Composites (ECC/SHCC)," Cement and Concrete Research 132 106038 (published online 7 Apr. 2020), the relevant portions of each of which are incorporated herein by reference in their entireties.

As a brief background, the micromechanics of ECCs have been previously described, but differ from those of other fiber-reinforced concretes. In short, when brittle cementitious matrix fractures are in tension, the dispersed fibers are able to bridge the crack, holding the crack to several tens of microns in width, while carrying the tensile load such that further opening of the microcrack requires more energy than originating a microcrack elsewhere in the matrix. This cycle can be repeated many times, such that the composite is able to distribute deformation throughout and suppress brittle fracture failure. ECCs are more damage and flaw tolerant than other fiber-reinforced materials due to strain-hardening behavior being generated, rather than strain-softening behavior. In fact, ECCs exhibit tensile ductility (strain capacity prior to failure, where failure is defined as the inability to carry and increasing load) and toughness (energy required to cause failure) hundreds of times those values of traditional concretes, providing the potential to eliminate or diminish the amount of steel reinforcement necessary to accommodate tensile loading. Printable engineered cementitious composite compositions desirably exhibit the characteristic strain-hardening behavior of ECCs, but are further designed to have the distinct rheological properties required for functional compatibility with construction-industry scale 3D printing processes (e.g., printability). This technology can thus reduce or eliminate the need for steel reinforcement in large-scale printed structures by incorporating such distributed or dispersed short polymer fibers which are able to generate tensile strain hardening behavior, much like that of metal alloys.

In various aspects, the cementitious compositions provided herein allow strain-hardening and distributed microcracking behavior in cementitious materials, much like previously developed and disclosed ECC materials. However, previously developed ECC materials did not exhibit both the fresh state and hardening behavior to make them suitable for additive manufacturing processes. In accordance with certain aspects of the present disclosure, the fresh state rheology of ECC-type materials is modified to make them suitable for printing (for example, by modifying compositional ingredients, ratios, and processing parameters). As discussed above, printability requires that the material concurrently be extrudable (able to be pumped through small apertures/piping), buildable (able to hold its shape once deposited and also support the weight of subsequently deposited layers without excess deformation), and to promote interlayer bonding (to create a unified printed part with structural integrity despite being composed of layers deposited at different time intervals). This modification of composition and processing, promoting fresh state and hardening behavior compatible with additive manufacturing processes, is achieved in accordance with certain aspects of the present disclosure while maintaining the mechanical properties characteristic of ECC materials in the cured material.

It is a challenge to meet the contradicting requirements of pumpability and buildability in additive manufacturing or three-dimensional printing (3DP) of concrete materials. Moreover, these issues are magnified by the relatively high fiber content (around 2% by volume) and high aspect ratio (e.g., around 300-750) of synthetic fibers in ECC. While certain pumpable 3DP-ECCs have been developed, for certain compositions, such materials may lack sufficient buildability resulting in premature collapse failure during layer-by-layer printing process. Further, conflicting tensile behaviors of 3DP-ECC have been reported. Some experimental results demonstrate that the tensile properties, including the tensile strength and ductility of printed ECC, are comparable or higher than those of cast ECC, which is believed to be attributable to the enhanced fiber alignment during mixture delivery and filament extrusion processes. However, inferior tensile properties compared to those of cast ECC have also been reported, possibly a result of different material composition, delivery and extrusion systems. It would be desirable to have a printable ECC composition with robust pumpability, buildability, and good tensile properties. Such a printable ECC material would be particularly desirable for use with the additive manufacturing systems provided by certain aspects of the present teachings.

Furthermore, the mechanical performance of the interfaces between printed layers of ECC is strongly influenced by ECC material composition, print time interval, surface moisture, physical layer interlock, and extrusion speed. Moreover, the interface toughness is another factor in mechanical performance. The layer interfaces may also influence the compressive properties, leading to an orthotropic compressive strength and stress-strain relationship in the parallel and perpendicular directions to the print direction. It would be desirable to develop a printable ECC with desirable flowability and buildability through proper tuning of rheological properties to match the customized pumping and extrusion equipment.

The present disclosure thus contemplates a printable ECC cementitious composition for additive manufacturing. The composition has a fresh state and a hardened state. In the fresh state, the composition is uncured and remains flowable and extrudable in the additive manufacturing (e.g., printing or extruding) process. Physical agitation may be used to ensure the thixotropic rheology of the composition remains favorable for processing and delivery of the cementitious composition to the print zone. During the additive manufacturing process, for example, just after printing or depositing in the print zone, the printable cementitious composition is buildable. Further, after printing, the cementitious composition then transitions to a hardened state. It should be noted that the process of transitioning from the fresh state to the hardened state may be somewhat progressive or gradual as it is reliant on progress of curing and drying of the composition. However, in the hardened state, the cementitious composition is no longer flowable or printable and can at least in part support weight of a subsequently deposited cementitious composition. As 3D printing does not permit long periods of time between deposition of layers, the cementitious composition desirably transitions to the hardened state after deposition at from greater than or equal to about 1 minute to less than or equal to about an hour; optionally greater than or equal to about 2 minutes to less than or equal to about 50 minutes, and in certain aspects, optionally greater than or equal to about 3 minutes to less than or equal to about 45 minutes. As will be appreciated by those of skill in the art, in the hardened state, the cementitious material will continue to cure and set so that properties will continue to change/increase over time. In certain variations, the hardened state of the cementitious composition reflects the desired strain hardening properties. In the hardened state, the composition may exhibit a desirably high uniaxial tensile strength, a desirably high tensile strain capacity, and high early compressive strength, for example, at 100 hours.

In one aspect, the cementitious composition in the hardened state has a quasi-static (low strain rate) uniaxial tensile strength of greater than or equal to about 2.5 MPa. Such a test may be conducted by preparing tensile specimens via casting using dogbone and coupon conformations, as well as via a manual printing approximation technique in the coupon shape. Both casting and the manual printing approximation techniques of 3D printing may be used to produce cubic specimens for compression testing. All test specimens can be cured in air at room temperature. Mechanical testing on the composites is performed 28 days after being mixed and formed. Tensile testing is performed with a universal tensile testing machine (Instron), with constant displacement loading at a rate of 0.005 mm/s, based on the recommendations of the Japan Society of Civil Engineers, "Recommendations for Design and Construction of High Performance Fiber Reinforced Cement Composites with Multiple Fine Cracks (HPFRCC)," Concrete Engineering Series 82 (March 2008), the relevant portions of which are incorporated herein by reference. Ultimate tensile strength is reported as the stress at the maximum load sustained by each composite. In one aspect, the uniaxial tensile strength is greater than or equal to about 2.5 MPa to less than or equal to about 25 MPa and optionally greater than or equal to about 2.5 MPa to less than or equal to about 15 MPa.

In another aspect, the cementitious composition in the hardened state has a tensile strain capacity of greater than or equal to about 1% as measured by a uniaxial tensile conducted via a test described above in the context of the uniaxial tensile strength. Strain capacity is reported as the strain at maximum stress carried by the composite prior to terminal stress decay. In certain aspects, the tensile strain capacity is greater than or equal to about 1% to less than or equal to about 8%, and optionally greater than or equal to about 2.5% to less than or equal to about 4.5%.

In certain aspects, in the hardened state, the cementitious composition of the present disclosure exhibits a compressive strength at 100 hours of greater than or equal to about 20 MPa. The hardened state sample is aged for 100 hours and then subjected to compression testing performed with a Forney™ compression machine. A loading rate of approximately 50 psi/s is used, based on recommendations of the ASTM C109 International standard. Compressive strength is reported as the stress at the maximum load sustained by the composite. In certain variations, the compressive strength at 100 hours is greater than or equal to about 20 MPa to less than or equal to about 220 MPa.

In yet other aspects, the cementitious composition in the hardened state has a compressive strength measured at 28 days of greater than or equal to about 25 MPa. Thus, the sample is aged for 28 days and subjected to a compression test as described above in the context of the 100 hour compressive strength test. In certain variations, the compressive strength at 28 days is greater than or equal to about 25 MPa to less than or equal to about 220 MPa, optionally greater than or equal to about 30 MPa to less than or equal to about 150 MPa and optionally greater than or equal to about 35 MPa to less than or equal to about 100 MPa. In one variation, the 28 day compressive strength is about 38 MPa.

In certain other aspects, the cementitious composition in the hardened state has a flexural strength or modulus of rupture of greater than or equal to about 5 MPa to less than or equal to about 30 MPa.

In certain variations, the cementitious composition after being formed by combining its various ingredients (including water), remains in the fresh state (referring to the time after mixing in which printing or additive manufacturing may occur) for long enough for 3D printing to be completed. The cementitious composition may therefore may have a fresh state with an open time/workability window prior to hardening and in the absence of shear forces (e.g., absence of mechanical agitation) of greater than or equal to about 30 seconds to less than or equal to about 90 minutes, optionally from greater than or equal to about 5 minutes to less than or equal to about 50 minutes. As will be appreciated by those of skill in the art, agitation or pumping to impart shear forces can prolong the working window of the fresh state beyond the timeframes described above due to the thixotropic rheological properties of the cementitious composition.

In certain aspects, the printable cementitious composition in the fresh state is flowable and therefore has a flowability factor of greater than or equal to about 1.1 to less than or equal to about 1.7. As noted above, the fresh state is the condition of the complete mixed composite composition (including dispersed fibers) during the short time period after complete mixing has been concluded, and in which printing can theoretically take place. Here, workability is quantitatively assessed using the flowability factor, measured via the drop table test (ASTM C1437 and ASTM C230), as used previously for investigations of thixotropic and printable cementitious materials. The flowability factor of cementitious pastes (completely mixed compositions, including fibers) is measured over time (after mixing is stopped) to generate a "flowability evolution" curve, providing a convenient method of describing the change in workability (stiffening) over time intervals relevant to 3D printing. The simplicity of this method of assessing workability over time allows it to be used both to accelerate the design process of new printable mixes and as an on-site quality control technique. In certain variations, the fresh state of the cementitious composition has a flowability factor of greater than or equal to about 1.1 to less than or equal to about 1.45.

In certain aspects, the present disclosure provides methods of additive manufacturing with a high-performance printing ECC material that can build architectural and structural components without molds or formwork, unlike conventional concrete construction methods. The properties of such a cementitious composition in a fresh state include workability/flow ability, including extrudability and buildability, which have mutual relationships with the workability and the open time of the concrete mix. In the hardened state, the ECC composition forms a structure that exhibits strain hardening. In certain variations, the ECC composition comprises ordinary Portland cement, a calcium aluminate cement, a fine aggregate, water, a high range water reducing agent (HRWRA), and a polymeric fiber, as described in PCT International Publication WO 2019/089771 entitled "SELF-REINFORCED CEMENTITIOUS COMPOSITE COMPOSITIONS FOR BUILDING-SCALE THREE DIMENSIONAL (3D) PRINTING, the relevant portions of which are incorporated herein. In other variations, the printable ECC composition comprises ordinary Portland cement, fly ash (either Class F and/or Class C fly ash), fine aggregate, water, a high range water reducing agent (HRWRA), also referred to as superplasticizer (SP), and a polymeric fiber, as will be described in greater detail below.

In one printable ECC composition, the Portland cement is present at greater than or equal to about 10 mass % to less than or equal to about 40 mass % of the total mass of the composition, for example, at about 15 mass %, fly ash is present at greater than or equal to about 30 mass % to less than or equal to about 60 mass % of the total mass of the composition, for example, at about 50 mass %, the fine aggregate like silica sand is present at greater than or equal to about 15 mass % to less than or equal to about 20 mass % of the total mass of the composition, for example, at about 17 mass %, water is present at greater than or equal to about 13 mass % to less than or equal to about 23 mass % of the total mass of the composition, for example, at about 15 to 16 mass %, the high range water reducing agent (HRWRA) or superplasticizer (SP) is present at greater than or equal to about 0.1 mass % to less than or equal to about 0.6 mass % of the total mass of the composition, the polymeric fiber is present at greater than or equal to about 0.7 mass % to less than or equal to about 2 mass % of the total mass of the composition, for example, at about 1.3 mass %, a viscosity modifying compound, hydroxypropylmethyl cellulose (HPMC), is present at greater than or equal to about 0.05 mass % to less than or equal to about 0.5 mass % of the total mass of the composition.

In certain variations, the ECC composition may further comprise one or more components selected from the group consisting of: microsilica, silica flour, attapulgite nanoclay, a cellulose-based additive, and combinations thereof. Thus, such ECC compositions typically comprise a fiber, such as a polymeric fiber, distributed within the cementitious matrix. With a fiber volume of no more than about 2%, the tensile strength of a printed ECC may range from greater than or equal to about 4 MPa to less than or equal to about 20 MPa and the tensile strain capacity may range from greater than or equal to about 3% to less than or equal to about 12%. The tensile ductility of ECC is therefore two to three orders of magnitude higher than that of normal concrete.

In a uniaxial direct tensile test, the resulting stress-strain curve of suitable printable ECC resembles that of ductile steel with a yield point, followed by subsequent strain-hardening. The excellent tensile property of such an ECC provides a plausible solution for 3DP self-reinforced structural element carrying tension, without the need for steel reinforcement. For example, a two-story ECC frame building has good seismic resistance in a shake table test, which illustrates the potential of using ECC with reduced or no steel reinforcement in structures.

In certain aspects, the present disclosure relates to the additive manufacturing of engineered cementitious composites (ECC) with specially designed extrusion tools for use with a robotic printing device, such as an automated computer numerical control (CNC) machine. In certain aspects, the ECC structural piece may be formed on a computer numerical control (CNC) printing machine. Such printing machines have automation with advanced CNC machinery and highly articulated degrees of customization in directionality. The printing device modifications described in accordance with certain aspects of the present disclosure can be used with not only printable ECC materials, to which they are particularly well suited, but in alternative aspects with a wide range of paste-like materials. Particularly significant are materials that are highly viscous, and fiber reinforced, such as printable ECC materials with highly ductile mechanical properties. These properties allow the design of structures, which use significantly less material. Due to the high fiber loading levels, prior to the inventive technology, ECC materials have currently been deemed too difficult to 3D print.

The challenges of 3D printing of concrete materials include time-dependent rheological properties like pumpability and buildability. These challenges are typically identified within the three phases of the additive manufacturing or 3D printing process, namely, mixing, transport, and placement—where equipment, process, and material have corresponding effects upon one another. Furthermore, ECC materials also have a substantial amount of fibers present, which presents additional handling challenges. At a typical loading of 2% fiber by volume, there is a significant impact on the rheological characteristics of the material. Additionally, there are secondary impacts that high fiber and high fly ash mixes have on the pumping system. While the addition of fly ash is known to increase pumpability, significant increases can also cause bleeding. This effect, coupled with high fiber volume fractions, risks separation and blockage of flow in the system. However, the present technology relates to methods of layer based deposition of ECC for the successful production of building structural components or structures.

The material transport system is one of the fundamental components of a successful additive manufacturing or 3DCP technology. In certain aspects, the pumps used can be either of the progressive cavity or peristaltic design. The other fundamental component of 3DCP is the deposition or placement process, which in the present disclosure, is coupled with a motion control system. Various approaches using CNC and robotics have been studied. In order to achieve the goal of maximum geometric freedom, a minimum of 5 degrees of freedom (DOF) is provided in the printing device. In accordance with certain aspects of the present disclosure, extrusion nozzle design provides customized shaping, so that the degrees of freedom increase to six or more.

In certain aspects, the overall additive manufacturing system comprises a CNC or robotic controlled deposition head (e.g., extruder tool), which synchronously deposits a material in subsequent layers to form a monolithic solid. In certain aspects, the monolithic solid further comprises at least one wall that is substantially smooth, meaning that discernable gaps or offsets between layers are absent. The layers can be variable in thickness (e.g., height of each respective deposited layer), as controlled by the change in height between layers combined with the synchronous rate of extrusion. In certain aspects, the CNC platform possesses at least five degrees of freedom to enable tilting the deposition head/extruder tool (which will itself contain an additional degree of freedom described below). By tilting the deposition head, the shaped bead can almost perfectly approximate a doubly curved surface of consistent wall thickness. This maximizes the interfacial contact area between layers. In certain variations, the 6-axis robotic manipulator comprises six degrees of freedom tilt. While a six-axis robotic manipulator possesses the additional degree of freedom needed to tilt and steer the shaping nozzle, typically the design of the end-effector will limit the range of motion for the steering effect. This can be overcome by mounting an additional rotational axis at the extrusion nozzle, which allows at least 360 degrees of rotation of the nozzle about the axis of extrusion. In some cases, this axis can allow infinite rotation for increased throughput without requiring the "unwinding" of the axis. Typically, the DOF of the system are the three Cartesian axes, coupled with two or three rotational degrees of freedom around these Cartesian axes.

Generally, a representative system for additive manufacturing of a printable ECC may include material transfer system that includes mixing the various components together in one or more mixers, pumping them via one or more pumps in a feeding system, and then printing them via an extruder in an extruding system.

Figure 1:
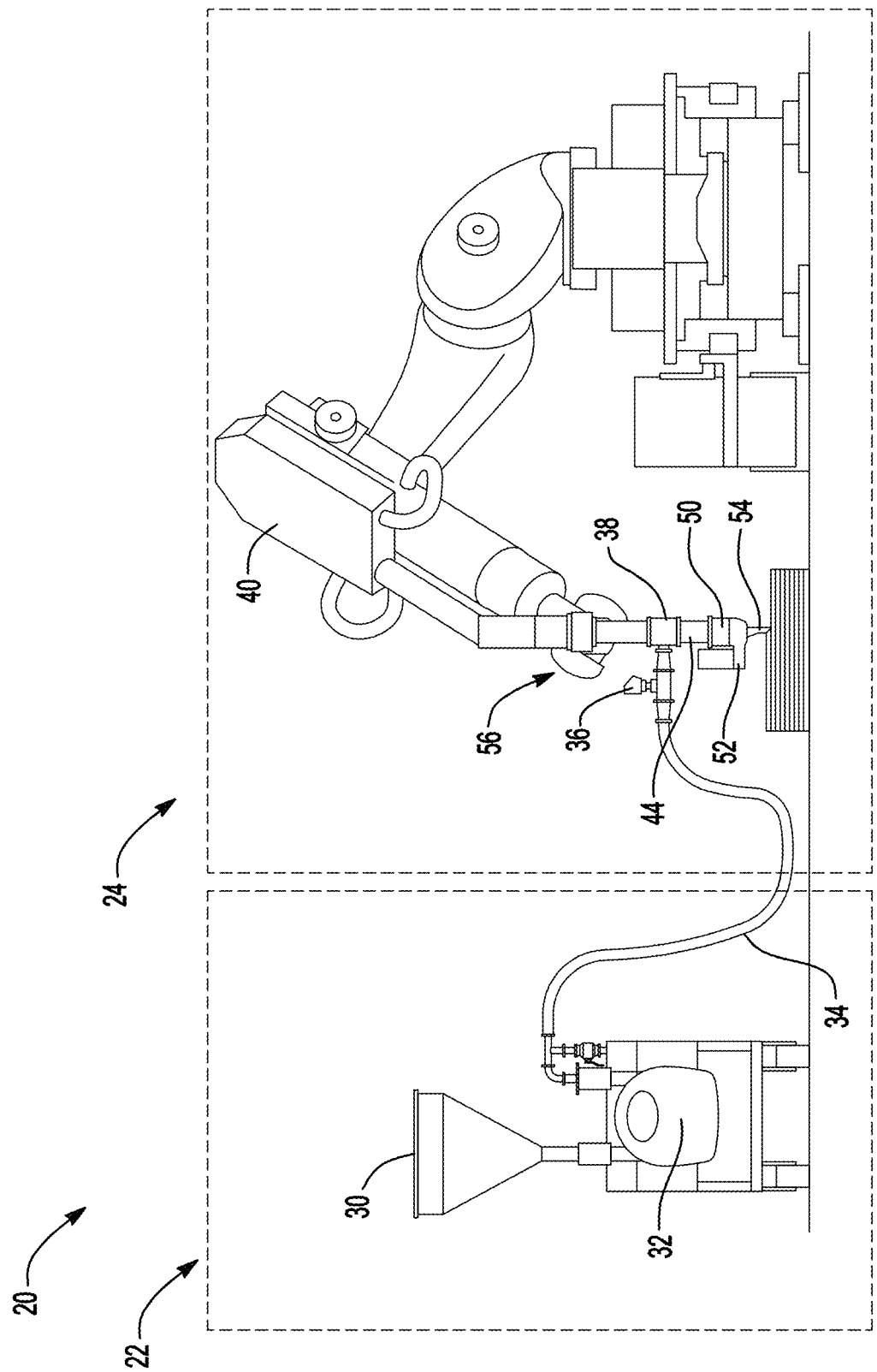

FIG. 1 shows a representative example of a suitable additive manufacturing system 20 that includes feeding system 22 and extruding system 24. The feeding system 22 includes a hopper 30 that receives a mixed ECC material. The ECC material may be mixed upstream (in a mixer not shown) in batches or by a continuous, controllable process, whereby a machine measures the constituent ingredients, mixes, and pushes this material into the feeding system 22. The ECC material in the hopper 30 is then processed by one or more pumps, such as a peristaltic pump 32. The peristaltic pump 32 may be a servo-driven peristaltic pump. The peristaltic pump 32 is in fluid communication with a conduit, such as a supply line, like a concrete hose 34, through which pressurized ECC material is pumped. In other embodiments, the supply pump or peristaltic pump may be a progressive cavity design. Yet other types of supply pumps contemplated may include rotary screw and rotary lobe pumps as supply pumps, as well as auger-type (Archimedean screw) pumps. While not shown in FIG. 1, there may be an optional inline pulsation damper disposed after the peristaltic pump 32 and prior to the connection to the supply line/concrete hose 34. As will be appreciated by those of skill in the art, the feeding system 22 may have various other conventional components, including valves, actuators, flow rate, temperature, and/or flow rate monitors, and the like.

In certain aspects, the additive manufacturing system 20 is able to operate with closed-loop control over the rheological properties. The additive manufacturing system 20 may include an inline viscometer coupled to a continuous mixing system, which can vary water to cementitious content and/or variability in the viscosity modifying agent content.

The extruding system 24 is connected to the feeding system 22 via the concrete hose 34. A pressure transducer 36 is connected to the concrete hose 34. After the pressure transducer 36, the concrete hose 34 is connected to a feed conduit 38 of a robotic printing device 40, where the ECC material is introduced thereto. The feed conduit 38 is connected to one or more feed pumps 44. The pressure transducer 36 at the inlet of the feed pump 44 (e.g., PC pump) provides feedback to the peristaltic pump 32 to maintain a constant inlet pressure, even as the PC pump 32 starts/stops or varies flow.

The extruding system 24 may thus be fed by one or more demand based feed pumps 44, which may be controlled by a central Programmable Logic Control (PLC) system. The PLC system controls the pump flow in the pump(s) 44 and extrusion synchronously with the motion of a deposition head 50 (also referred to herein as the extruder tool or effector). The feed pump(s) 44 are typically of peristaltic or progressive cavity design, and are frequency controlled to generate a consistent supply pressure at the deposition head 50, regardless of changes in ECC material viscosity. In certain variations, the pump may have an inlet pressure of greater than or equal to about 30 psi to less than or equal to about 50 psi. Where the inlet pressure is substantially constant, the pump has linear flow rates as ECC is delivered to the deposition head 50. While both peristaltic or progressive cavity design are considered positive displacement pumps, they each possess certain advantages and disadvantages. Progressive cavity (PC) pumps are known to work well with highly viscous materials and transported solids. They have highly linear flow rates relative to pump speed. At the upper end of the viscosity range, this linearity depends on the inlet pressure being maintained. Peristaltic pumps have similar capabilities for high viscosities and solids, but may have a disadvantage of significant pulsation, though this can be mitigated with pulsation dampeners. Their relatively open flow design improves the passage of fibers in the ECC material through the pump. Peristaltic pumps, without any disassembly, are easier to clean and flush, whereas PC pumps require the removal of the stator from the rotor in order to remove any concrete and fiber buildup. In one variation, the feed pump 44 is a custom-built servo-driven progressive cavity (PC) pump.

In one variation, the deposition head 50 includes a customized progressive cavity design, which minimizes flow restrictions and dead-zones even with highly viscous, semi solid materials, which are typically fiber reinforced, such as the ECC materials. The extruding system 24 is designed for rapid disassembly and easy cleaning.

The deposition head 50 may be equipped with a CNC controlled shaping system or nozzle steering system 52, which is steered with respect to the motion of the head 50. The deposition head 50 further includes an extrusion nozzle 54. The pumped ECC material passes or is extruded through an opening in the extrusion nozzle 54. The nozzle 54, which is a tubular element of specific geometry connected to the opening, can be changed to suit varying needs and cross-sections of the deposited bead of ECC material. The steering of the nozzle 54 by the nozzle steering system 52 allows the deposited ECC bead to closely approximate the desired cross-section and surface of the structure or component to be formed, thus providing for substantially better surface finishes and precise material control. The nozzle 54 is also designed with a very specific flow profile, which controls thixotropic behavior and "buffers" changes in material flow rate (which are small, but inevitable when pumping viscous materials like ECC to allow a consistently deposited bead that holds it shape). The design of the nozzle 54 also includes restrictions, which influence and promote the alignment of the reinforcing fibers, which enhances material properties of the structure formed of the ECC after it hardens.

In order to support more complex toolpath geometries, such as branching structures, the deposition system may also be capable of dynamically controlling the start and stop of the extrusion process. There are two primary approaches to controlling this behavior, one utilizing a valve, and the other utilizing a frequency-controlled pump (and some approaches combine the two). A valve, being compact, can be located near the extrusion point, which improves the dynamic response of the system. One such type of valve is a "pinch-valve." A frequency-controlled pump can also be used and provides the added advantage of allowing for different speeds of extrusion, either to match different speeds of the motion control platform, or to extrude layers of different thickness or width. Depending on the overall system arrangement, such as a supply pump feeding a long hose to the placement head, this approach may not offer enough control over start/stop dynamics. It is desirable that the inventive technology provides an integrated approach, which has highly dynamic control of material flowrate and start/stop behavior.

While not shown, the extruding system 24 can also be equipped with thermal controls to control material hydration. By cooling the material below room temperature, the mix design can be modified to "set" after deposition, with hydration assisted by the heat of the environment.

The deposited ECC bead's cross-section can be modified by the nozzle 54 to produce complex geometries, for example parallel ribbing, which increases the interfacial bond between layers by producing more surface-to-surface contact.

In certain aspects, the nozzle steering system 52 can also be equipped with a scanning system, such as a 2D laser profiler, to provide for process quality control and detection of errors in the printed path. The customized software synchronizes the information from the scan (which trails the deposition point) with the motion of the system and generates a 3D model of the built part, allowing subsequent deposited layers to adjust to any inconsistency.

Most 3D printing systems utilize only 3 degrees of freedom, and typical 3D CAD/CAM workflows treat extrusion as a fixed tool following a path at fixed speed, with no consideration for the shape of the bead of material extruded. The 6-axis robotic manipulator offers the additional degrees of freedom (DOF) necessary for complete control over the nozzle orientation; however, due to the size constraint of the PC pump and mounting/reach requirements shown in FIG. 1, an additional axis to control the nozzle 54 rotation is attached to the end effector 56 of the robotic printing device 40. This axis is integrated as an external axis, and the kinematics of the toolpath are solved using a custom-developed off-line programming (OLP) plugin for the Rhino3D modeling software. The OLP approach allows the nozzle rotation and tool orientation to be synchronized kinematically, and output in standard machine instruction code. This utilizes the Kuka Robotic Language (KRL), but the software can be easily adapted to other languages.

In addition to the nozzle rotation, the feed pump 44 is also integrated as an external axis, in this case treated as a continuous (feed) axis. The rate of motion of this axis is computed in the OLP plugin and calibrated to the motion of the servo driven PC pump, yielding the potential for continuously variable extrusion rates (it can even be reversed to allow for retraction behaviors, which are common in paste/filament extrusion). This opens the possibility of variable layer thicknesses, which are encoded into the machine instructions during the geometric analysis by the OLP software. These "virtual" axes are synchronized by the robot motion controller, and the positioning data is fed to a programmable logic controller (PLC), providing motion and process control for the entire additive manufacturing system 20.

By controlling the feed of multiple materials to the deposition head 50 via a digital system, the ECC material properties of the printed path can be dynamically altered during the deposition process. In addition, in certain variations, a secondary metering pump (not shown) at the deposition head 50 can be used to inject and mix rheology control admixtures, like accelerators. Printable ECC material properties to be controlled may include compressive strength (for optimizing strength), fiber content (to eliminate a costly component of the mix in areas of low tension), and thermal conductivity (for improved thermal insulation, as well as fire protection). Additional "multi-functional" properties can also be controlled, like the presence of titanium dioxide, to support photocatalytic effects (on the exposed surfaces of the printed structure).

In certain variations, the toolpath that drives the robotic printing device 40 is created in software, and is encoded with multiple types of information, including the flow rate, travel speed, and in some cases, the material composition, which is often a ratio between two differing materials, which are mixed as they exit the deposition head 50. The software allows for the entire printing process to be simulated in 3D, including the deposition rate, set rate relative to deposition speed, and strength gain of the printed part. The software also includes real-time communication with the PLC system to record specific data during a print, including information from the profile scanner and/or other non-destructive analysis tools like ultrasonic scanning, to detect voids in the printed part.

In certain aspects, the extrusion nozzle 54 has a shape to control the shaping of the ECC material bead that is extruded, which can enhance smoothness of the walls of the deposited layered structure, while also advantageously aligning fibers in the ECC to improve material properties.

Certain previous 3D printing techniques for conventional concretes (in contrast to ECCs that contain fibers, inter alia) are discussed in Buswell, et al., "3D printing using concrete extrusion: A roadmap for research," Cement and Concrete Research, 112 pp. 37-49 (2018), the relevant portions on which are incorporated herein by reference. FIGS. 2A-2D are relevant to understanding these previous 3D printing techniques, as compared to the present methods and show effect of tool orientation, nozzle shape, and toolpath strategy on wall cross-section in v-w plane. In the figures, u, v, w notation are as follows: with u designated as the direction of travel of the extrusion nozzle, v perpendicular to the bead direction, but in plane with the bead, and w, perpendicular to the bead plane. As discussed in the Buswell reference, constant height layers having a curved cross-section applied to a surface or substrate, will produce a layer interface with variable surface area as the vector distance between paths changes as shown in FIG. 2A where there is constant layer height, a printing tool with a vertical orientation with respect to the substrate, and no bead shaping (e.g., the nozzle may have a round opening or aperture). Further, FIG. 2A of the diagram does not account for the change in width that will occur if the extrusion rate is held constant. By designing the toolpath using a constant tangential offset along the surface, a consistent layer interface surface area (per unit length) can be generated as shown in FIG. 2B (using the same type of nozzle opening and vertical nozzle orientation as in FIG. 2A), where there is a constant layer distance. As shown in FIG. 2C, the addition of bead shape control combined with a vertical tool produces a "corbelling" or stepped effect, similar to brick masonry, and results in a stepped surface with considerable roughness in the walls. The nozzle opening in FIG. 2C may be rectangular. FIG. 2D shows one example of a structure formed in accordance with certain aspects of the present disclosure having a constant layer distance, a tiltable tool, and a shaped ECC bead as the material is deposited. When formed with a robotic printing device 40 combined with 5 degrees of freedom (DOF) tilt, including a tiltable deposition head, the cross-section of each respective layer can be produced with nearly identical interface contact area, thickness, and relatively low surface roughness. Thus, two walls of the structure are smooth, unlike in FIG. 2C.

Thus, in accordance with certain aspects of the present disclosure, to control the shape of the extruded ECC material bead while 3D concrete printing, the most basic approach utilizes a rectangular extrusion die opening for the extrusion nozzle 54 that can be rotated around the axis of extrusion. In other words, in certain variations, the extrusion nozzle may be rotatable 360°. The extrusion nozzle may have a length of greater than or equal to about 6 inches to less than or equal to about 15 inches. The rectangular opening may be substantially rectangular, meaning that there may be some minor variations in the rectangular shape. In certain variations, the substantially rectangular opening of the nozzle optionally has a width of greater than or equal to about 10 mm to less than or equal to about 100 mm, optionally greater than or equal to about 10 mm to less than or equal to about 75 mm, optionally greater than or equal to about 25 mm to less than or equal to about 50 mm, and a length of greater than or equal to about greater than or equal to about 10 mm to less than or equal to about 100 mm, optionally greater than or equal to about 10 mm to less than or equal to about 75 mm, and optionally greater than or equal to about 25 mm to less than or equal to about 50 mm. The substantially rectangular opening of the nozzle in one variation may have a width of about 10 mm and a length of about 30 mm.

Figure 3A:
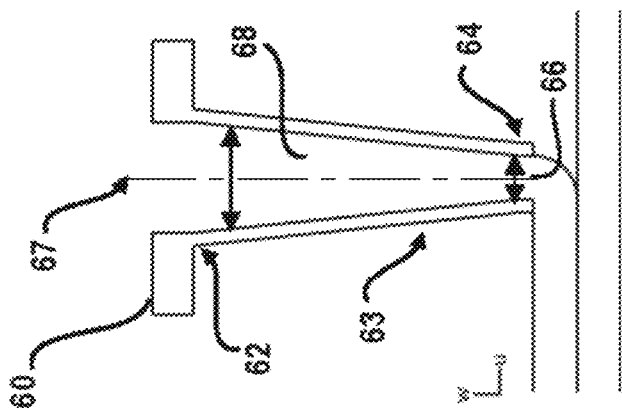
Figure 3B:
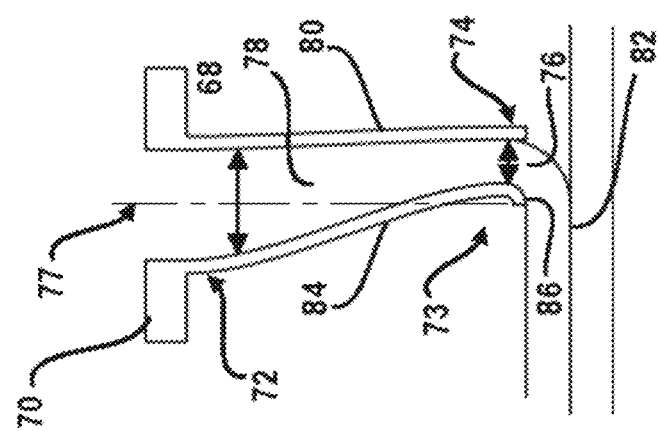
Figure 3C:
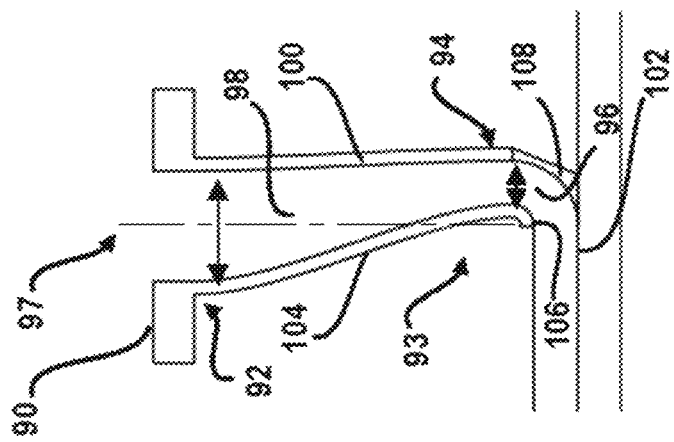

Other variations of the nozzle may include the addition of one or more shaping blades or "side trowels" at a terminal end of the nozzle, which shape the material as it exits the extrusion nozzle. In certain aspects, an extrusion nozzle prepared in accordance with certain aspects of the present disclosure has a substantially rectangular opening and at least one shaping blade at a terminal end of the nozzle to deposit the cementitious composition onto a target or substrate. FIGS. 3A-3C show different nozzle designs in the u-w plane. In one example, a cross-sectional shape of the extruded bead is rectangular and has a cross-sectional area defined by a width of 10 mm and a length of 30 mm (w,v). The chosen shape of the extruded bead also has implications on overall component geometries that can be produced, as well as the surface finish, as shown in FIGS. 2A-2D.

When viewed from the u-w plane, there are several considerations, as shown in FIGS. 3A-3C. In the simplest case in FIG. 3A, an extrusion nozzle 60 defines an entry region 62 to an internal open chamber that passes into a transition region 63 at the terminal end 64 of the extrusion nozzle 60. The terminal end 64 defines a terminal opening 66 having a first cross-sectional area that is smaller than a second cross-sectional area in the entry region. The extrusion nozzle 60 has an axis of rotation 67 and thus may be rotatable by 360°. The terminal opening 66 has a rectangular shape so that it extrudes an ECC material 68 vertically, and it sharply transitions from the w to the u direction. Based on previous experience with round extrusion dies, this may be expected to be problematic under certain conditions, particularly with ECC, where the high fiber content and internal friction leads to shape deformation as the bead bends.

FIG. 3B shows a second extrusion nozzle design prepared in accordance with certain aspects of the present disclosure. An extrusion nozzle 70 defines an entry region 72 that passes into a transition region 73 followed by a terminal end 74 of the extrusion nozzle 70. The terminal end 74 defines a terminal opening 76 having a first cross-sectional area that is smaller than a second cross-sectional area in the entry region. The extrusion nozzle 70 has an axis of rotation 77 and thus rotatable by 360°. The terminal opening 76 has a rectangular shape so that it extrudes an ECC material 78. In various aspects, the extrusion nozzle 70 may be considered to define a buffer zone followed by a shaping zone for the ECC material. The transition region 73 includes at least one flat wall 80 that is perpendicular to a substrate or target 82 and at least one curved wall 84 that slants inwardly from the entry region 72 to the terminal opening 76 to define a trailing edge 86. The at least one curved wall 84 is configured to shift a center point (tool center point— TCP) of the extruder nozzle 70. In extrusion nozzle's 70 design, the TCP of the nozzle is shifted to align with the axis of rotation 77 in plane (assuming a steered nozzle). While shifting the trailing edge 86 to align with the rotation axis 77 is not necessarily required, it simplifies path planning and simplifies the kinematics of the tool to potentially reduce blockages of the ECC material.

FIG. 3C shows a third extrusion nozzle design prepared in accordance with certain aspects of the present disclosure that is similar to the second design in FIG. 3B. An extrusion nozzle 90 defines an entry region 92 that passes into a transition region 93 to the terminal end 94 of the extrusion nozzle 90. The terminal end 94 defines a terminal opening 96 having a first cross-sectional area that is smaller than a second cross-sectional area in the transition region 93 and/or entry region 92. Again, the extrusion nozzle 90 has a shape that may be considered to define a buffer zone followed by a shaping zone for the ECC material. The extrusion nozzle 90 has an axis of rotation 97 and thus may be rotatable by 360°. The terminal opening 96 has a rectangular shape so that it shapes and extrudes an ECC material 98. The transition region 93 includes at least one flat wall 100 that is perpendicular to a substrate or target 102 and at least one curved wall 104 that slants inwardly from the entry region 92 to the terminal opening 96 to define a trailing edge 106. The curved wall 104 is configured to shift a center point (tool center point— TCP) of the extruder nozzle 90, like in FIG. 3B, so that the TCP is shifted to align with the axis of rotation 97 in plane (assuming a steered nozzle). The terminal end 94 of the extrusion nozzle 90 further comprises at least one shaping blade 108 that extends or protrudes from the terminal opening 96 for a distance that may enable contact with substrate 102. The extrusion nozzle 90 may comprise a pair of shaping blades 108.

In certain aspects, the blades are designed in such a way to smoothly guide material from a buffer zone above the shaping zone, while allowing for the minimum possible turning radius of the toolpath. The shaping blade may be formed of a metal in certain variations. The blade thickness is required to maintain sufficient stiffness and resist breakage should the shaping blade encounter material that is beginning to cure. The blade length is typically at least the target layer thickness, and can be longer to provide a smoothing effect across the layer to layer interface (as below). In certain aspects, the shaping blade may have a length (defined from the terminal opening 96 to the terminal end of the blade) of greater than or equal to about 5 mm to less than or equal to about 30 mm, for example, about 14 mm in one embodiment. The at least one shaping blade may be a pair of shaping blades having a distance corresponding to a width of the extrusion bead of material. In certain variations, a distance between the pair of shaping blades is greater than or equal to about 25 mm to less than or equal to about 100 mm, for example, about greater than or equal to about 25 mm to less than or equal to about 50 mm.

Figure 4A:
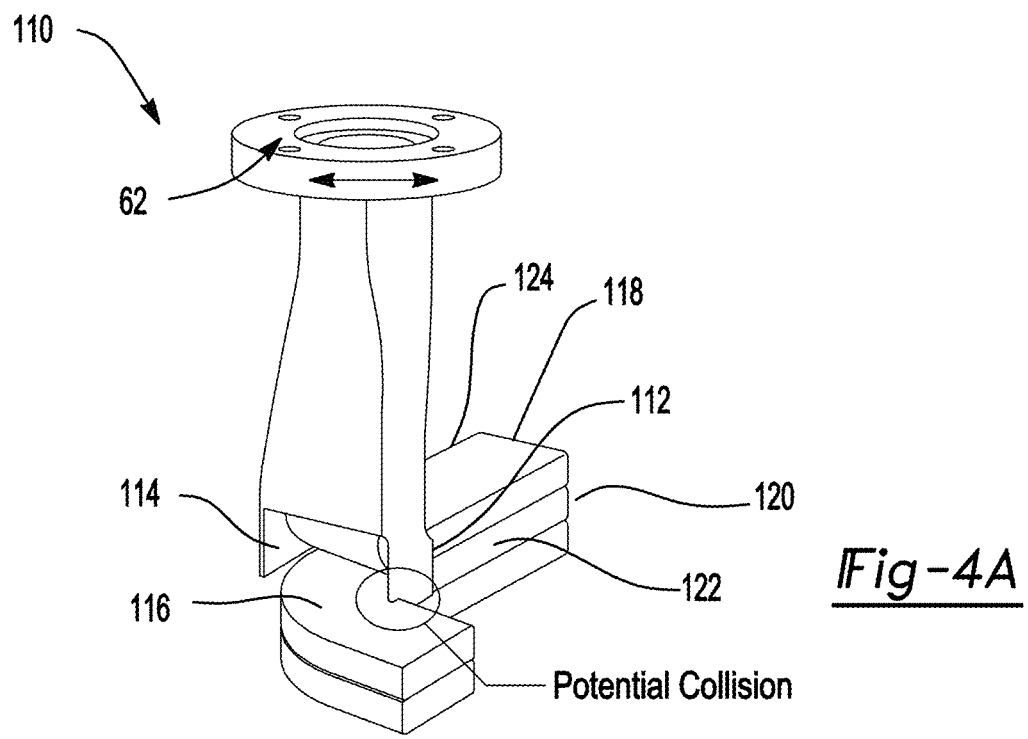
Figure 4B:
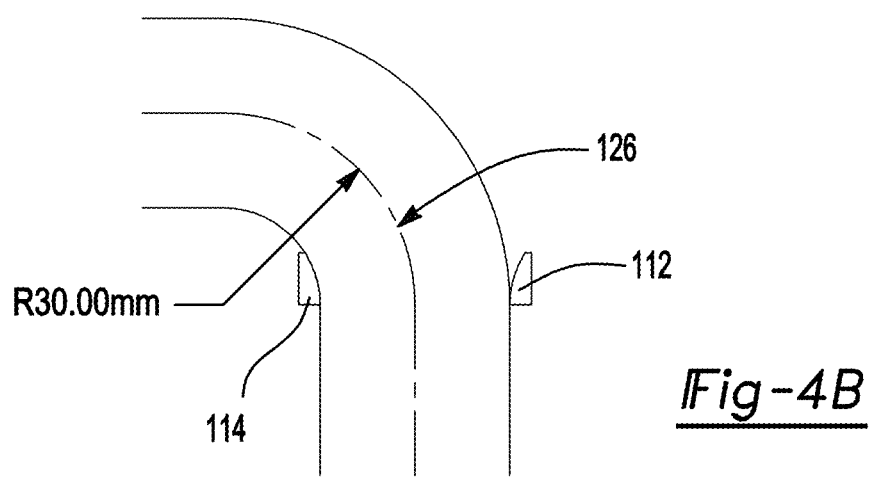

In order to guide the rectangular die opening (like terminal opening 96) and/or the shaping blades (like shaping blade 108), the extrusion tool may be designed to have an additional, sixth degree of freedom (DOF), which keeps the nozzle (e.g., extrusion nozzle 90) tangent to the toolpath in the u direction. For extrusion nozzles equipped with shaping blades, the specific shape of the blade creates additional constraints on the overall component geometry, particularly the minimum corner radius, as shown in FIG. 4B. The geometric requirements also vary based on the projection length of the side shaping blades. FIG. 4A shows an extrusion nozzle having a pair of fixed shaping blades and FIG. 4B shows a plan view of the shaping blades with respect to a minimum centerline radius for a curved path.

FIG. 4A illustrates an extrusion nozzle 110 similar to the designs shown in FIG. 3C having a pair of shaping blades, including a first shaping blade 112 and a second blade 114, each of which project and extend below a surface of a substrate 116 on which a current ECC layer 118 is being extruded and deposited. Thus, the first shaping blade 112 and a second blade 114 extend beyond a previously deposited layer 120 of ECC material thus providing an ability to smooth the interface or gaps between the respectively deposited layers. As shown in FIG. 4A, the first shaping blade 112 smooths a first wall 122 and the second blade 114 smooths a second wall 124. The first shaping blade 112 and the second blade 114 are fixed with respect to a terminal end of the nozzle. However, the presence of fixed shaping blades may inhibit certain path topologies where lateral intersections between paths are desired; therefore, retractable blades are contemplated for such applications. For example, FIG. 4B shows the first shaping blade 112 and the second shaping blade 114 along with a minimum centerline radius 126 for a curved path of the nozzle 110. The minimum centerline radius 126 at a curve may be a minimum of 30 mm. Otherwise, a collision may occur between the fixed shaping blade and the material within the corner causing potential deformation.

Therefore, in certain embodiments, the shaping blades may be retractable and thus may be translated or moved with respect to the terminal end of the nozzle as needed during the additive manufacturing or deposition process, especially at points where the flowpath comprises a curve or an intersection.

Nozzle design parameters also relate to the effect cross-section has on the fiber alignment in the extruded bead. This may be considered to be the "wall effect" of the nozzle walls and/or shaping blades on the fiber alignment in the ECC. Thus, nozzle shaping can provide a desired smooth surface finish, but also for ECC/SHCC materials, the design of the extrusion nozzle can have additional effects on the mechanical properties of the extruded bead as well as the behavior at the layer interface.

FIGS. 5A-5D show another an extrusion nozzle design prepared in accordance with certain aspects of the present disclosure. FIGS. 5A and 5C-5D are different views of the extrusion nozzle, while FIG. 5B shows a cross-sectional area of the terminal opening shape. Thus, an extrusion nozzle 150 defines an entry region 152 having an inlet 153 of an internal cavity 154. The entry region 152 passes into a transition region 155 to the terminal end 156 of the extrusion nozzle 150. The terminal end 156 defines a terminal opening 158. The terminal opening 158 has a rectangular shape as best seen in FIG. 5B through which an ECC material is extruded as it passes out from the internal cavity 154. Each of the walls 159 of the rectangular shape are straight or flat.

The extrusion nozzle 150 includes a first curved wall 160 (e.g., a front wall in the direction of travel of the nozzle 150) and a second curved wall 162 (e.g., a back wall in the direction of travel of the nozzle 150). As shown, sidewalls 164 are relatively flat and orthogonal to a plane defined by a flange 166 of the entry region 152. Notably, the first curved wall 160 and the second curved wall 162 may have variable thickness extending from the entry region 152 to the terminal end 156. The variable wall thickness may help to promote flow and minimize potential blockages of ECC material within the internal cavity 154. The second curved wall 162 slants inwardly from the entry region 152 to the terminal opening 158 to define a trailing edge 168 to assist with shaping of the bead of ECC material as it is deposited. The first curved wall 160 may have a greater thickness at the terminal end 156, as compared to the entry region 152.

The terminal end 156 of the extrusion nozzle 150 further comprises at least one shaping blade 170 that extends or protrudes from the terminal opening 158 for a distance that may enable contact with a target or substrate beneath the extrusion nozzle 150.

The terminal end 156 of the extrusion nozzle 150 may comprise a pair of shaping blades 170 that are fixed with respect to the terminal end. The shaping blades 170 may be integral with each sidewall 164 to define flanges that extend beyond the terminal opening 156. These shaping blades 170 can serve a similar purpose to the previously described variations in assisting with shaping of the bead of ECC material as it is deposited, smoothing walls of the deposited layers, and promoting fiber alignment and enhance mechanical properties of the hardened ECC material due to promoting fiber alignment.

FIGS. 6A-6D show yet another an extrusion nozzle design prepared in accordance with certain aspects of the present disclosure. FIGS. 6A and 6C-6D are different views of extrusion nozzle, while FIG. 6B shows a cross-sectional area of the terminal opening shape. To the extent that the components of the extrusion nozzle design are the same as those shown in FIGS. 5A-5D, they share the same numbering, and for brevity, will not be introduced or described again, unless specifically discussed below. An extrusion nozzle 150A defines an entry region 152 that passes into a transition region 155 to a terminal end 156A. The terminal end 156A defines a terminal opening 158A. The terminal opening 158A has a substantially rectangular shape as best seen in FIG. 6B through which an ECC material is extruded as it passes out from internal cavity 154. However, the design of the terminal opening 158A varies from the terminal opening 158 shown in FIG. 5B, because the substantially rectangular cross-section includes at least one wall defining an undulated or corrugated pattern (e.g., a sinusoidal wave pattern). The terminal opening 158A includes two opposing walls 180 having the corrugated surface pattern. The corrugated surface pattern includes a plurality of peaks 182 and a plurality of valleys or troughs 184. Where two opposing walls 180 have a corrugated pattern, these walls are mirrored, causing the top and bottom of the extruded bead to interlock between the respectively deposited layers. The substantially rectangular shape of terminal opening 158A also includes two sidewalls 186 that are straight or flat. In this manner, the bead of ECC material extruded from the extrusion nozzle 150 has two flat sides and two sides with a contour complementary to the corrugated surface pattern of the opposing walls 180.

The extrusion nozzle 150 includes a first curved wall 160 (e.g., a front wall in the direction of travel of the nozzle 150) and a second curved wall 162 (e.g., a back wall in the direction of travel of the nozzle 150). As shown, sidewalls 164 are relatively flat and orthogonal to a plane defined by a flange 166 of the entry region 152. Notably, the first curved wall 160 and the second curved wall 162 may have variable thickness extending from the entry region 152 to the terminal end 156. The variable wall thickness may help to promote flow and minimize potential blockages of ECC material within the internal cavity 154. The second curved wall 162 slants inwardly from the entry region 152 to the terminal opening 158 to define a trailing edge 168 to assist with shaping of the bead of ECC material as it is deposited. The radius of the transition from wall 162 to edge 168 is sized to smoothly transition the ECC material. ECC compositions having longer fibers and/or higher volume fractions of fiber requires a larger radius due to internal shear friction. The first curved wall 160 may have a greater thickness at the terminal end 156, as compared to the entry region 152. The terminal end 156 of the extrusion nozzle 150 further comprises at least one shaping blade 170 that extends or protrudes from the terminal opening 158 for a distance that may enable contact with an underlying substrate.

The terminal end 156 of the extrusion nozzle 150 may comprise a pair of shaping blades 170 that are fixed with respect to the terminal end. The shaping blades 170 may be integral with each sidewall 164 to define flanges that extend beyond the terminal opening 156. These shaping blades 170 can serve a similar purpose to the previously described variations in assisting with shaping of the bead of ECC material as it is deposited, smoothing walls of the deposited layers, and promoting fiber alignment and enhance mechanical properties of the hardened ECC material due to promoting fiber alignment.

FIGS. 7A-7D show yet another an extrusion nozzle design prepared in accordance with certain aspects of the present disclosure. FIGS. 7A and 7C-7D are different views of the extrusion nozzle, while FIG. 7B shows a cross-sectional area of the terminal opening with shaped ECC material. To the extent that the components of the extrusion nozzle design are the same as those shown in FIGS. 5A-5D and 6A-6D, they share the same numbering, and for brevity, will not be introduced or described again, unless specifically discussed below. An extrusion nozzle 150B defines an entry region 152B that passes into a central transition region 155B to a terminal end 156B. The terminal end 156B defines a terminal opening 158B. The terminal opening 158A has a substantially rectangular shape through which a shaped ECC material is extruded as it passes out from an internal cavity 154B.

Internal cavity 154B includes a baffle structure 190 in the flow path of the ECC material. The baffle structure 190 may have a plurality of protrusions or fins that are configured to shape the extruded ECC material and align fibers as it passes and forms a corrugated bead structure 192 that exits the terminal end 156B shown in FIG. 7B. The corrugated bead shape 192 may have a plurality of turns or changes in direction (e.g., of greater than 180°) that define a sinusoidal or corrugated structure having a plurality of folds 194 defining peaks and troughs. After the ECC is shaped in the internal cavity 154B by the baffle structure 190, which aligns the fibers due to shear forces in the ECC material, the material passes through a constriction zone defined by terminal end 156B, which reforms the material into a corrugated rectangle. The ECC material may then exit a terminal opening 158B having a rectangular shape with walls that are straight or flat. In this manner, the corrugated bead shape 192 of ECC material extruded from the extrusion nozzle 150B has two flat sides and two sides with a plurality of folds complementary to the pattern formed by the baffle structure 190.

The extrusion nozzle 150B includes a wall 160B (e.g., a front wall in the direction of travel of the nozzle 150) and a second wall 162B (e.g., a back wall in the direction of travel of the nozzle 150B). As shown, in this extrusion nozzle design, side walls 164 are contoured, having an initial cross-sectional area at the entry region 152B, which widens to the greatest cross-sectional area in the transition region 155B where the internal baffle structure is disposed, and then narrows to a smaller cross-sectional area at the terminal end 156B. After the exiting from the baffle structure 190, the ECC material is recombined in a tapered or constricted area with a reduced cross-sectional area to the terminal opening 158B. The second wall 162B slants inwardly from the entry region 152B to the terminal opening 158B to define a trailing edge 168B to assist with shaping of the bead of ECC material as it is deposited.

The terminal end 156B of the extrusion nozzle 150B further comprises at least one shaping blade 170B that extends or protrudes from the terminal opening 158B for a distance that may enable contact with substrate 102. More specifically, the terminal end 156B of the extrusion nozzle 150B may comprise a pair of protruding shaping blades 170B that are fixed with respect to the terminal end. The shaping blades 170B may be integral with one another and/or each sidewall 164B to define flanges that extend beyond the terminal opening 158B. The trailing edge 168B may be defined between the pair of shaping blades. 170B. These shaping blades 170B can serve a similar purpose to the previously described variations in assisting with shaping of the bead of ECC material as it is deposited, smoothing walls of the deposited layers, and promoting fiber alignment and enhance mechanical properties of the hardened ECC material due to promoting fiber alignment. The extrusion nozzle designs provided above are examples of embodiments prepared in accordance with certain aspects of the present disclosure, but variations in the design are also contemplated herein.

Figure 11:
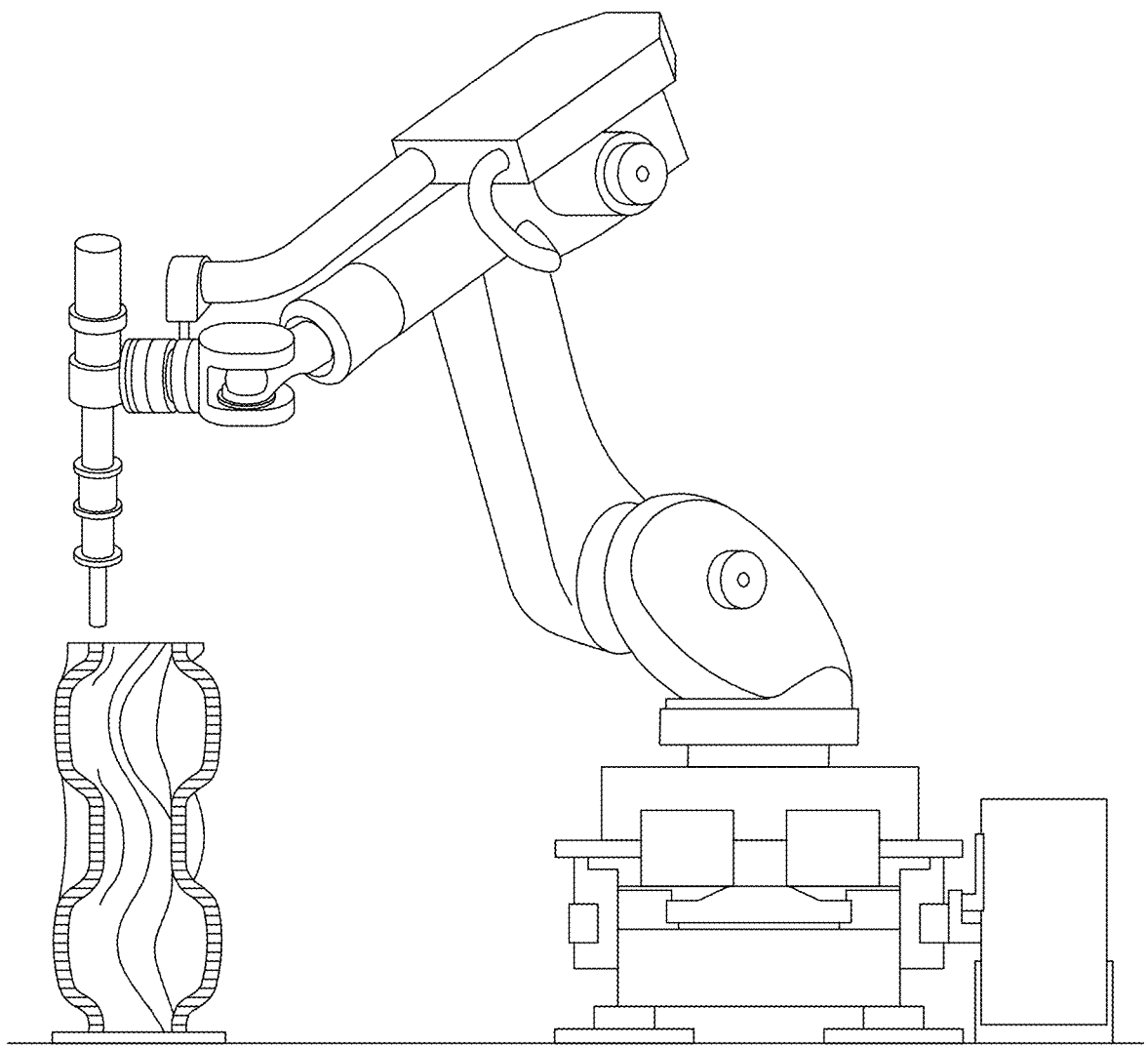
FIG. 11 shows a structural column component having a wave-like contoured shape formed from a printable ECC composition with an additive manufacturing system prepared in accordance with the present disclosure.
Figure 12:
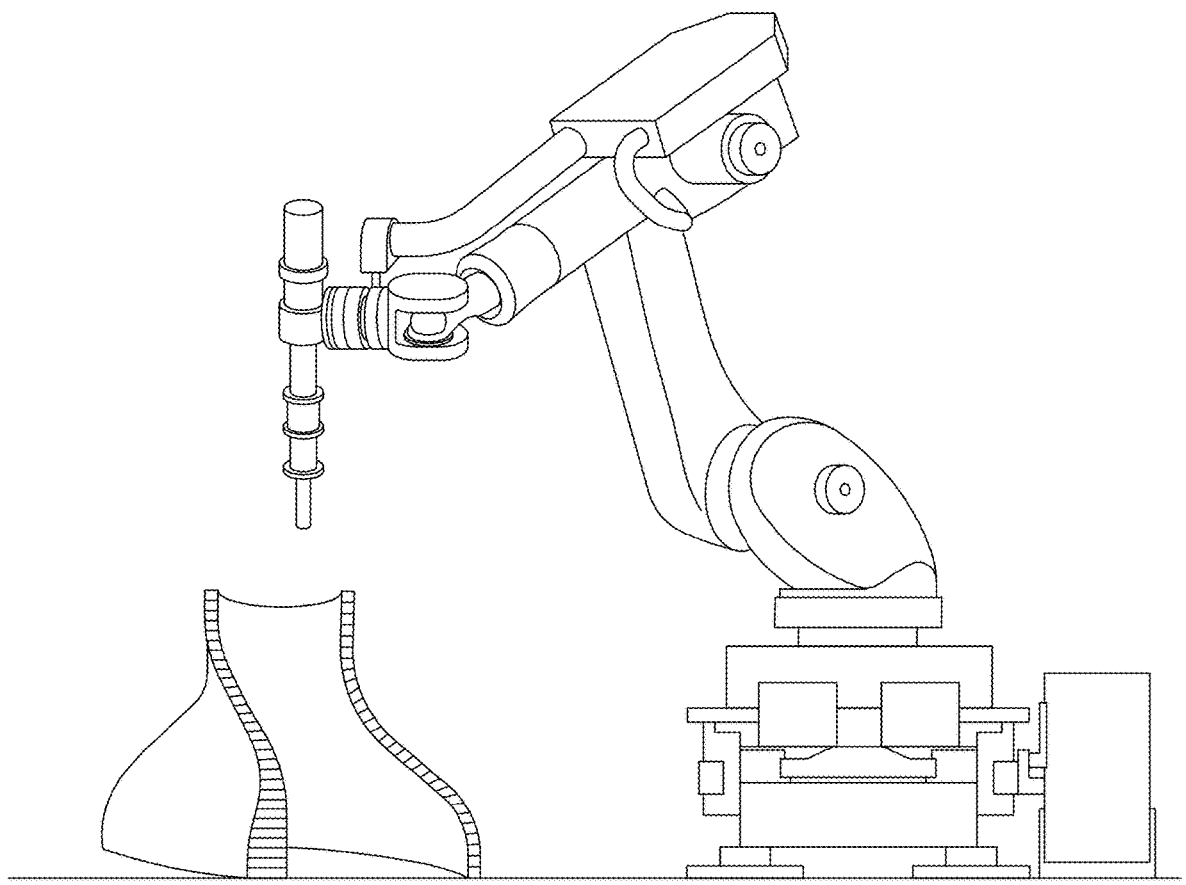
FIG. 12 shows a structural column component having a wave-like contoured shape and layers with different thicknesses formed from a printable ECC composition with an additive manufacturing system prepared in accordance with the present disclosure.
Figure 13:
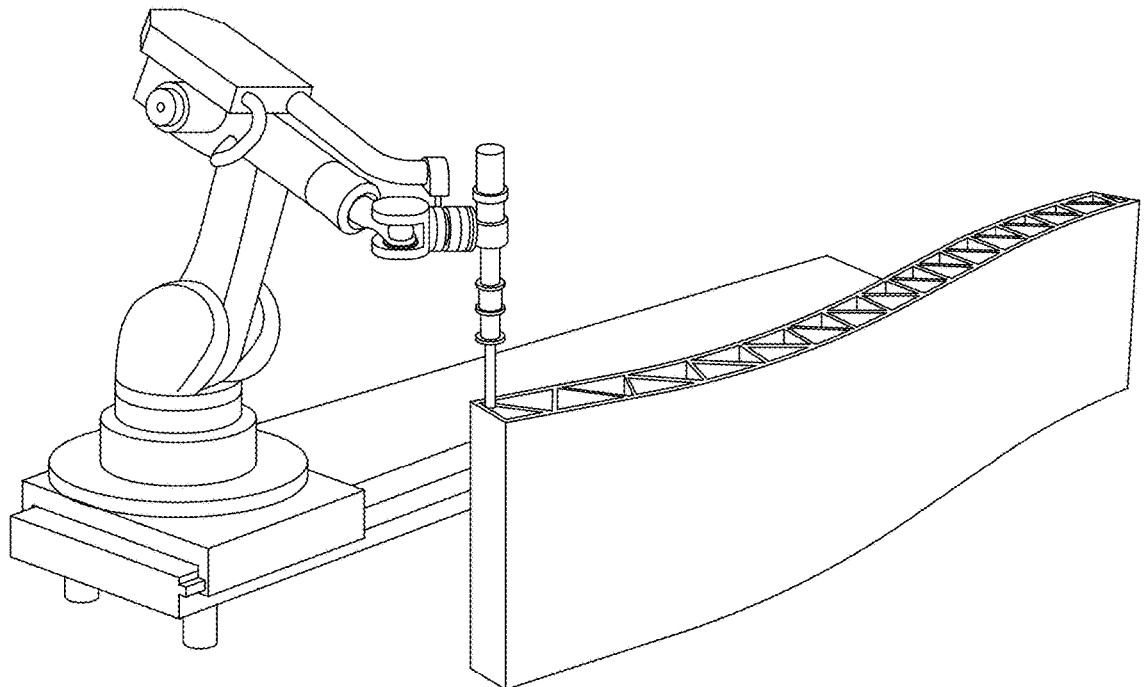
FIG. 13 shows a structural component having internal reinforcing ribs formed from a printable ECC composition with an additive manufacturing system prepared in accordance with the present disclosure.

The additive manufacturing systems provided by certain aspects of the present disclosure have been used to form a range of architectural components. These include, but are not limited to, columns with variable cross-sections and orthogonal penetrations, rib stiffened floor slab (effectively a variable waffle slab) and wall panels. A further variation of these include the novel approach of printing onto a prepared mold, which provides for a smoother surface than is currently achievable through printing alone. By way of non-limiting example, FIGS. 11-13 show the formation of different structures from printable ECC compositions with such additive manufacturing systems prepared in accordance with the present disclosure. In FIG. 11, the structural column has smooth walls of varying diameter up and down the height of the column with a wave-like contour. FIG. 12 shows a printed structure formed from a printable ECC composition having smooth contoured walls with different thicknesses (or widths) across each deposited layer. FIG. 13 likewise shows a printed structure having smooth walls and internal reinforcing ribs formed by processing a printable ECC composition in an additive manufacturing systems prepared in accordance with certain aspects of the present disclosure.

Example 1

Additive Manufacturing Process Setup

The setup used in this example was developed to maximize geometric control, while addressing the challenges and opportunities of printing with ECC. The devised system is based on a 6-axis industrial robot with 2.8 m reach and 120 Kg payload, mounted to a linear gantry, similar to the additive manufacturing system described in FIG. 1. In order to address the start/stop behavior, as well as to support dynamically variable material flowrates, the feeding system (e.g., transport/placement system) comprises a hopper mounted to a servo-driven peristaltic pump. This feeds a supply line (e.g., a 4 m long hose) connected to a custom-built servo-driven PC pump, mounted at the end of the robotic arm. A pressure transducer at the inlet of the PC pump provides feedback to the peristaltic pump in order to maintain constant inlet pressure, even as the PC pump starts/stops or varies flow. Due to the pulsation inherent in peristaltic pumps, and the dead time between the pump and the transducer, this setup can cause a significant pressure swing, which can overcome the pressure-holding ability of the single-stage PC extruder and lead to excess material in the nozzle. This can be addressed by adding an inline pulsation dampener and/or using a multi-stage progressive cavity pump with higher pressure holding ability. Additionally, by modifying the nozzle geometry to create an "open" area in the leading face of the nozzle, these material pulses can be buffered and shaped as they exit the nozzle.

Sizing of PC pumps is typically based on desired flow rates, and there are rpm limits due to the excessive stator wear and friction that may result from higher speeds. With ECC mixes, the rotor/stator geometry requires a significantly larger pump to minimize the interaction or pinching that occurs between the fibers and the rotor/stator, even with soft fibers. This pinching leads to higher friction/rotor torque, which could result in catastrophic damage to an otherwise properly sized pump. While friction can be reduced by lowering the mix viscosity, it is also observed that it is important to maintain a minimum mix viscosity to prevent bleeding.

In more common additive manufacturing technologies, such as Fused Filament Manufacturing (FFF), surface finishes are governed by the layer resolution; smaller layers lead to a higher fidelity between the design and the manufactured component. Here, the experiments have utilized layer thicknesses (e.g., layer height) ranging from 5-15 mm, with the typical thickness being about 10 mm in order to strike a balance between material demand and the overall scale of the prototypes. In the case of full-scale construction, the desired resolution will be balanced with an acceptable overall build rate. At a 10 mm layer thickness, the differences between various nozzle designs and bead shaping approaches become readily apparent.

The achievable surface finish is closely related to the process challenges discussed above. In the case of the commonly used round extrusion nozzle, any pulsation or change in flowrate relative to the motion of the extruder tool center point (TCP) will change the bead width, resulting in a wavy edge and also causing potential mechanical flaws in the structure.

In the case of 3DP ECC, experiments have also shown that even with soft fibers, such as PVA or PE, the fibers often penetrate the surface. Higher viscosity mixes, or those that are reaching the end of their "extrudability window," often show buckling effects or tearing as they exit the nozzle. The nozzle designs provided by certain aspects of the present teachings reduce or eliminate these negative effects in printing with ECC, while striking a balance between resolution and printing efficiency.

Evaluation of Nozzle Performance and Surface Finish

The nozzle design parameters described in the context of FIGS. 3A-3C were tested using an iterative approach in order to determine their influence on the printing process and the resulting surface finish. As a proof of concept, two case studies were developed to demonstrate the constraints and benefits of the nozzle shaping system.

Figure 8A:
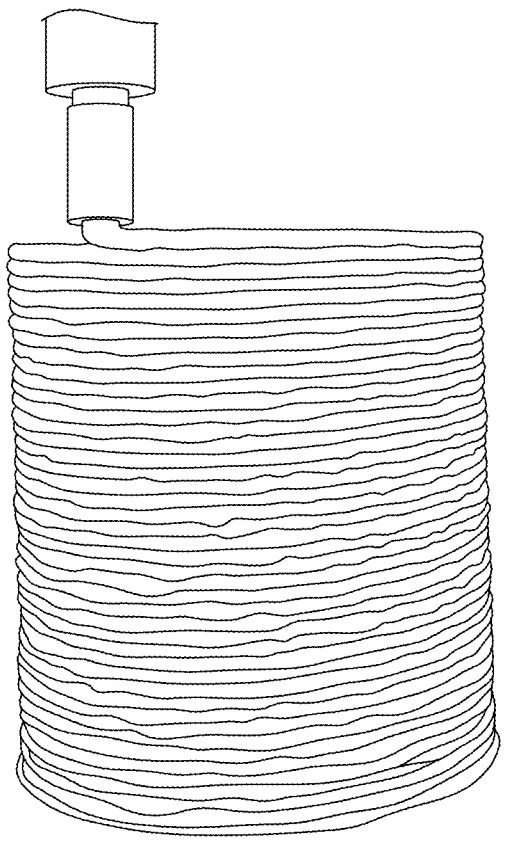
Figure 8B:
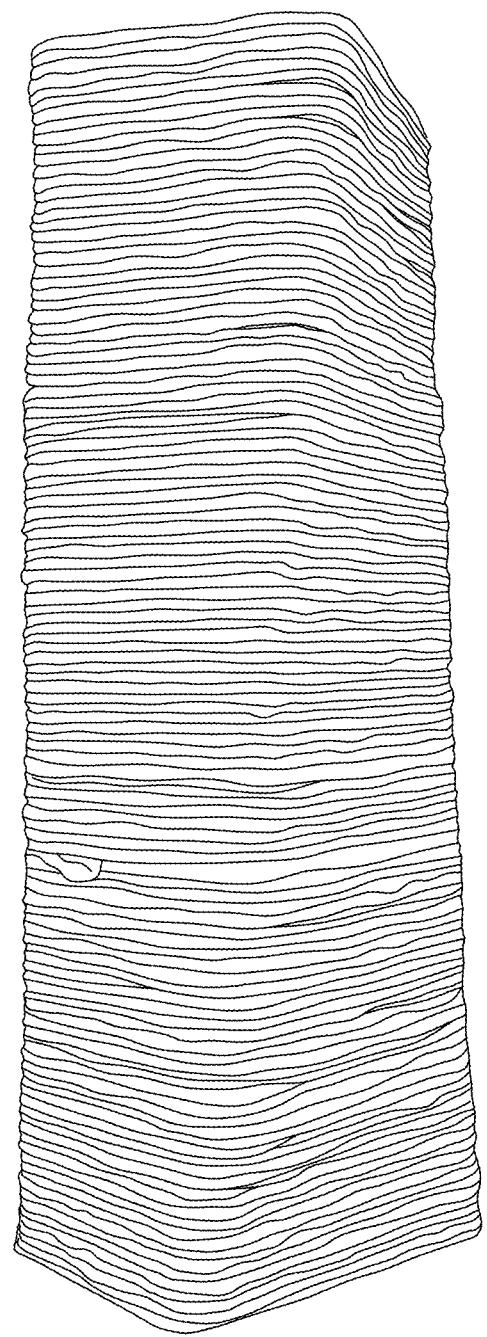

FIGS. 8A-8B show the challenges of three-dimensional printing of ECC materials using an extrusion nozzle without use of shaping or a tiltable deposition head. The example column here was printed with a 3 degrees of freedom (DOF) robotic toolpath, using a nozzle with an exit shape. In cases where the nozzle is round and does not have an orientable shape, additional DOF do not affect the resulting shape. As can be seen, conventional ECC additive manufacturing poses challenges, including issues with consistent pumpability of the ECC from the printing device and an uneven surface finish of the interior and exterior walls. As can be observed, the surface finish is problematic in that rings or grooves from each deposited layer are highly visible and the thickness of material as it is deposited (in other words, the width of each layer) is variable and uneven, resulting in walls with grooves and lumps.

Diagrid Panel

Figure 9B:
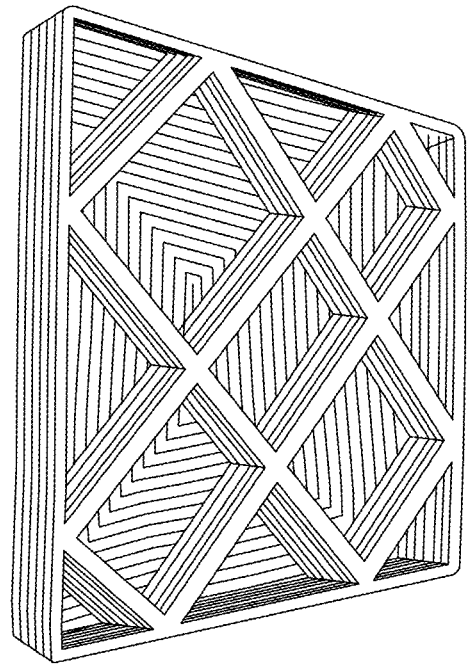
Figure 9A:
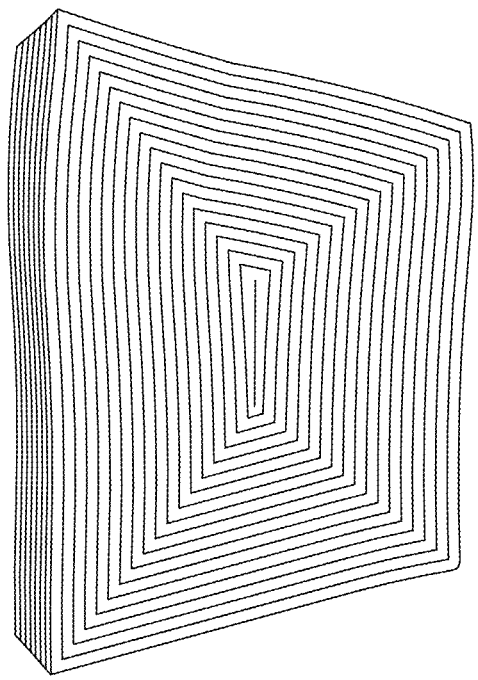

The first case study is a façade panel with a doubly curved face, stiffened by a network of ribs as shown in FIGS. 9A-9B. As opposed to printing the panel in the vertical orientation, it was printed horizontally on a prepared mold, with the goal of improving the surface finish of the doubly curved face. This design provided the additional opportunity to test the ability of the 3DCP process according to certain aspects of the present disclosure to aggregate layers horizontally for the face layer, as well as vertically for the stiffening ribs and flanges for the panel. Using the variable extrusion rate capabilities, the ribs are designed to have variable depth, but the same number of layers at every point in the w direction. This allows the doubly curved surface to resolve to a level datum at the upper layer. While demonstrated as a panel, this process presents numerous potential applications for the design of variable depth waffle slabs and non-rectilinear masonry units.

In order to aggregate the layers horizontally, as well as allow the stiffeners to intersect and join at corners, the panel required the use of a nozzle without side blades. To achieve a seamless face coat on the mold, attention was given to the overlap of each successive bead, as well as an increase in the flowability of the mix. In this experiment, the print path has an offset equal to the nozzle width, and the flowrate is manually increased by 5%. After printing the face layer, the path continues directly into the stiffeners. The stiffeners also provided an opportunity to test the achievable surface finish without fully guiding the extruded bead. The results show that the shear and bending stresses on the extruded bead cause a loss of fidelity as it makes the transition from the w to u direction in an unsupported way. Subsequent tests reveal that it is important to support the extruded bead for as long as possible to allow the deposited material to stabilize.

Bifurcating Column

Figures 10A, 10B:
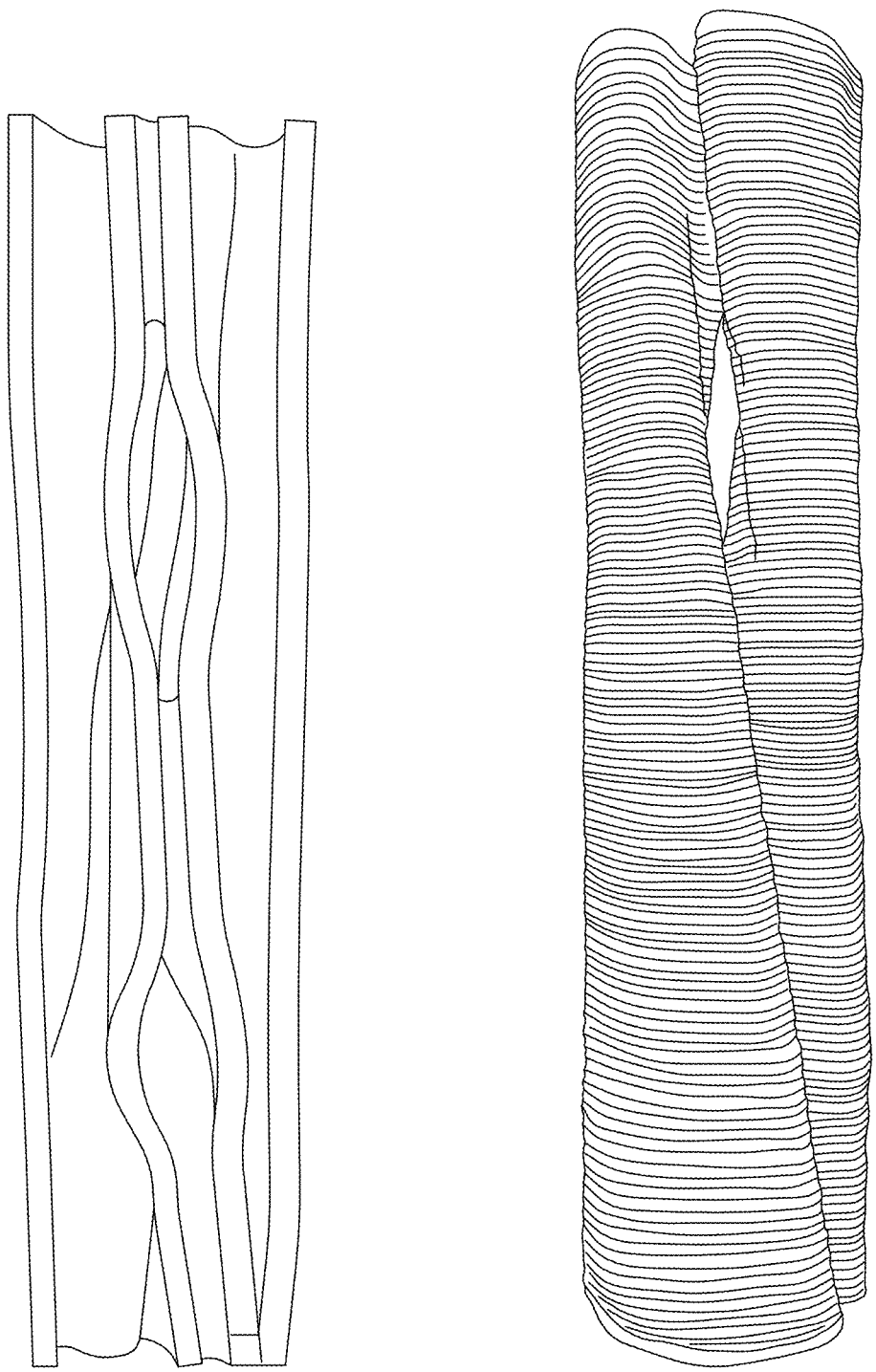
Figure 10C:
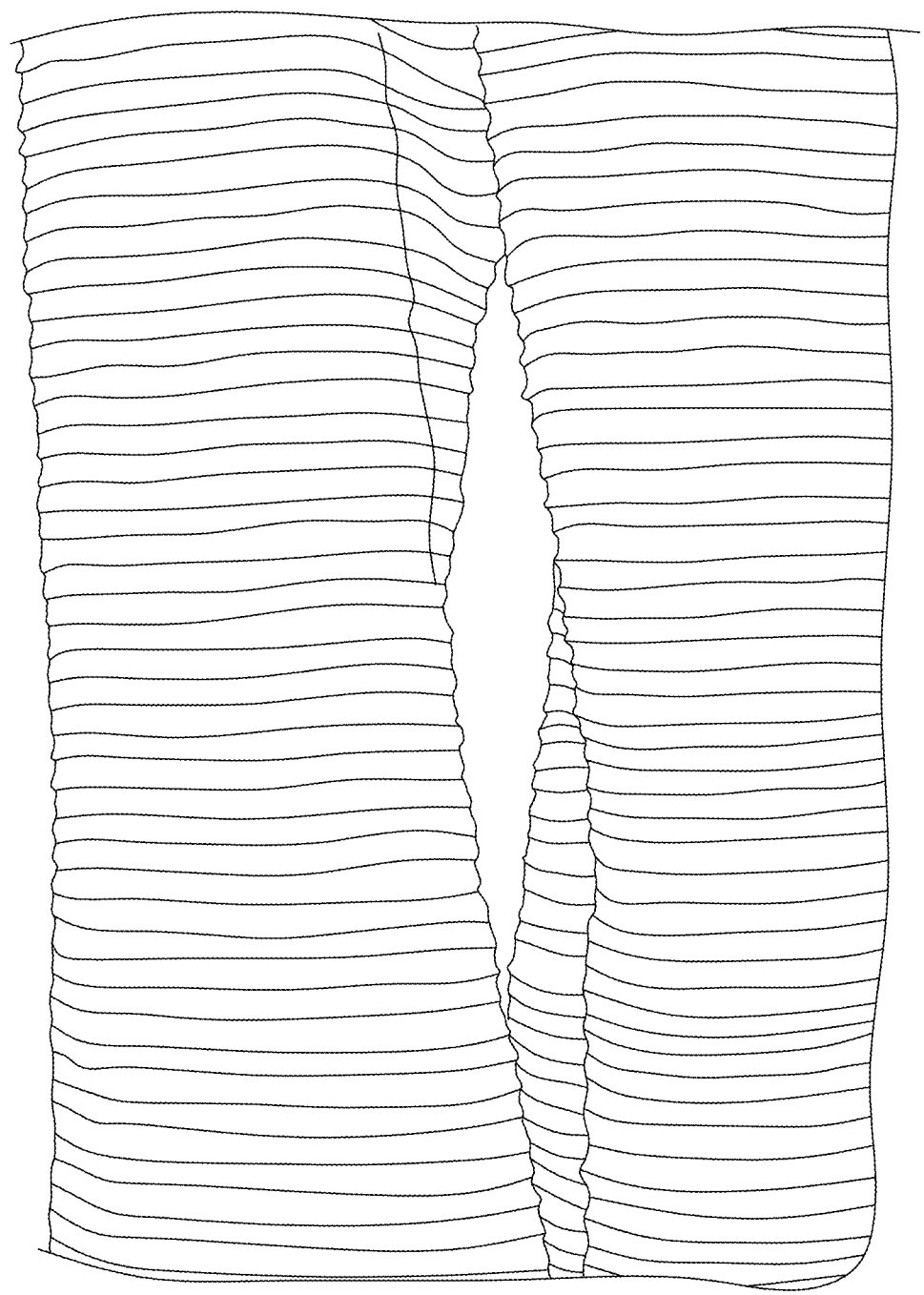

The second case study shown in FIGS. 10A-10C was developed as a twisted, hollow column, which bifurcates and recombines twice in elevation. FIG. 10A shows a graphical illustration of a section through the printed column. FIG. 10B shows an additively manufactured ECC structure printed from this design. FIG. 10C shows a close up showing the layer surface finish. This study was developed to test the start/stop behavior of the system, to explore increased tilt steering with the 6 DOF system, and to test moderate overhanging of the geometry. Additionally, the corner radii were set at the minimum radius for the nozzle, which was designed with fixed side blades at 14 mm long.

The column print demonstrates that the nozzle shaping system produces improved surface finishes relative to the nozzle without side blades. The performance of the printing system is highly dependent on proper tuning of the flowrate. In the absence of a closed loop monitoring system, the flowrate requires frequent adjustment. In part this is due to time-dependent material properties; at a given inlet pressure, as the mix viscosity begins to increase at the end of a batch, the flowrate decreases. In order to address this, the PLC motion controller, equipped with an operator override, allows adjustment of the flowrate as needed. Excessively low flowrates cause incomplete bead formation, whereas high flowrates cause excess material to pass below the side blades, producing small extensions at regular intervals that can be observed on the prototype structure. It is further contemplated that this area could include a sensing device, which can evaluate the bead shape and adjust the flow rate automatically.

Material Effects

It was observed that ECC mixes can be adjusted to improve their shapeability as they exit the nozzle. The shaping blades tend to stabilize the bead, possibly due to fiber alignment effect. This effect seems to be shear stress dependent (and thus is affected by the print velocity). This was particularly evident when the print speed was reduced in order to extend the time between batches. While the flowrate of the system is synchronized to the print velocity, the change in surface finish at low speeds suggests that a "stiction" effect can occur in the shaping nozzle. While not limiting, it is hypothesized that the thixotropic nature of the ECC mixes may be contributing to the shaping effect, and that there is an optimum range of velocities that produces an ideal viscosity as the bead exits the nozzle. Furthermore, ECC mix design may have to be modified to offset shear-thinning as print speed increases.

Example 1 thus shows the basic implementation of a nozzle shaping and 3DCP infrastructure, which can support the deposition of ECC/SHCC materials with an improved surface finish compared to approaches, which use a static printing nozzle. Such nozzle designs can improve surface finishes across a wider range of component geometries, including those with self-intersecting paths. In addition to improving the surface finish of 3DCP building components or structures, by taking an integrated approach to the design and manufacturing workflows used in 3DCP, a process has been developed which can produce highly refined, self-reinforcing building components with minimum material usage.

Example 2

In this example, a printable ECC composition is tested, including determining the tensile properties and size effect of robotically printed dog-bone specimens from uniaxial tension tests. Interfacial fracture toughness is measured using three-point bending tests on specimens with smooth and grooved surface treatments to verify their corresponding influence. Anisotropic compressive strength and stress-strain relationship are determined using printed cube and prism specimens. The digital image correlation (DIC) method is used to capture the complete compression damage process.

Raw Materials and Mix Proportions

The printable ECC composition described in this example comprises four categories of components, namely the binder materials, the fine sand, the reinforcing fiber, and the chemical additives. The binder materials are ordinary Portland cement (OPC) 52.5R and fly ash (FA). The chemical compositions of OPC and FA are shown in Table 1. F75 silica sand with particle size ranging from 50 to 550 μm is used as the fine aggregate. Polyvinyl alcohol (PVA) fiber with 1.2% oil (by mass) is used as the reinforcement. The physical and mechanical properties of PVA fiber are listed in Table 2. A polycarboxylate-based high range water reducer (HRWR) is used for quick liquefaction of dry powder, and powder-based hydroxypropyl methylcellulose (HPMC) is added to control the viscosity and cohesion of the mixture.

TABLE 1

Chemical compositions of cement and fly ash

|     | $SiO_2$ | CaO   | $Al_2O_3$ | $Fe_2O_3$ | MgO  | $Na_2O$ | $K_2O$ | $SO_3$ | $TiO_2$ | L.O.I. (950° C.) |
|-----|---------|-------|-----------|-----------|------|---------|--------|--------|---------|------------------|
| OPC | 20.10   | 62.92 | 5.62      | 2.17      | 1.14 | 0.30    | 0.85   | 2.92   | —       | 3.84             |
| FA  | 46.84   | 20.86 | 15.49     | 6.95      | 2.66 | 1.00    | 2.76   | 2.05   | 0.77    | 7.41             |

TABLE 2

Properties of PVA fibers

| | Fiber parameters | | | |
|---|---|---|---|---|
| | Diameter $d_f$, μm | Length $L_f$, mm | Tensile strength, MPa | Elastic modulus, GPa |
| Value | 39 | 8 | 1600 | 30 |

The mix proportion of printable ECC composition is listed in Table 3. SP is the superplasticizer, here a polycarboxylate-based high range water reducer (HRWR). The fly ash is Class F fly ash. The viscosity modifying agent (VMA) is a powder-based hydroxypropyl methylcellulose (HPMC). High-volume fly ash (mass ratio of FA/OPC=3.3) is used to partially replace the amount of cement, which, on the one hand, reduces the viscosity and consequently increases the flowability and pumpability of the printable ECC composition; on the other hand, moderates the environmental impact of the printable ECC composition. The sand/binder and water/binder ratios are 0.26 and 0.24, respectively. 2% PVA fiber by volume is added to ensure a strain-hardening behavior of the printable ECC composition.

TABLE 3

Mix proportion of printable ECC composition (3DP-ECC)

| Cement ($kg/m^3$) | Fly ash ($kg/m^3$) | Silica sand ($kg/m^3$) | SP ($kg/m^3$) | Viscosity Modifying Agent VMA ($kg/m^3$) | Water ($kg/m^3$) | PVA fiber ($kg/m^3$) |
|---|---|---|---|---|---|---|
| 309 | 1026 | 345 | 3 | 2 | 321 | 26 |

Printing Setup and Mixing Process

The robotic 3D printing setup used in this example is developed to maximize geometric control while addressing the challenges and opportunities for printing with ECC. It includes two parts, the feeding, and extruding systems as shown in FIG. 1 and like the device described in Example 1. As previously described, the feeding system comprises a hopper mounted to a servo-driven peristaltic pump, which feeds a hose connected to a custom-built servo-driven progressive cavity (PC) pump that is mounted at the end of the robotic arm. The peristaltic pump has the capability for handling a high-viscosity mixture, but also has the disadvantage of significant pulsation under certain process conditions, although this can be mitigated with pulsation dampeners. Its relatively open flow design improves the passage of fiber-reinforced ECC through the pump. The peristaltic pump, without any disassembly, is easier to clean and flush than other pump types.

As discussed above, a pressure transducer at the inlet of the PC pump provides feedback to the peristaltic pump to maintain a constant inlet pressure, even as the PC pump starts/stops or varies flow. Due to the pulsation inherent in peristaltic pumps and the deadtime between the pump and the transducer, the current setup causes a significant pressure swing, which can exceed the pressure-holding ability of the single-stage PC extruder and lead to excess material in the nozzle. By modifying the nozzle geometry to create an open area in the front face, these material pulses can be buffered and shaped as they exit the nozzle. Additionally, for ECC mixtures, the rotator/stator in the PC pump requires a much larger size to minimize the interaction or pinching that occurs between the fibers (even with soft PVA fibers) and the rotator/stator. This pinching leads to higher friction/rotor torque, which could result in catastrophic damage to the PC pump and low tensile performance of printable ECC composition due to its undesirable fiber dispersion. While friction can be reduced by lowering the mix viscosity, it is also observed that a minimum viscosity helps prevent bleeding.

Small scale mixing (15-25 L) was employed in this example considering the time-dependent fresh properties of ECC and the amount of ingredient materials required. The mixture was carefully prepared to ensure a superior fiber dispersion for optimal material and printing performance. All the dry ingredients including powder-based HPMC were initially mixed for 30 seconds at the speed of 90 rpm. Water and HRWR were then added and agitated for another 2 minutes at the speed of 180 rpm to swiftly liquefy the dry particles. PVA fibers were added into the matrix in two parts and mixed at the speed of 180 rpm for 2 minutes. After all the fibers were blended, mixing continued for an extra 2 minutes. This prepared mixture was partly used for 3D printing. Material from the same mix batch was also used to cast specimens to compare property differences resulting from two different material processing methods.

Test Preparation of Printable ECC Composition (3P-ECC) in the Fresh State

The challenges of balancing the time-dependent rheological properties of flowability and buildability in printable ECC composition (3DCP) have been widely recognized. The demands for ideal rheological properties are different for the mixing, transport, extrusion, and placement phases of printable ECC composition (3DP-ECC). In each phase, complex interactions between equipment, process, and material take place.

The fine-tuned rheological properties of fresh ECC enable its application in 3D printing. The rheological behaviors of 3DP-ECC determine not only the pumpability and extrudability, and the deformation stability of the placed filaments (buildability), but also the interlayer bond property that affects the performance of the printed ECC structure in the hardened state. The addition of 2% fiber by volume significantly impacts the rheological characteristics of ECC. Moreover, high fiber volume and high fly ash content have secondary impacts on the pumping system. While the addition of fly ash is known to increase the flowability of ECC, excess increases can cause bleeding during the feeding and extruding process. This effect, coupled with high fiber volume fraction, risks segregation and blockage of flow in the system. Therefore, a balanced combination of flowability and buildability of 3DP-ECC with an appropriate open time is targeted in the present example.

Figure 14A:
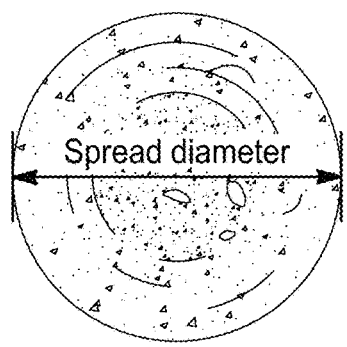
FIGS. 14A-14C show results from three types of fresh-property ECC composition tests conducted.
Figure 14B:
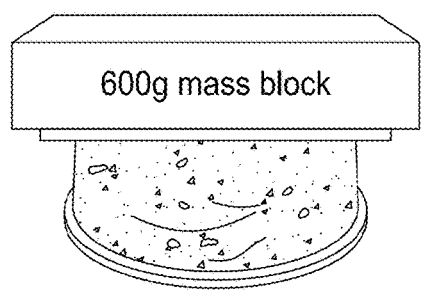
Figure 14C:

Three types of fresh-property tests conducted in this example included: the flow-table test (FIG. 14A), the shape-retention test (FIG. 14B), and the green-strength test (FIG. 14C).

The flow-table test was conducted to determine the flowability of the fresh ECC mixtures from 20 (hereafter set as T20) to 100 minutes (T100) after water addition at intervals of 20 minutes (FIG. 14A) as per ASTM C1437. The fresh ECC was filled into an inverted half cone with diameters of 70 mm and 100 mm at top and base, respectively, and height of 60 mm. After removal of the cone and after 25 shocks (table-drops), the diameter of the spread material on the flow-table was measured to determine the open time of proper flowability for the current printing system.

The buildability or the shape-retention ability of mixed ECC, reflecting the ability to bear the self-weight of consecutive layers while limiting its deformation, was determined following the procedure described in Nematollahi. B., et al, "Effect of polypropylene fibre addition on properties of geopolymers made by 3D printing for digital construction." Materials, 11 2352 (2018), the relevant portions of which are incorporated herein by reference. The fresh ECC at T20 was filled into a cone. After cone removal, a 600 g weight was placed on the top surface of the ECC and the deformation at the base circle was measured after 1 minute. The smaller the spread diameter, the higher the buildability of the mixture. The test setup is shown in FIG. 14B.

The green strength-deformation relationship of the fresh 3DP-ECC at T20, which provides a general guideline for the upper limit printing speed, was obtained from the prism (50×50×100 mm) compression test. The green prism deformation was measured using the digital image correlation (DIC) method. Randomly black-white speckles were sprayed onto the specimen surface for deformation calculation. A digital camera with a resolution of 6000×4000 pixels was used to automatically take pictures at intervals of 5 seconds. The compression test setup is shown in FIG. 14C and loading rate was 3 mm/min to ensure test completion in 10 minutes to minimize any buildability increase during the test.

Test Preparation of 3DP-ECD in the Hardened State
Compressive Test

Due to the presence of the layer interface, the compressive properties of hardened printable ECC composition (3DP-ECC), including the compressive strength and stress-strain relationship, are expected to differ with the loading directions, i.e., perpendicular and parallel to the interfacial direction. See FIG. 15A. Therefore, the compressive properties in both directions were investigated and compared to the properties of cast ECC specimens.

The compressive strength of printable ECC composition (3DP-ECC) was obtained from cube specimens with 50 mm edge length and the stress-strain relationship was obtained from prism specimens. The cross-section of printed ECC filament for the compression test was 50 mm in width and 10 mm in thickness. Both the cube and prism specimens were cut from a printed wall, as shown in FIG. 15B. Four curing ages, namely 1 day, 3 days, 7 days, and 28 days were chosen to obtain the strength development of the 3DP-ECC. At each curing age, four cube specimens and three prism specimens were prepared. The specimens are named as Cube/Prism-Per/Par-A, where Per/Par is the abbreviation of perpendicular or parallel to the printing direction, A is the curing age. For comparison, cast ECC cube and prism specimens were prepared for 28 day testing. The compressive test plan is detailed in Table 4.

TABLE 4

Compressive test matrix of 3DP-ECC specimens

| Specimen | Curing | | | |
|---|---|---|---|---|
| | 1 d | 3 d | 7 d | 28 d |
| Cube-Per | 4 | 4 | 4 | 4 |
| Cube-Par | 4 | 4 | 4 | 4 |
| Prism-Per | 3 | 3 | 3 | 3 |
| Prism-Par | 3 | 3 | 3 | 3 |
| Cast-cube | — | — | — | 4 |
| Cast-Prism | — | — | — | 3 |

The test setups of both cube and prism specimens are shown in FIGS. 16A and 16B and the loading rate of both tests was fixed at 0.5 mm/min until failure. The crack formation of the prism specimen was monitored by the DIC method. Digital images were automatically taken at intervals of 20 s.

Uniaxial Tensile Test

For cast ECC, plain dogbone specimens (FIG. 17A) according to JSCE specification were prepared in this study to measure the stress-strain behavior under uniaxial tension. The cross-section of the tensile specimen was 30 mm×13 mm and the gauge length was 80 mm. For printed ECC, a filament with the same cross-section (30 mm×13 mm) was first printed in the mold. The rest of the mold was then filled with cast ECC to form the dogbone shape (FIG. 17B). The dogbone geometry ensures the occurrence of microcracks in the narrow-gauge region. Both cast and printed ECC specimens were prepared and tested to obtain their tensile properties at 3 day and 28 day intervals. The size effect of printed and cast ECC on tensile properties was also investigated by comparing the tensile performance with different layers or thicknesses. The printed specimen was named as P-xL-yd, where x means the number of layers, y means the curing age (3 d or 28 d); while the cast specimen was named as C-x-yd, where x means the thickness of the specimen (13 and 26 mm), y means the curing age. At least three samples were prepared for each case.

The uniaxial tensile test setup is shown in FIG. 17C. A fixed-pin end connection was used at the end of the steel grip to minimize bending stress induced by potential eccentricity or misalignment. The tensile tests were conducted at a fixed loading rate of 0.5 mm/min according to JSCE. Two linear variable displacement transducers (LVDTs) fixed on an aluminum frame was used to measure the elongation of the specimens. The average reading of the two LVDTs was adopted to calculate the tensile strain. The load value was read from the load-cell of the test machine.

Interfacial Fracture Test

The mechanical property of the interface between adjacent filaments of 3DP-ECC has not previously been investigated. Here, the interfacial fracture behavior of printed ECC was determined by the three-point bending test with a single notch in the center of the specimen (FIG. 18A). The specimen length was 200 mm with a span of 160 mm; the specimen height and thickness were 40 mm and 30 mm, respectively. The notch/depth ratio was 0.4. The fracture property of printed ECC itself was also determined to further evaluate the weakness of the layer interface. The intra-layer notched beam was prepared with the same dimensions as the inter-layer notched beam (FIG. 18B).

Additionally, different surface treatments at the interface between layers, i.e., smooth (FIG. 19A) and grooved (FIG. 19B) surfaces of 3DP-ECC were used to investigate their influence on the interfacial fracture toughness. Physical interlocking between adjacent layers would increase the mechanical strength of the printed mortar. The interlocking in 3DP-ECC was achieved by grooving the filament using a corrugated extrusion nozzle, such as shown in FIGS. 6A-6D. The placement of the next extruded filament on the grooved surface resulted in groove-and-tongue joints. The groove depth and width were approximately 3 mm×3 mm. At least four specimens were prepared for each case. The specimens were named Inter(Intra)-S(G)-xd, where Inter and Intra are the abbreviations of inter-layer and intra-layer, S and G represent the smooth and grooved surfaces, x means the curing age. The detailed fracture property test plan is shown in Table 5.

TABLE 5

Interfacial fracture properties test plan of 3DP-ECC

| Notch | Surface | |
|---|---|---|
| | Smooth | Grooved |
| Inter-layer | 1 d, 3 d, 7 d, and 28 d | 1 d, 3 d, 7 d, and 28 d |
| Intra-layer | 1 d, 3 d, 7 d, and 28 d | — |

Rheological Properties of Fresh ECC
Flowability and Shape Retention

The spread diameters of the fresh ECC mixtures from T20 to T100 at 20-minute intervals were measured in the flow-table test (FIG. 14A). As shown in FIG. 20A, the spread flow decreased with rest time (measured as time elapse after water addition in the mixing process) as expected. It is noted that the mixture did not exhibit flow before the flow table drop was applied. This behavior implies an almost zero-slump state, benefiting the shape-retention ability of fresh ECC. The mixture at T80 was found to be difficult to pump in the current peristaltic pumping system. To balance viability for pumping with reasonable shape-retention, the minimum spread diameter of fresh ECC was determined to be 120 mm.

From the shape-retention test (FIG. 14B), the spread diameters of the fresh ECC under a static 600 g weight were measured at different rest times (FIG. 20B). Similar to the flowability test results, the spread diameter in the shape-retention test also decreased with rest time, reflecting an increasing shape-retention ability and buildability.

The combination of flowability and shape-retention tests determines the open time of the present printable ECC to be around 70 minutes after water addition to enable an appropriate balance between pumpability and buildability. Using an ECC mix at T20, both pumpability and buildability were demonstrated with a 1.5 m high 3DP-ECC twisted column with 150 printed layers of 10 mm thick per layer (FIG. 20C).

Green Compressive Stress-Deformation Relationship

Material parameters including rheology, green strength, and stiffness have a significant influence on the printing parameters, such as layer height limit and print speed. Until now, very few investigations are available on the early-age material properties of 3DP-ECC. Here, a pilot study on the green compressive stress-deformation relationship of 3DP-ECC was conducted (FIG. 14C). The deformation of fresh 3DP-ECC at T20, which could provide a deformation-based failure criterion for printed ECC element, was monitored by the DIC method.

The fresh prism experienced shortening with barreling of the center portion under increasing load (FIG. 21A). The strain pattern deduced from the DIC data is shown in FIG. 21B. The compressive stress increased monotonically even under a large deformation exceeding 20% (FIG. 21C). The Young's modulus (E=0.14 MPa) of fresh 3DP-ECC could be calculated from the slope of the initial segment of the stress-strain curves at compressive stress below 2 kPa. The upper limit of the printing speed could be estimated from the stress-strain curves. For instance, when the 10% compressive strain (1 mm deformation of a 10 mm-thick printed filament) is set as the target (allowable) deformation, 6.0 kPa compressive stress could be applied to the filament according to the stress-strain relationship. The loading speed in the present test is 3 mm/min and the deformation target is 10 mm (10%×100 mm=10 mm), indicating that the 6 kPa should be applied within 3-4 minutes, setting a ceiling for the printing speed to prevent material failure.

Compressive Property of Hardened 3DP-ECC
Strength Development with Curing Age

The compressive strength development of cube and prism specimens in two directions, namely perpendicular and parallel to layer interface, from 1 day to 28 days are summarized in FIG. 22A-22B. For cube specimens (FIG. 22A), both Cube-Per and Cube-Par increased steadily with curing age, the compressive strengths of Cube-Per-1d, and Cube-Par-1d were 50% of the values at 28d; while the corresponding strength ratios of Cube-Per-7d and Cube-Par-7d were approximately 90%. The compressive strengths of Cube-Par at all the curing ages were only 75% of those values of Cube-Per, which was closely related to the failure modes of these two kinds of cube specimens (FIGS. 23A-23B). The compressive strength of the cast cube specimen was 31.20 MPa at 28d, close to the value of Cube-Per-28d (30.60 MPa), implying, as expected, that the layer interface did not notably influence the compressive strength when the loading direction was perpendicular to the layer interface.

The prism specimens (FIGS. 22B and 22C-22D) shared a similar trend to that of cube specimens with curing age and the strength ratios of Prism-Per to Prism-Par also stabilized around 0.75. The compressive strength of Prism-Per-28d was 28.15 MPa at 28d, comparable to the value of cast specimen at 29.80 MPa. It was also observed that the parallel specimens (cube and prism) had larger error bars or variability in most cases than those of perpendicular specimens, which could be attributed to the more brittle failure mode of parallel specimens. See also, FIGS. 24A-24B.

FIGS. 23A-23D illustrate the failure modes of cube and prism specimens, which shows the influence of the loading direction. The Cube-Per and Prism-Per specimens shared a similar failure mode and crack pattern to those of cast specimens with substantial multiple cracking accompanying the main crack and experienced a significant amount of deformation before failure (FIGS. 23A, 23C). Although there was negligible fiber-bridging between the layer interfaces, the fiber-bridging effect inside the filament remains effective in resisting crack propagation and led to multiple cracks and significant deformation of Cube-Per and Prism-Per specimens under loads.

In contrast, the failure modes of Cube-Par and Prism-Par specimens were notably different with only a few cracks. The main crack (Cube-Par) or the initial crack (Prism-Par) penetrated through the layer interface, resulting in a relatively brittle failure mode, with relatively smaller deformation and lower compressive strength (FIGS. 23B, 23D). No buckling failure of individually printed filament under compression was observed in the Prism-Par specimen. The adjacent filament may have acted as lateral support.

The compressive strength ratios between cube and prism specimens (both perpendicular and parallel specimens) were approximately 0.9 (FIGS. 24A and 24B), except for the specimens at 1 d, which meant that this strength ratio was mainly controlled by the specimen slenderness regardless of the loading directions.

Stress-Strain Behavior

FIGS. 25A-25D show the DIC images of prism specimens at 28 days. Failure of the Prism-Par specimens was initiated with a vertical crack penetrating through the layer interface (FIG. 25A). Only a few cracks could be detected at the final failure stage (FIG. 25B), which resulted in a small deformation of the Prism-Par specimen. The weak interface parallel to the compression load accentuates the splitting failure mode seen in a brittle material.

Figure 25C:
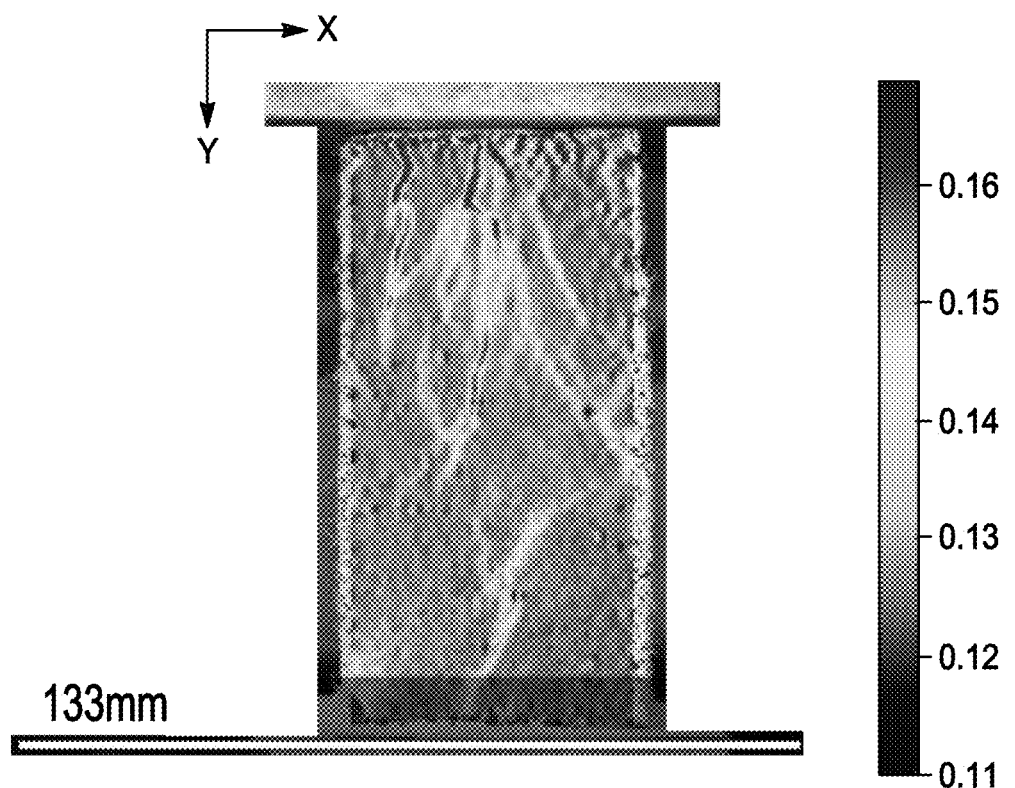
Figure 25D:
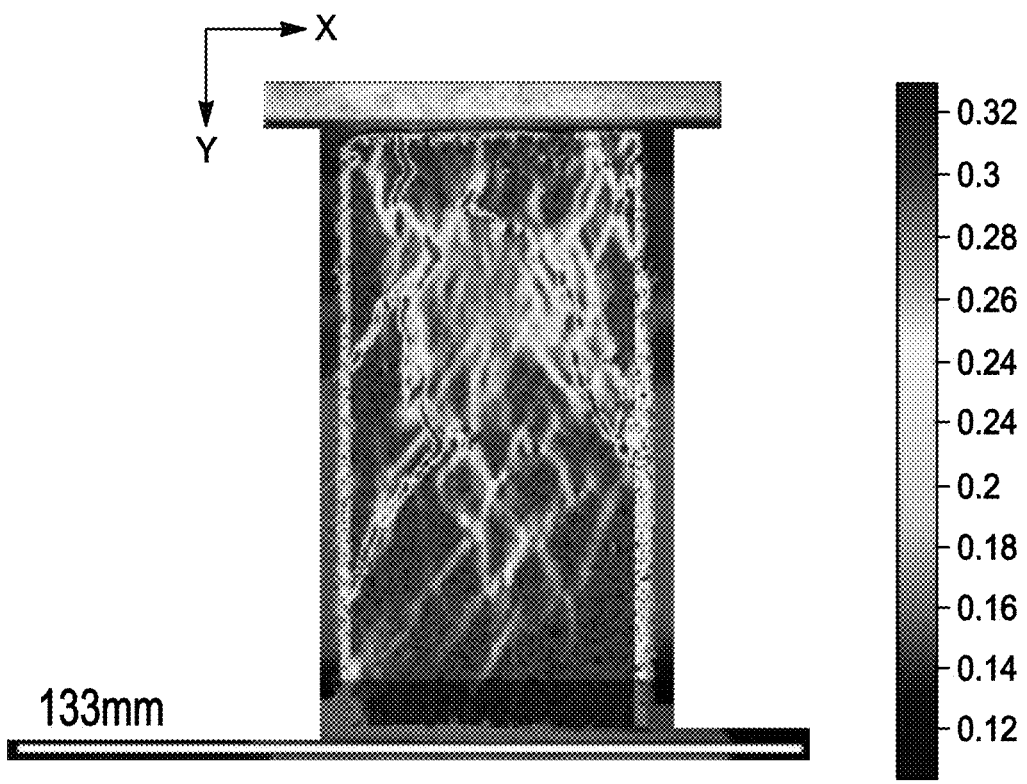

The Prism-Per specimen, however, developed tortuous crack patterns possibly following the kink-trap mechanism at the layer interface (FIGS. 25C-25C). Crack developments are stable with the presence of PVA fibers, promoting more microcrack growth from multiple sites. This results in delayed failure with a higher load and large deformation of Prism-Per specimen from the accumulated damage, consistent with the stress-strain curves shown in FIGS. 28A-28D.

The compressive stress-strain behaviors of 3DP-ECC prisms at 28 days are displayed in FIGS. 26A-26C. The strain values were extracted from the DIC images in the center 50 mm length to avoid the influence of lateral restraints at the two loading ends. The mechanical parameters, e.g., Young's modulus (the slope of the stress-strain curve before 30% of the peak stress), compressive peak stress and corresponding strain were obtained from the stress-strain curves.

The Young's modulus of Prism-Per specimen was 10.67 GPa, 16% lower than that of Prism-Par prism (12.71 GPa), and 10-15% lower than the values obtained from the cast specimens in previous research. Although the space between two filaments was invisible and considered negligible, the accumulation of the closure of multiple spaces in the prism would add notable deformation to the total deformation, reducing Young's modulus of the Prism-Per specimen. This phenomenon suggests the need for special consideration when designing the compression zone of 3DP-ECC elements or structures.

The average peak compressive stresses of Prism-Per and Prism-Par were 28.15 and 21.05 MPa, respectively, and their corresponding compressive strains differed significantly with values of 0.65% and 0.20%, respectively (FIGS. 26A-26B). The compressive strain of Prism-Per was larger than the value of cast ECC at the same strength grade (around 0.5%-0.6%), which could be attributed to the tortuous crack of Prism-Per specimen and the space between two filaments. The smaller strain value of the Prism-Par specimen indicated a premature failure, leading to lower compressive strength and steeper descending branch compared to those of Prism-Per specimen. The compressive constitutive behavior required careful calibrations for future designs given the vast differences in behavior between the Prism-Per and Prism-Par specimens (FIG. 26C).

Tensile Properties of Hardened 3DP-ECC

The tensile stress-strain behaviors of printed and cast ECC specimens with different thicknesses at both 3 days and 28 days are displayed in FIGS. 27A-27H. All the specimens demonstrated robust multiple cracking (FIGS. 27G-27H) and strain-hardening performance with a tensile strain capacity of around 3.0%. There is no reduction in tensile properties in terms of first cracking stress, peak stress and strain capacity of 3DP-ECC specimens from 1 layer to 2 layers (FIGS. 27B-27C), while the cast ECC with thicker cross-section experienced an apparent reduction in tensile performance due to the size effect (FIGS. 27E-27F).

The detailed tensile parameters of printed and cast ECC specimens at different curing ages are summarized in Table 6. For printed specimens, the peak stress increased from 2.37 MPa of P-1L-3d to 3.38 MPa of P-1L-28d, while the corresponding strain capacity decreased by 10%. It was observed that the peak stress and strain capacity of P-2L-28d were almost equal to the values of P-1L-28d, exhibiting a negligible size effect due to the unchanged fiber dispersion in both 1- and 2-layer specimens. However, the tensile peak stress and strain capacity decreased by 14% and 11%, respectively, when the cast specimen thickness doubled from 13 mm to 26 mm. This is likely due to the change from 2D fiber orientation to 3D, which decreased the crack bridging efficiency and resulting in diminished tensile performance.

It should be pointed out that unlike the previous study showing an apparent improvement in tensile performance in terms of peak stress and strain capacity by using caulk-gun technology over cast method, the improvement of the printing process on the tensile parameters is insignificant in the present printing system. In the feeding system (see FIG. 1), the mixture was transported through the hose without excessive disturbance to the mixture. In contrast, in the extruding system, the mixture would be squeezed, and fiber dispersion would be disturbed in the narrow space between the stator and rotator of the progressive cavity (PC) pump. However, during extrusion through the nozzle before placement of the printed filament, the wall effect of the printing nozzle is expected to enhance fiber alignment in the printing direction, which neutralizes the negative effect of the previous action and resulted in tensile property comparable to that of cast ECC specimen. Therefore, it is contemplated that the extruding or extrusion system may be modified to include the use of a larger PC pump or auger pump to reduce the adverse effect on fiber dispersion of ECC.

TABLE 6

Tensile parameters of printed and cast ECC

| | First cracking stress (MPa) | Peak stress (MPa) | Strain capacity (%) |
|---|---|---|---|
| P-1L-3 d | 1.85 (0.09) | 2.37 (0.01) | 3.43 (0.04) |
| P-1L-28 d | 2.86 (0.22) | 3.38 (0.03) | 3.09 (0.25) |
| P-2L-28 d | 2.64 (0.06) | 3.34 (0.04) | 3.09 (0.03) |
| C-13-3 d | 1.63 (0.07) | 2.25 (0.04) | 3.45 (0.05) |
| C-13-28 d | 2.56 (0.04) | 3.36 (0.07) | 3.00 (0.04) |
| C-26-28 d | 1.86 (0.30) | 2.91 (0.14) | 2.67 (0.02) |

Note:
Number in parentheses is the standard deviation of corresponding parameters Layer-to-Layer Interface Fracture Property of Hardened 3DP-ECC The load-displacement curves of fracture tests are summarized in FIGS. 28A-28D. Although it was thought that the crack bridging effect might be negligible due to the lack of fiber crossing the layer interface, the load-displacement curves did show a gentle rise in loading after the initial load drop, which could be attributed to the fiber-bridging effect in the smooth interface (FIGS. 28A-28B, 28D). The crack of the Inter-S-28d specimen went straight up to the loading point (FIG. 29A). It was also observed that the slopes of the second rising branches (in dashed boxes) of Intra-S-28d specimens were higher than those of Inter-S-28d specimens, indicating a stronger fiber-bridging effect in the intra-layer notched specimen.

Prior research has shown that the fracture failure mode is suppressed in ductile (cast) ECC material. The fact that the load-displacement curve of Intra-S-28d shows a quasi-brittle behavior suggests that the fracture property of 3DP-ECC becomes highly anisotropic. The material becomes notch sensitive for a crack propagating in the print and fiber alignment direction.

The presence of mechanical groove-tongue interlocking (FIG. 28C) remarkably increased the load capacity after an initial drop accompanied by a tortuous crack extension (FIG. 29B). This phenomenon provided a promising method in toughening the layer interface, which could suppress any tendency of delamination failure.

The fracture toughness of inter-layer (Inter-S and Inter-G) and intra-layer (Intra-S) notched specimens with different curing ages were calculated according to RILEM specification as shown in FIGS. 30A-30B. All the toughness values increased with curing ages from 1 d to 28 d. Specifically, the fracture toughness was 0.135 and 0.252 $MPa \cdot m^{1/2}$ for Inter-S-1d and Inter-S-7d, respectively, about 50% and 95% of the value of Inter-S-28d (0.268 $MPa \cdot m^{1/2}$). The fracture toughness of Inter-G specimens shared a similar trend over curing age with a higher value of 0.322 $MPa \cdot m^{1/2}$ at 28d (FIG. 30A). The toughness values of Inter-G at all curing ages were almost equal to those of Intra-S, which indicated the potential and reliability of using the deformed interface to increase the interfacial mechanical properties and suppress the delamination failure in the 3DP-ECC system. A further investigation of the grooved interface on the mechanical property of 3DP-ECC remains in progress.

One variation of a 3D-printable engineered cementitious composite (3DP-ECC) with satisfactory flowability and buildability is described herein. The developed mix was adopted in the printing of a 1.5 m tall twisted column with 150 layers using a robotic arm with customized feeding and extruding systems. The fresh behavior, including the rheological and green properties, as well as the hardened properties, including the compressive, tensile, and interfacial fracture performances of 3DP-ECC, were systematically investigated. The interactions between the print process and material properties are emphasized.

Specific conclusions can be drawn as follows. The flowability of 3DP-ECC was determined and optimized for the current feeding system with an open time (e.g., active processing time) of no more than 70 minutes. The developed 3DP-ECC had enough shape-retention ability and consequently buildability at 20 minutes after the addition of water to the dry ingredients as start of hydration process. The compressive stress-strain relationship obtained for green 3DP-ECC enables a deformation-based failure criterion for printed ECC elements as well as an estimation of the upper limit of print speed.

The compressive strengths of hardened 3DP-ECC specimens increased with curing ages from 1 day to 28 days. Anisotropic (perpendicular versus parallel to the layer interface) behavior was found. The Prism-Per specimen exhibited a more ductile failure mode accompanied by higher compressive strength and corresponding strain, and a gentler descending branch compared to those of Prism-Par specimen. However, due to the closing of the space at layer interfaces, the Young's modulus of Prism-Per specimen was 16% lower than that of Prism-Par prism, which could induce a larger deformation of 3DP-ECC element.

Under uniaxial tension, the 3DP-ECC demonstrated robust multiple microcracking and strain-hardening performance with a strain capacity of 3.0%. The tensile properties exhibited negligible size effect due to the consistent fiber orientation in both 1- and 2-layer specimens.

For printed smooth interfaces between deposited layers, a slight fiber-bridging effect was found in fracture specimens, contributing to a gentle rise in the load-displacement curve after an initial drop when a crack extends along the interface from the notch tip. This unexpected effect is likely due to fiber interpenetration across the deposited layers in the green state. However, the interface remains quasi-brittle. With deliberate print grooving using a shaped nozzle, mechanical interlock between the printed filaments was found to introduce a non-brittle failure response with remarkably higher loading capacity. Groove-printing appears to toughen the filament-to-filament interface for suppression of delamination failure tendency in 3DP-ECC structures.

The present study on the fresh rheological properties and hardened mechanical properties of 3DP-ECC establishes the foundation of 3D printing of self-reinforcing strain-hardening ECC.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated printing device for additive manufacturing of an engineered cementitious composite (ECC) structure, the device comprising:
  a feeding system comprising at least one pump configured to pump an engineered cementitious composite (ECC) composition in a fresh state that comprises a plurality of dispersed fibers; and
  an automated extrusion system configured to receive the ECC composition from the feeding system and to deposit the engineered cementitious composition onto a target, the automated extrusion system comprising at least one robotic device comprising a tiltable and steerable deposition head having at least six degrees of freedom and that comprises an extrusion nozzle defining an entry region, a terminal end, and an internal chamber through which the ECC composition passes, wherein the extrusion nozzle is rotatable by at least 360° to define an axis of rotation extending from the entry region to the terminal end of the extrusion nozzle, the internal chamber having a substantially rectangular opening at the terminal end having a width of less than or equal to about 100 mm and a length of less than or equal to about 100 mm and at least one shaping blade at the terminal end to shape and deposit a shaped extruded bead of the engineered cementitious composite (ECC) composition onto a target that defines a shaped filament, wherein the extrusion nozzle is configured to align the plurality of dispersed fibers in the shaped filament.

2. The automated printing device of claim 1, wherein the internal chamber of the extrusion nozzle defines the entry region that passes into a transition region to the terminal end of the extrusion nozzle, wherein the terminal end defines a terminal opening having a first cross-sectional area that is smaller than a second cross-sectional area in either the transition region and/or the entry region.

3. The automated printing device of claim 2, wherein the transition region comprises at least one flat wall that is perpendicular to the target and at least one curved wall configured to shift a center point of the extrusion nozzle.

4. The automated printing device of claim 2, wherein the transition region comprises at least two curved or contoured walls.

5. The automated printing device of claim 1, wherein the internal chamber of the extrusion nozzle comprises at least one baffle component configured to shape the engineered cementitious composition as it exits the substantially rectangular opening.

6. The automated printing device of claim 1, wherein the at least one shaping blade is fixed with respect to the terminal end of the extrusion nozzle.

7. The automated printing device of claim 1, wherein the at least one shaping blade is retractable with respect to the terminal end of the extrusion nozzle.

8. The automated printing device of claim 1, wherein the at least one shaping blade is a pair of shaping blades having a distance between them of greater than or equal to about 25 mm to less than or equal to about 100 mm.

9. The automated printing device of claim 1, wherein the at least one shaping blade has a length of greater than or equal to about 5 mm to less than or equal to about 30 mm.

10. The automated printing device of claim 1, wherein the width of the substantially rectangular opening of the extrusion nozzle is greater than or equal to about 10 mm to less than or equal to about 75 mm and the length is greater than or equal to about greater than or equal to about 10 mm to less than or equal to about 75 mm.

11. The automated printing device of claim 1, wherein the width of the substantially rectangular opening of the extrusion nozzle is about 10 mm and the length is about 30 mm.

12. The automated printing device of claim 1, where the substantially rectangular opening has a cross section that includes at least one wall defining an undulated or corrugated pattern.

13. The automated printing device of claim 1, wherein the extrusion nozzle has a height defined from the entry region to the terminal end of greater than or equal to about 6 inches to less than or equal to about 15 inches.

14. The automated printing device of claim 1, wherein the automated extrusion system is at least partially controlled by a computer numerical control (CNC) system.

15. The automated printing device of claim 1, wherein the at least one pump the feeding system comprises a peristaltic pump or a progressive cavity pump.

16. The automated printing device of claim 1, wherein the automated extrusion system comprises a synchronous deposition pump.

17. The automated printing device of claim 1, wherein the extrusion nozzle further defines a tool center point (TCP) that aligns with the axis of rotation.

18. The automated printing device of claim 1, wherein the terminal end of the extrusion nozzle defines a trailing edge that is aligned with the axis of rotation.

19. An automated printing device for additive manufacturing of an engineered cementitious composite (ECC) structure, the device comprising:
  a feeding system comprising at least one pump configured to pump an engineered cementitious composite (ECC) composition in a fresh state that comprises a plurality of dispersed fibers; and
  an automated extrusion system configured to receive the ECC composition from the feeding system and to deposit the ECC composition comprising the plurality of dispersed fibers onto a target, the automated extrusion system comprising:
  at least one robotic device comprising a tiltable and steerable deposition head having at least six degrees of freedom and that comprises an extrusion nozzle defining an entry region, a terminal end, and an internal chamber through which the ECC composition passes, wherein the extrusion nozzle is rotatable by at least 360° to define an axis of rotation extending from the entry region to the terminal end of the extrusion nozzle, the internal chamber having a substantially rectangular opening and at least one shaping blade at the terminal end to shape and deposit a shaped extruded bead of the engineered cementitious composite (ECC) composition onto a target that defines a shaped filament; and
  a pressure transducer and a progressive cavity pump disposed between the feeding system and the tiltable and steerable deposition head.

20. The automated printing device of claim 19, wherein the at least one pump in the feeding system is pressure controlled, so that the pressure transducer is disposed at the inlet of the progressive cavity pump and provides feedback to the at least one pump to maintain a constant inlet pressure.

21. The automated printing device of claim 20, wherein the inlet pressure is maintained to be greater than or equal to about 30 psi to less than or equal to about 50 psi.

* * * * *